United States Patent
Robinson et al.

(10) Patent No.: US 10,054,732 B2
(45) Date of Patent: Aug. 21, 2018

(54) DIRECTIONAL BACKLIGHT HAVING A REAR REFLECTOR

(71) Applicant: REALD SPARK, LLC, Beverly Hills, CA (US)

(72) Inventors: Michael G. Robinson, Boulder, CO (US); Graham J. Woodgate, Henley-on-Thames (GB)

(73) Assignee: RealD Spark, LLC, Beverly Hills, CA (US)

(*) Notice: Subject to any disclaimer, the term of this patent is extended or adjusted under 35 U.S.C. 154(b) by 0 days.

(21) Appl. No.: 14/186,862

(22) Filed: Feb. 21, 2014

(65) Prior Publication Data

US 2014/0240828 A1    Aug. 28, 2014

Related U.S. Application Data

(60) Provisional application No. 61/768,371, filed on Feb. 22, 2013, provisional application No. 61/791,112, filed on Mar. 15, 2013, provisional application No. 61/890,456, filed on Oct. 14, 2013.

(51) Int. Cl.
    *F21V 8/00* (2006.01)
    *G02B 27/26* (2006.01)

(52) U.S. Cl.
    CPC ......... *G02B 6/0056* (2013.01); *G02B 6/0048* (2013.01); *G02B 27/26* (2013.01)

(58) Field of Classification Search
    CPC .. G02B 6/0048; G02B 27/225; G02B 6/0046; G02B 6/0056; G02B 19/0028; G02B 6/0043; G02B 27/26; F21Y 2105/001; F21Y 2111/001; H04N 13/0434; H04N 13/0497; H04N 13/0409; H04N 13/0438

USPC ........... 359/465; 362/19, 606, 607, 611, 613
See application file for complete search history.

(56) References Cited

U.S. PATENT DOCUMENTS

| | | |
|---|---|---|
| 1,128,979 A | 2/1915 | Hess |
| 1,970,311 A | 8/1934 | Ives |
| 2,133,121 A | 10/1938 | Stearns |
| 2,247,969 A | 7/1941 | Lemuel |

(Continued)

FOREIGN PATENT DOCUMENTS

| | | |
|---|---|---|
| CN | 1142869 A | 2/1997 |
| CN | 1377453 A | 10/2002 |

(Continued)

OTHER PUBLICATIONS

Käläntär et al., "Backlight Unit With Double Surface Light Emission", J. Soc. Inf. Display, 12:4, pp. 379-387 (Dec. 2004).

(Continued)

*Primary Examiner* — William R Alexander
*Assistant Examiner* — Henry Duong
(74) *Attorney, Agent, or Firm* — Penny L. Lowry; Neil G. Mothew

(57) ABSTRACT

A directional display may include a waveguide. The waveguide may include light extraction features arranged to direct light from an array of light sources by total internal reflection to an array of viewing windows and a reflector arranged to direct light from the waveguide by transmission through extraction features of the waveguide to the same array of viewing windows. The brightness of the directional display can be increased. An efficient and bright autostereoscopic display system can be achieved.

28 Claims, 67 Drawing Sheets

(56) References Cited

U.S. PATENT DOCUMENTS

| | | |
|---|---|---|
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,850,580 A | 12/1998 | Taguchi et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,144,118 A | 11/2000 | Cahill et al. |
| 6,172,723 B1 | 1/2001 | Inoue et al. |
| 6,199,995 B1 | 3/2001 | Umemoto |
| 6,219,113 B1 | 4/2001 | Takahara |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,798,406 B1 | 9/2004 | Jones et al. |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,052,168 B2 * | 5/2006 | Epstein .............. G02B 6/0038 362/615 |
| 7,058,252 B2 | 6/2006 | Woodgate |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,415 B2 | 5/2007 | Maehara |
| 7,215,475 B2 | 5/2007 | Woodgate et al. |
| 7,227,567 B1 | 6/2007 | Beck et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 * | 9/2008 | Qi .................... G02F 1/133606 349/64 |
| 7,492,346 B2 | 2/2009 | Manabe et al. |
| 7,528,893 B2 | 5/2009 | Schultz et al. |
| 7,545,429 B2 | 6/2009 | Travis |
| 7,587,117 B2 | 9/2009 | Winston et al. |
| 7,614,777 B2 | 11/2009 | Koganezawa et al. |
| 7,660,047 B1 | 2/2010 | Travis |
| 7,750,981 B2 | 7/2010 | Shestak |
| 7,750,982 B2 | 7/2010 | Nelson |
| 7,771,102 B2 | 8/2010 | Iwasaki |
| 7,798,699 B2 | 9/2010 | Laitinen et al. |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,179,361 B2 | 5/2012 | Sugimoto et al. |
| 8,216,405 B2 | 7/2012 | Emerton |
| 8,223,296 B2 | 7/2012 | Lee et al. |
| 8,251,562 B2 | 8/2012 | Kuramitsu et al. |
| 8,325,295 B2 | 12/2012 | Sugita |
| 8,354,806 B2 | 1/2013 | Travis |
| 8,477,261 B2 | 7/2013 | Travis |
| 8,502,253 B2 | 8/2013 | Min |
| 8,534,901 B2 | 9/2013 | Panagotacos |
| 8,556,491 B2 | 10/2013 | Lee |
| 8,651,725 B2 | 2/2014 | Le et al. |
| 8,684,588 B2 | 4/2014 | Ajichi et al. |
| 8,714,804 B2 | 5/2014 | Kim et al. |
| 8,752,995 B2 | 6/2014 | Park |
| 8,760,762 B2 | 6/2014 | Kelly et al. |
| 8,926,112 B2 | 1/2015 | Uchiike et al. |
| 8,942,434 B1 | 1/2015 | Karakotsios et al. |
| 9,188,731 B2 | 11/2015 | Woodgate et al. |
| 9,197,884 B2 | 11/2015 | Lee et al. |
| 9,350,980 B2 | 5/2016 | Robinson et al. |
| 9,519,153 B2 | 12/2016 | Robinson et al. |
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |
| 2002/0113866 A1 | 8/2002 | Taniguchi et al. |
| 2003/0046839 A1 | 3/2003 | Oda et al. |
| 2003/0117790 A1 | 6/2003 | Lee et al. |
| 2003/0133191 A1 | 7/2003 | Morita et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |
| 2004/0015729 A1 | 1/2004 | Elms et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0108971 A1 | 6/2004 | Waldern et al. |
| 2004/0109303 A1 * | 6/2004 | Olczak ............... G02B 5/045 362/19 |
| 2004/0135741 A1 | 7/2004 | Tomisawa et al. |

(56) References Cited

U.S. PATENT DOCUMENTS

| | | |
|---|---|---|
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1* | 8/2005 | Hoelen .............. G09F 13/18 362/613 |
| 2005/0190180 A1 | 9/2005 | Jin et al. |
| 2005/0190345 A1* | 9/2005 | Dubin .............. G03B 21/2073 353/85 |
| 2005/0237488 A1 | 10/2005 | Yamasaki et al. |
| 2005/0254127 A1 | 11/2005 | Evans et al. |
| 2005/0264717 A1 | 12/2005 | Chen et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkirch |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1* | 12/2006 | Niioka .............. G02B 3/08 362/607 |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Robinson et al. |
| 2007/0115552 A1 | 5/2007 | Robinson et al. |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223252 A1* | 9/2007 | Lee et al. .............. 362/615 |
| 2007/0279554 A1* | 12/2007 | Kowarz .............. G02B 5/045 349/96 |
| 2007/0279727 A1 | 12/2007 | Gandhi et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0014700 A1* | 1/2009 | Metcalf et al. .............. 345/214 |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0109705 A1 | 4/2009 | Pakhchyan et al. |
| 2009/0135623 A1 | 5/2009 | Kunimochi |
| 2009/0140656 A1 | 6/2009 | Kohashikawa et al. |
| 2009/0160757 A1 | 6/2009 | Robinson et al. |
| 2009/0168459 A1 | 7/2009 | Holman et al. |
| 2009/0174700 A1* | 7/2009 | Daiku .............. B60K 35/00 345/214 |
| 2009/0174840 A1 | 7/2009 | Lee et al. |
| 2009/0190072 A1 | 7/2009 | Nagata et al. |
| 2009/0190079 A1 | 7/2009 | Saitoh |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0040280 A1 | 2/2010 | McKnight |
| 2010/0053771 A1 | 2/2010 | Travis |
| 2010/0053938 A1 | 3/2010 | Kim et al. |
| 2010/0091093 A1 | 4/2010 | Robinson |
| 2010/0091254 A1 | 4/2010 | Travis |
| 2010/0165598 A1 | 7/2010 | Chen et al. |
| 2010/0177387 A1 | 7/2010 | Travis |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche |
| 2010/0220260 A1 | 9/2010 | Sugita et al. |
| 2010/0251498 A1 | 9/2010 | Large |
| 2010/0271838 A1 | 10/2010 | Yamaguchi |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0321953 A1 | 12/2010 | Coleman et al. |
| 2010/0328438 A1 | 12/2010 | Ohyama et al. |
| 2011/0013417 A1 | 1/2011 | Saccomanno et al. |
| 2011/0019112 A1 | 1/2011 | Dolgoff |
| 2011/0032483 A1 | 2/2011 | Hiruska et al. |
| 2011/0043142 A1* | 2/2011 | Travis .............. G02B 5/045 315/313 |
| 2011/0043501 A1 | 2/2011 | Daniel |
| 2011/0044056 A1 | 2/2011 | Travis |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228562 A1 | 9/2011 | Travis et al. |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche |
| 2011/0255303 A1 | 10/2011 | Nichol et al. |
| 2011/0267563 A1 | 11/2011 | Shimizu |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1* | 1/2012 | Dobschal .............. G02B 3/08 359/630 |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Mich et al. |
| 2012/0063166 A1 | 3/2012 | Panagotacos et al. |
| 2012/0075285 A1 | 3/2012 | Oyagi et al. |
| 2012/0081920 A1 | 4/2012 | Ie et al. |
| 2012/0086776 A1 | 4/2012 | Lo |
| 2012/0092435 A1 | 4/2012 | Wohlert |
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0236484 A1 | 9/2012 | Miyake |
| 2012/0243204 A1 | 9/2012 | Robinson et al. |

(56) References Cited

U.S. PATENT DOCUMENTS

| | | |
|---|---|---|
| 2012/0293721 A1 | 11/2012 | Ueyama |
| 2012/0299913 A1 | 11/2012 | Robinson et al. |
| 2012/0314145 A1 | 12/2012 | Robinson |
| 2012/0327172 A1 | 12/2012 | El-Saban et al. |
| 2013/0101253 A1 | 4/2013 | Popovich et al. |
| 2013/0107340 A1 | 5/2013 | Wong et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0230136 A1 | 9/2013 | Sakaguchi et al. |
| 2013/0235561 A1 | 9/2013 | Etienne et al. |
| 2013/0294684 A1 | 11/2013 | Lipton et al. |
| 2013/0307946 A1 | 11/2013 | Robinson et al. |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0016354 A1 | 1/2014 | Lee et al. |
| 2014/0022619 A1 | 1/2014 | Woodgate et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0098558 A1* | 4/2014 | Vasylyev ............ G02B 6/0036 362/551 |
| 2014/0126238 A1 | 5/2014 | Kao et al. |
| 2014/0240344 A1 | 8/2014 | Tomono et al. |
| 2014/0240828 A1 | 8/2014 | Robinson et al. |
| 2014/0289835 A1 | 9/2014 | Varshaysky et al. |
| 2014/0340728 A1* | 11/2014 | Taheri ................. G02B 27/281 359/250 |
| 2014/0368602 A1 | 12/2014 | Woodgate et al. |
| 2015/0116212 A1 | 4/2015 | Freed et al. |
| 2015/0268479 A1 | 9/2015 | Woodgate et al. |
| 2015/0334365 A1 | 11/2015 | Tsubaki et al. |
| 2015/0339512 A1 | 11/2015 | Son et al. |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1588196 A | 3/2005 |
| CN | 1678943 A | 10/2005 |
| CN | 1696788 A | 11/2005 |
| CN | 1769971 A | 5/2006 |
| CN | 1823292 A | 8/2006 |
| CN | 1826553 A | 8/2006 |
| CN | 1866112 A | 11/2006 |
| CN | 1900785 A | 1/2007 |
| CN | 1908753 A | 2/2007 |
| CN | 1910399 A | 2/2007 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 101266338 A | 9/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 102147079 A | 8/2011 |
| CN | 202486493 U | 10/2012 |
| EP | 0653891 A1 | 5/1995 |
| EP | 0721131 A2 | 7/1996 |
| EP | 0830984 A2 | 3/1998 |
| EP | 0833183 A1 | 4/1998 |
| EP | 0939273 A1 | 1/1999 |
| EP | 0656555 B1 | 3/2003 |
| EP | 1394593 A1 | 3/2004 |
| EP | 0860729 A1 | 7/2006 |
| EP | 1736702 A1 | 12/2006 |
| EP | 3968742 A1 | 8/2007 |
| EP | 2003394 A1 | 12/2008 |
| EP | 2451180 A2 | 5/2012 |
| EP | 1634119 B1 | 8/2012 |
| GB | 2405542 | 2/2005 |
| JP | H07270792 | 10/1995 |
| JP | H08211334 | 8/1996 |
| JP | 08-237691 A | 9/1996 |
| JP | 08254617 B2 | 10/1996 |
| JP | 08340556 B2 | 12/1996 |
| JP | H08070475 | 12/1996 |
| JP | H1042315 A | 2/1998 |
| JP | H10142556 A | 5/1998 |
| JP | H11242908 A | 9/1999 |
| JP | 2000048618 A | 2/2000 |
| JP | 2000069504 A | 3/2000 |
| JP | 2000131683 A | 5/2000 |
| JP | 2000-200049 A | 7/2000 |
| JP | 2001-093321 A | 4/2001 |
| JP | 2001281456 | 10/2001 |
| JP | 2002-049004 A | 2/2002 |
| JP | 2003-215705 A | 7/2003 |
| JP | 2004112814 A | 4/2004 |
| JP | 2004265813 A | 9/2004 |
| JP | 2004-319364 A | 11/2004 |
| JP | 2005116266 | 4/2005 |
| JP | 2005-135844 A | 5/2005 |
| JP | 2005-183030 A | 7/2005 |
| JP | 2005181914 A | 7/2005 |
| JP | 2005203182 A | 7/2005 |
| JP | 2005-259361 A | 9/2005 |
| JP | 2006-004877 A | 1/2006 |
| JP | 2006010935 A | 1/2006 |
| JP | 2006-031941 A | 2/2006 |
| JP | 2007286652 | 11/2007 |
| JP | 2008-204874 A | 9/2008 |
| JP | 2010160527 A | 7/2010 |
| JP | 2011192468 A | 9/2011 |
| JP | 20110216281 | 10/2011 |
| JP | 2012060607 A | 3/2012 |
| JP | 2013015619 | 1/2013 |
| JP | 2013502693 | 1/2013 |
| JP | 2013540083 | 10/2013 |
| KR | 10-2003-0064258 A | 7/2003 |
| KR | 10-0932304 B1 | 12/2009 |
| KR | 102011-0006773 A | 1/2011 |
| KR | 102011-0017918 A | 2/2011 |
| KR | 102011-0067534 A | 6/2011 |
| KR | 102012-0048301 A | 5/2012 |
| KR | 20130002646 A | 1/2013 |
| KR | 20140139730 | 12/2014 |
| TW | 200528780 A | 9/2005 |
| WO | 1994006249 A1 | 3/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001027528 A1 | 4/2001 |
| WO | 2001-061241 A1 | 8/2001 |
| WO | 2001079923 A1 | 10/2001 |
| WO | 2008038539 A1 | 4/2008 |
| WO | 2008045681 A1 | 4/2008 |
| WO | 2010021926 A1 | 2/2010 |
| WO | 2011020962 A1 | 2/2011 |
| WO | 2011068907 A1 | 6/2011 |
| WO | 2011149739 A2 | 12/2011 |
| WO | 2012158574 A1 | 12/2011 |
| WO | 2014130860 A1 | 8/2014 |

OTHER PUBLICATIONS

International search report and written opinion of international searching authority in co-pending PCT/US2014/017779, dated May 28, 2014.

(56) References Cited

OTHER PUBLICATIONS

International search report and written opinion of international searching authority for PCT application PCT/US2013/063133 dated Jan. 20, 2014.
International search report and written opinion of international searching authority for PCT application PCT/US2013/063125 dated Jan. 20, 2014.
International search report and written opinion of international searching authority for PCT application PCT/US2013/077288 dated Apr. 18, 2014.
International search report and written opinion of international searching authority for PCT application PCT/US2014/017779 dated May 28, 2014.
International search report and written opinion of international searching authority for PCT application PCT/US2012/37677 dated Jun. 29, 2012.
International search report and written opinion of international searching authority for PCT application PCT/US2012/052819 dated Jan. 29, 2013.
International search report and written opinion of international searching authority for PCT application No. PCT/US2013/041697 dated Aug. 23, 2013.
International search report and written opinion of international searching authority for PCT application No. PCT/US2013/041235 dated Aug. 23, 2013.
International search report and written opinion of international searching authority for PCT application No. PCT/US2013/041228 dated Aug. 23, 2013.
International search report and written opinion of international searching authority for PCT application No. PCT/US2013/041683 dated Aug. 27, 2013.
International search report and written opinion of international searching authority for PCT application No. PCT/US2013/041548 dated Aug. 27, 2013.
International search report and written opinion of international searching authority for PCT application No. PCT/US2013/041703 dated Aug. 27, 2013.
International search report and written opinion of international searching authority for PCT application No. PCT/US2013/041655 dated Aug. 27, 2013.
International search report and written opinion of international searching authority for PCT application No. PCT/US2013/041619 dated Aug. 27, 2013.
International search report and written opinion of international searching authority for PCT application No. PCT/US2013/041192 dated Aug. 28, 2013.
Tabiryan et al., "The Promise of Diffractive Waveplates", Optics and Photonics News, 21:3, pp. 40-45 (Mar. 2010).
3M™ ePrivacy Filter software professional version; http://www.cdw.com/shop/products/3M-ePrivacy-Filter-software-professional-version/3239412.aspx?cm_mmc=ShoppingFeeds-_-ChannelIntel-ligence-_-Software-_-3239412_3MT%20ePrivacy%20Filter%20software%20professional%20version_3MF-EPFPRO&cpncode=37-7582919&srccode=cii_10191459#PO; Copyright 2007-2016.
AU-2011329639 Australia Patent Examination Report No. 1 dated Mar. 6, 2014.
AU-2013262869 Australian Office Action of Australian Patent Office dated Feb. 22, 2016.
AU-2015258258 Australian Office Action of Australian Patent Office dated Jun. 9, 2016.
Bahadur, "Liquid crystals applications and uses," World Scientific, vol. 1, pp. 178 (1990).
CA-2817044 Canadian office action dated Jul. 14, 2016.
CN-201180065590.0 Office first action dated Dec. 31, 2014.
CN-201180065590.0 Office fourth action dated Jan. 4, 2017.
CN-201180065590.0 Office second action dated Oct. 21, 2015.
CN-201180065590.0 Office Third action dated Jun. 6, 2016.
CN-201280034488.9 2d Office Action from the State Intellectual Property Office of P.R. China dated Mar. 22, 2016.

CN-201280034488.9 1st Office Action from the State Intellectual Property Office of P.R. China dated Jun. 11, 2015.
CN-201380026045.X Chinese First Office Action of Chinese Patent Office dated Aug. 29, 2016.
CN-201380026046.4 Chinese 1st Office Action of the State Intellectual Property Office of P.R. China dated Oct. 24, 2016.
CN-201380026047.9 Chinese 1st Office Action of the State Intellectual Property Office of P.R. dated Dec. 18, 2015.
CN-201380026047.9 Chinese 2d Office Action of the State Intellectual Property Office of P.R. dated Jul. 12, 2016.
CN-201380026050.0 Chinese 1st Office Action of the State Intellectual Property Office of P.R. dated Jun. 3, 2016.
CN-201380026058.7 Chinese 1st Office Action of the State Intellectual Property Office of P.R. China dated Nov. 2, 2016.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
CN-201380063047.6 Chinese Office Action of the State Intellectual Property Office of P.R. China dated Oct. 9, 2016.
CN-201380063055.0 Chinese 1st Office Action of the State Intellectual Property Office of P.R. dated Jun. 23, 2016.
CN-201380073381.X Chinese Office Action of the State Intellectual Property Office of P.R. China dated Nov. 16, 2016.
CN-201480023023.2 Office action dated Aug. 12, 2016.
Cootes et al., "Active Aplpearance Models", IEEE Trans. Pattern Analysis and Machine Intelligence, 23(6):681-685, 2001.
Cootes et al., "Active Shape Models—Their Training and Application" Computer Vision and Image Understanding 61(1):38-59 Jan. 1995.
Dalal et al., "Histogram of Oriented Gradients for Human Detection", Computer Vision and Pattern Recognition, pp. 886-893, 2005.
Drucker et al., "Support Vector Regression Machines", Advances in Neural Information Processing Systems 9, pp. 155-161, NIPS 1996.
EP-07864751.8 European Search Report dated Jun. 1, 2012.
EP-07864751.8 Supplementary European Search Report dated May 29, 2015.
EP-09817048.3 European Search Report dated Apr. 29, 2016.
EP-11842021.5 Office Action dated Dec. 17, 2014.
EP-11842021.5 Office Action dated Oct. 2, 2015.
EP-11842021.5 Office Action dated Sep. 2, 2016.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790775.4 Office Action dated Aug. 29, 2016.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Oct. 14, 2015.
EP-13791437 0 European first office action dated Aug. 30, 2016.
EP-13822472.0 European Extended Search Report of European Patent Office dated Mar. 2, 2016.
EP-13843659.7 European Extended Search Report of European Patent Office dated May 10, 2016.
RU-2013122560 Second office action dated Apr. 10, 2015.
RU-201401264 Office action dated Jan. 18, 2017.

(56) References Cited

OTHER PUBLICATIONS

Travis, et al. "Collimated light from a waveguide for a display," Optics Express, vol. 17, No. 22, pp. 19714-19719 (2009).
Viola and Jones, "Rapid Object Detection using a Boosted Cascade of Simple Features", pp. 1-9 CVPR 2001.
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
Zach et al., "A Duality Based Approach for Realtime TV-L1 Optical Flow", Pattern Recognition (Proc. DAGM), 2007, pp. 214-223.
CN-201480023023.2 Office second action dated May 11, 2017.
AU-2014218711 Examination report No. 1 dated Mar. 20, 2017.
Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography.html [retrieved-on Jan. 17, 2017].
Braverman: "The 3D Toolbox : News", Aug. 13, 2010 (Aug. 13, 2010), XP055336081, Retrieved from the Internet: URL:http://www.dashwood3d.com/blcg/the-3d-toolbox/ [retrieved on Jan. 17, 2017].
CN-201380026050.0 Chinese 2nd Office Action of the State Intellectual Property Office of P.R. dated Apr. 1, 2017.
CN-201480023023.2 Office second action dated May 11, 2017 (translated).
EP-14813739.1 European Extended Search Report of European Patent Office dated Jan. 25, 2017.
JP-2015-512794 1st Office Action (translated) dated Feb. 14, 2017.
JP-2015-512809 1st Office Action dated Mar. 28, 2017 (translated).
JP-2015-512810 1st Office Action (translated) dated Feb. 7, 2017.
JP-2015-512879 1st Office Action (translated) dated Apr. 11, 2017.
JP-2015-512887 1st Office Action (translated) dated Feb. 7, 2017.
JP-2015-512896 1st Office Action (translated) dated Apr. 27, 2017.
JP-2015-512901 1st Office Action dated Mar. 28, 2017 (translated).
JP-2015-512905 1st Office Action (translated) dated Feb. 7, 2017.
Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].
Lucio et al: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912f50a2922010eb2000000.pdf [retrieved on Jan. 17, 2017].
PCT/US2015/054523 International search report and written opinion of international searching authority dated Mar. 18, 2016.
PCT/US2016/058695 International search report and written opinion of international searching authority dated Feb. 28, 2017.
PCT/US2017/012203 International search report and written opinion of international searching authority dated Apr. 18, 2017.
TW103105897 Office first action dated Jul. 4, 2017.
EP-13844510.1 European Extended Search Report of European Patent Office dated May 13, 2016.
EP-13865893.5 European Extended Search Report of European Patent Office dated Oct. 6, 2016.
EP-14754859.8 European Extended Search Report of European Patent Office dated Oct. 14, 2016.
EP-16150248.9 European Extended Search Report of European Patent Office dated Jun. 16, 2016.
Ho, "Random Decision Forests", Proceedings of the 3rd International Conference on Document Analysis and Recognition, Montreal, QC, pp. 278-282, Aug. 14-16, 1995.
Ian Sexton et al: "Stereoscopic and autostereoscopic display-systems",—IEEE Signal Processing Magazine, May 1, 1999 (May 1, 1999), pp. 85-99, XP055305471, Retrieved from the Internet: RL:http://ieeexplore.ieee.org/iel5/79/16655/00768575.pdf [retrieved on Sep. 26, 2016].
JP-2009538527 Reasons for rejection dated Jul. 17, 2012 with translation.
JP-200980150139.1 1st Office Action dated Feb. 11, 2014.
JP-200980150139.1 2d Office Action dated Apr. 5, 2015.
JP-2013540083 Notice of reasons for rejection of Jun. 30, 2015.
JP-2013540083 Notice of reasons for rejection with translation dated Jun. 21, 2016.
Kononenko et al., "Learning to Look Up: Realtime Monocular Gaze Correction Using Machine Learning", Computer Vision and Pattern Recognition, pp. 4667-4675, 2015.
KR-20117010839 1st Office action (translated) dated Aug. 28, 2015.
KR-20117010839 2d Office action (translated) dated Apr. 28, 2016.
KR-20137015775 Office action (translated) dated Oct. 18, 2016.
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, XP002239311, p. 42-49.
Lowe, "Distinctive Image Features from Scale-Invariant Keypoints", International Journal of Computer Vision 60 (2), pp. 91-110, 2004.
Marjanovic, M.,"Interlace, Interleave, and Field Dominance," http://www.mir.com/DMG/interl.html, pp. 1-5 (2001).
Ozuysal et al., "Fast 2007 Keypoint recognition in Ten Lines of Code", Computer Vision and Pattern Recognition, pp. 1-8, 2007.
PCT/US2007/85475 International preliminary report on patentability dated May 26, 2009.
PCT/US2007/85475 International search report and written opinion dated Apr. 10, 2008.
PCT/US2009/060686 international preliminary report on patentability dated Apr. 19, 2011.
PCT/US2009/060686 international search report and written opinion of international searching authority dated Dec. 10, 2009.
PCT/US2011/061511 International Preliminary Report on Patentability dated May 21, 2013.
PCT/US2011/061511 International search report and written opinion of international searching authority dated Jun. 29, 2012.
PCT/US2012/042279 International search report and written opinion of international searching authority dated Feb. 26, 2013.
PCT/US2013/041237 International search report and written opinion of international searching authority dated May 15, 2013.
PCT/US2013/049969 International search report and written opinion of international searching authority dated Oct. 23, 2013.
PCT/US2014/042721 International search report and written opinion of international searching authority dated Oct. 10, 2014.
PCT/US2014/057860 International Preliminary Report on Patentability dated Apr. 5, 2016.
PCT/US2014/057860 International search report and written opinion of international searching authority dated Jan. 5, 2015.
PCT/US2014/060312 International search report and written opinion of international searching authority dated Jan. 19, 2015.
PCT/US2014/060368 International search report and written opinion of international searching authority dated Jan. 14, 2015.
PCT/US2014/065020 International search report and written opinion of international searching authority dated May 21, 2015.
PCT/US2015/000327 International search report and written opinion of international searching authority dated Apr. 25, 2016.
PCT/US2015/021583 International search report and written opinion of international searching authority dated Sep. 10, 2015.
PCT/US2015/038024 International search report and written opinion of international searching authority dated Dec. 30, 2015.
PCT/US2016/027297 International search report and written opinion of international searching authority dated Jul. 26, 2017.
PCT/US2016/027350 International search report and written opinion of the international searching authority dated Jul. 25, 2016.
PCT/US2016/034418 International search report and written opinion of the international searching authority dated Sep. 7, 2016.
PCT/US2016/056410 International search report and written opinion of the international searching authority dated Jan. 25, 2017.
PCT/US2016/061428 International search report and written opinion of international searching authority dated Jan. 20, 2017.
Robinson et al., U.S. Appl. No. 14/751,878 entitled "Directional privacy display" filed Jun. 26, 2015.

(56) References Cited

OTHER PUBLICATIONS

Robinson et al., U.S. Appl. No. 15/097,750 entitled "Wide angle imaging directional backlights" filed 4pril 13, 2016.
Robinson et al., U.S. Appl. No. 15/098,084 entitled "Wide angle imaging directional backlights" filed Apr. 13, 2016.
Robinson et al., U.S. Appl. No. 15/165,960 entitled "Wide Angle Imaging Directional Backlights" filed May 26, 2016.
Robinson et al., U.S. Appl. No. 15/290,543 entitled "Wide angle imaging directional backlights" filed Oct. 11, 2016.
Robinson, U.S. Appl. No. 13/300,293 entitled "Directional flat illuminators" filed Nov. 18, 2011.
RU-2013122560 First office action dated Jan. 1, 2014.

* cited by examiner

DIRECTIONAL BACKLIGHT HAVING A REAR REFLECTOR

CROSS-REFERENCE TO RELATED APPLICATIONS

This application claims priority to U.S. Provisional Patent Application No. 61/768,371, entitled "Directional backlight," filed Feb. 22, 2013, to U.S. Provisional Patent Application No. 61/791,112, entitled "Directional backlight," filed Mar. 15, 2013, and to U.S. Provisional Patent Application No. 61/890,456, entitled "Energy efficient directional backlight," filed Oct. 14, 2013, all of which are herein incorporated by reference in their entirety. This application is also related to U.S. patent application Ser. No. 13/837,466, entitled "Polarization recovery in a directional display device," filed Mar. 15, 2013 which is herein incorporated by reference in its entirety.

TECHNICAL FIELD

This disclosure generally relates to illumination of light modulation devices, and more specifically relates to light guides for providing large area illumination from localized light sources for use in 2D display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can include addressing electronics in the spatial light modulator.

BRIEF SUMMARY

According to a first aspect of the present disclosure, there may be provided viewing windows. The viewing windows may be provided by transmission of light extraction features of a waveguide. The light extraction features can be aligned with viewing windows provided by total internal reflection of light from the light extraction features. A bright and power efficient display can be achieved.

According to another aspect of the present disclosure, there may be provided a directional backlight which may include a waveguide and an array of light sources disposed at different input positions in a lateral direction across the input end of the waveguide. The waveguide may include an input end, first and second opposed guide surfaces for guiding light along the waveguide, and a reflective end facing the input end for reflecting the input light back through the waveguide. The first guide surface may be arranged to guide light by total internal reflection and the second guide surface may have a stepped shape. The stepped shape may include a plurality of facets oriented to reflect light from the light sources, after reflection from the reflective end, through the first guide surface into optical windows in output directions. The output directions may be distributed in a lateral direction to the normal to the first guide surface and primarily in dependence on the input positions, and intermediate regions between the facets that may be arranged to direct light through the waveguide without extracting it. The directional backlight may also include a rear reflector which may include a linear array of reflective facets arranged to reflect light from the light sources. The light may be transmitted through the plurality of facets of the waveguide, back through the waveguide to exit through the first guide surface into said optical windows.

The directional backlight may include a diffuser disposed to receive light output through the first guide surface. The diffuser may be an asymmetric diffuser which may be arranged to provide greater angular dispersion in a direction approximately orthogonal to the lateral direction than in the lateral direction. The directional backlight may include a Fresnel lens which may have optical power in at least the lateral direction, and which may be disposed between the first guide surface of the waveguide and the diffuser. In another example, the Fresnel lens may have optical power at least in the lateral direction disposed to receive light output through the first guide surface.

The waveguide of the directional backlight may include facets which may be reflective facets of the rear reflector and which may be inclined in the same sense in a common plane approximately orthogonal to the lateral direction. The facets of the waveguide may be inclined at an approximate angle $(\pi/2-\alpha)$ to the normal to the first guide surface and the reflective facets of the rear reflector may be inclined at an angle $\beta$ to the normal to the first guide surface, and $2\beta > \pi/2 - \sin^{-1}(n \cdot \sin(\alpha - \theta_c))$, with $\theta_c$ being the critical angle of the facets of the waveguide and n being the refractive index of the material of the waveguide.

The rear reflector of the directional backlight may be spaced from the waveguide such that the light from an individual facet of the waveguide is incident on plural reflective facets of the rear reflector. The rear reflector may further include intermediate facets which may extend between the reflective facets of the rear reflector. The intermediate facets may be inclined in an opposite sense from the reflective facets of the rear reflector at an angle such that the light from the light sources that is transmitted through the plurality of facets of the waveguide may not be incident on the intermediate facets. The reflective facets of the rear reflector may have an irregular pitch. The reflective facets of the rear reflector have an irregular, randomised pitch. The reflective facets of the rear reflector may have an inclination that varies across the array of reflective facets. The reflective facets of the rear reflector may be linear. The reflective facets of the rear reflector may be curved. The reflective facets of the rear reflector may be undulating along their length. The rear reflector may further comprise a diffusing surface on at least some of the reflective facets.

In one example, the facets of the rear reflector may be disposed behind respective ones of the facets of the waveguide and arranged to reflect substantially all of the light from the light sources that is transmitted through the respective one of the facets of the waveguide. The reflective end may have positive optical power in a lateral direction across the waveguide. The rear reflector may be formed by at least two polarized reflector sheets arranged to reflect light that is polarized in respective polarization directions that are orthogonal to each other, the polarized reflector sheets being shaped to form said linear array of reflective facets. Advantageously the cost of the rear reflector may be reduced.

According to another aspect of the present disclosure, there may be provided a directional display device which may include the previously discussed directional backlight, and a transmissive spatial light modulator which may be arranged to receive the output light from the first guide surface.

According to another aspect of the present disclosure, there may be provided a display apparatus which may include the previously discussed directional display device and a control system which may be arranged to selectively operate the light sources to direct light into optical windows corresponding to the output directions. The display apparatus may be an autostereoscopic display apparatus in which the control system may be further arranged to control the display device to display temporally multiplexed left and right images and substantially synchronously to direct the displayed images into viewing windows in positions corresponding to left and right eyes of an observer. The control system of the autostereoscopic display apparatus may include a sensor system which may be arranged to detect the position of an observer across the display device. Further, the control system may be arranged to direct the output light into optical windows selected in dependence on the detected position of the observer.

According to another aspect of the present disclosure a directional backlight may comprise a waveguide comprising an input end; a single light source disposed at a predetermined input position in a lateral direction across the input end of the waveguide, the waveguide further comprising first and second, opposed guide surfaces for guiding light along the waveguide, and a reflective end facing the input end for reflecting the input light back through the waveguide, the first guide surface being arranged to guide light by total internal reflection and the second guide surface having a stepped shape comprising (a) a plurality of facets oriented to reflect light from the light source, after reflection from the reflective end, through the first guide surface into an optical window in an output direction positioned in a lateral direction in dependence on the input position of the light source, and (b) intermediate regions between the facets that are arranged to guide light through the waveguide; a rear reflector comprising an array of reflective facets arranged to reflect light from the light source, that is transmitted through the plurality of facets of the waveguide, back through the waveguide to exit through the first guide surface into said optical windows.

Advantageously the cost of the light source is reduced, and tracking technologies are not required, further reducing cost and increasing device lifetime. Further high gain optical output can be achieved with high optical efficiency.

According to other aspects of the present disclosure, the imaging directional backlight may include a waveguide for guiding light. The waveguide may include a first light guiding surface operable to direct light from an illuminator array in a first direction, a second light guiding surface, operable to allow light to exit the waveguide, and a light input surface operable to receive light from the illuminator array.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in patent application Ser. No. 13/300,293, which is herein incorporated by reference, in its entirety.

Embodiments herein may provide an autostereoscopic display with large area and thin structure. Further, as will be described, the waveguides of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display, and efficient 2D display, a high brightness 2D display or 2D displays achieving a privacy function.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination may be provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
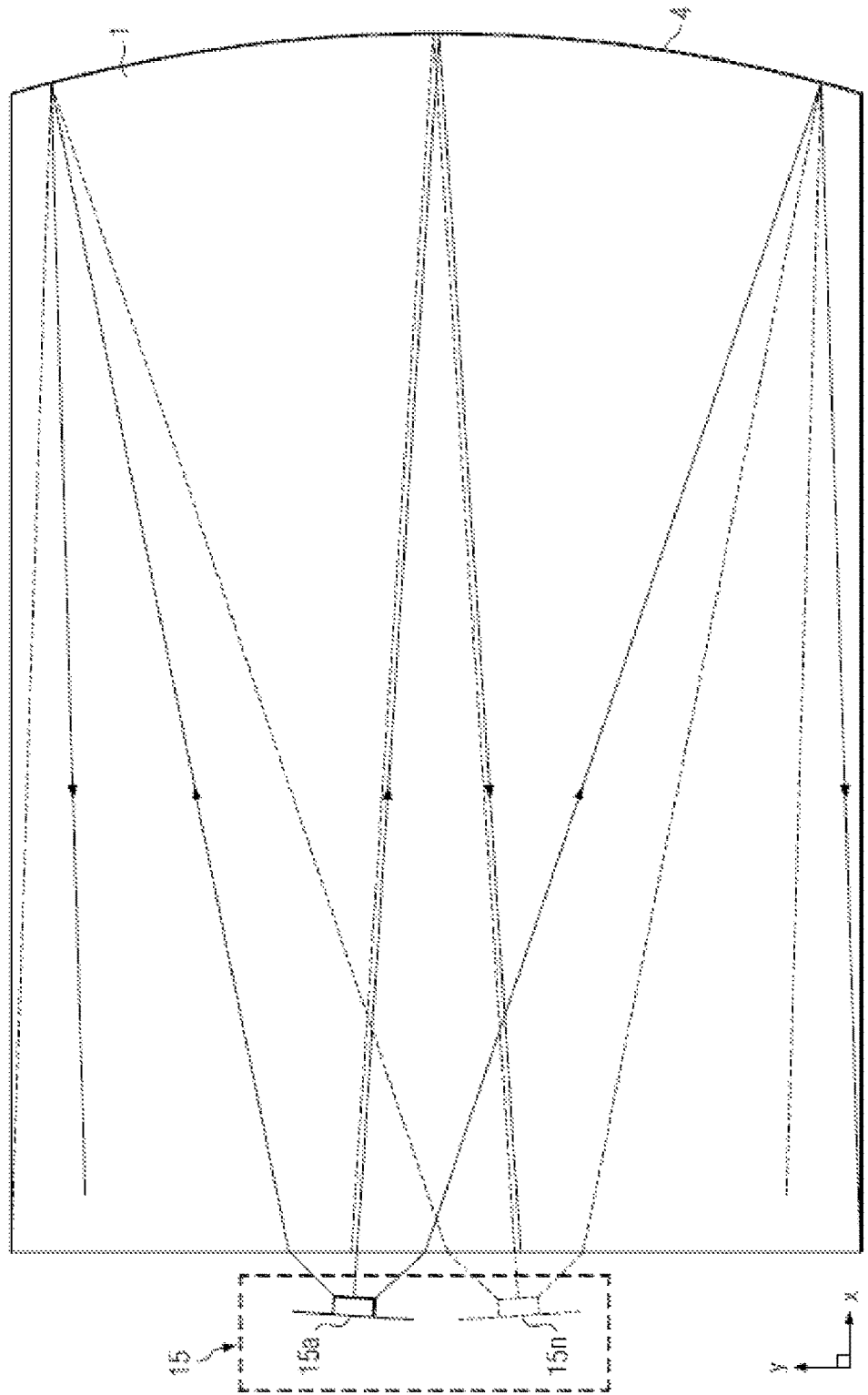
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in patent application Ser. No. 13/300,293, which is herein incorporated by reference in its entirety.

As used herein, examples of an imaging directional backlight include a stepped waveguide imaging directional backlight, a folded imaging directional backlight, a wedge type directional backlight, or an optical valve.

Additionally, as used herein, a stepped waveguide imaging directional backlight may be an optical valve. A stepped waveguide is a waveguide for an imaging directional backlight including a waveguide for guiding light, further including a first light guiding surface; and a second light guiding surface, opposite the first light guiding surface, further including a plurality of light guiding features interspersed with a plurality of extraction features arranged as steps.

Moreover, as used, a folded imaging directional backlight may be at least one of a wedge type directional backlight, or an optical valve.

In operation, light may propagate within an exemplary optical valve in a first direction from an input side to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
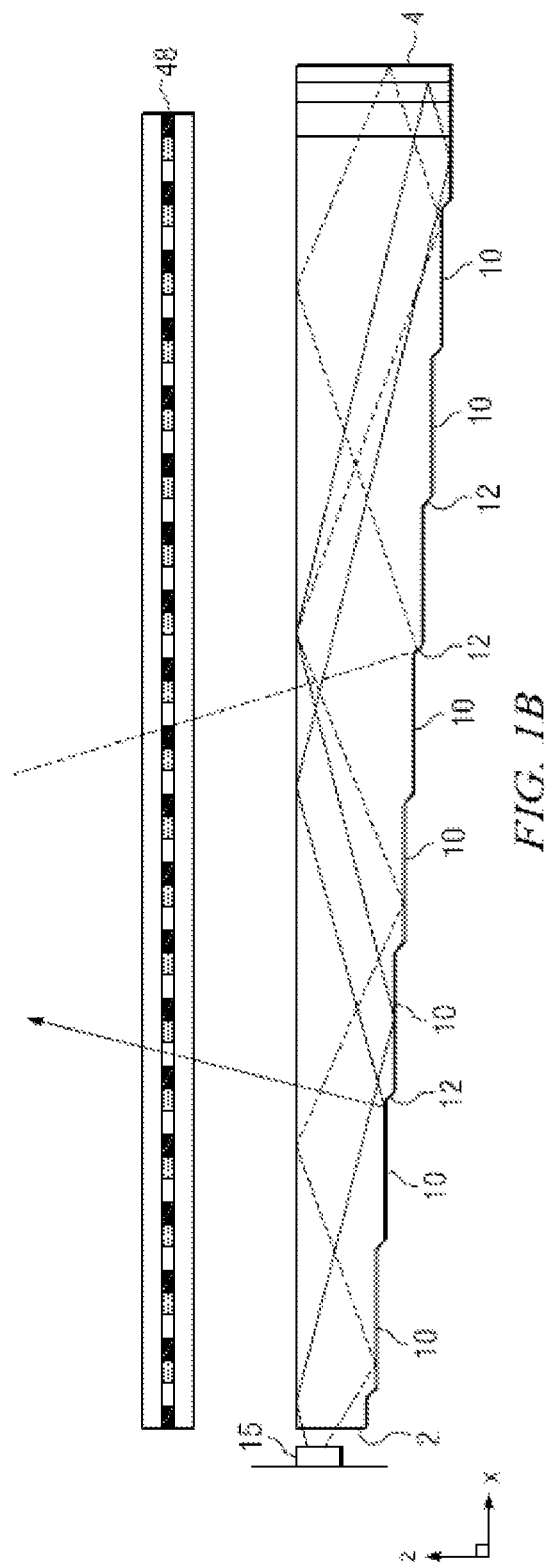
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM (spatial light modulator) 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1 by total internal reflection. The first guide surface is planar. The second guide surface has a plurality of light extraction features 12 facing the reflective end 4 and inclined to reflect at least some of the light guided back through the waveguide 1 from the reflective end in directions that break the total internal reflection at the first guide surface and allow output through the first guide surface, for example, upwards in FIG. 1B, that is supplied to the SLM 48.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape including of the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the centre of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1.

The SLM 48 extends across the waveguide is transmissive and modulates the light passing therethrough. Although the SLM 48 may be a liquid crystal display (LCD) but this is merely by way of example, and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
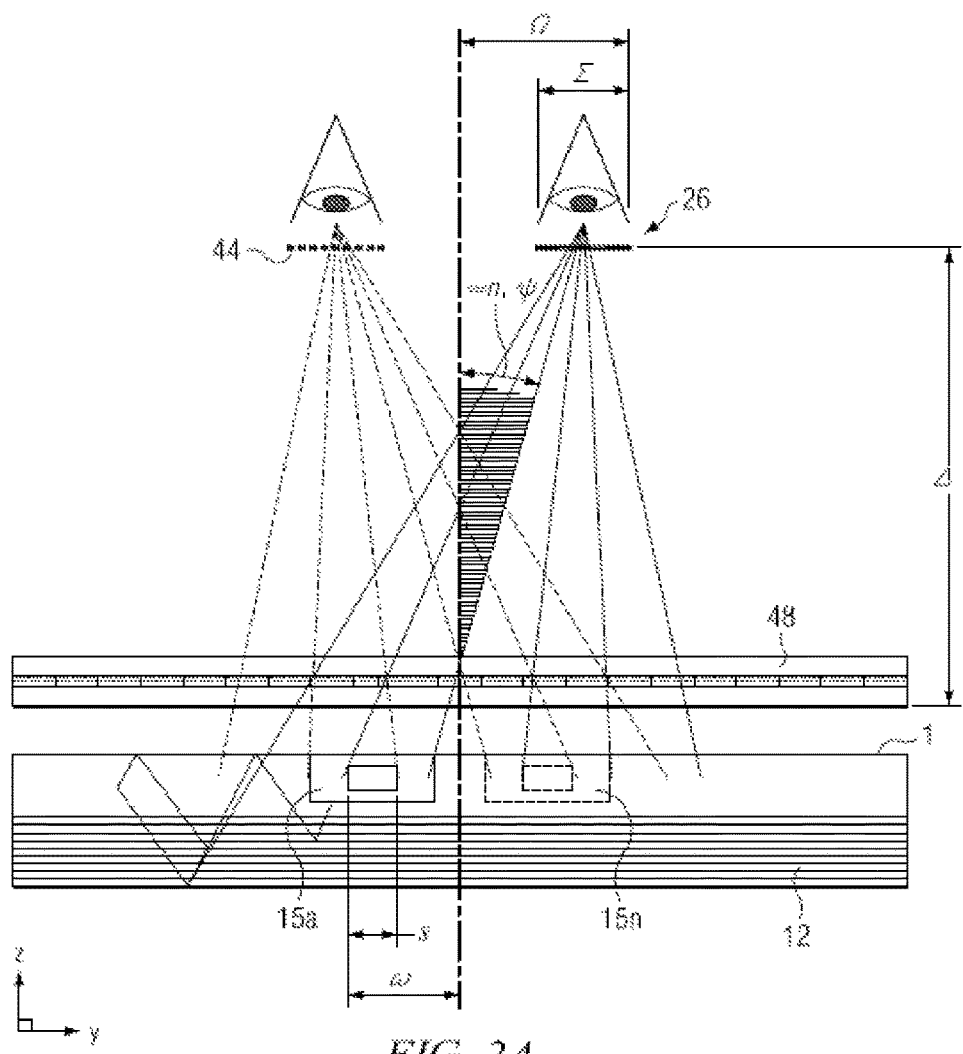
FIG. 2A is a schematic diagram illustrating in a top view of light propagation in another embodiment of a directional display device, in accordance with the present disclosure.
Figure 2B:
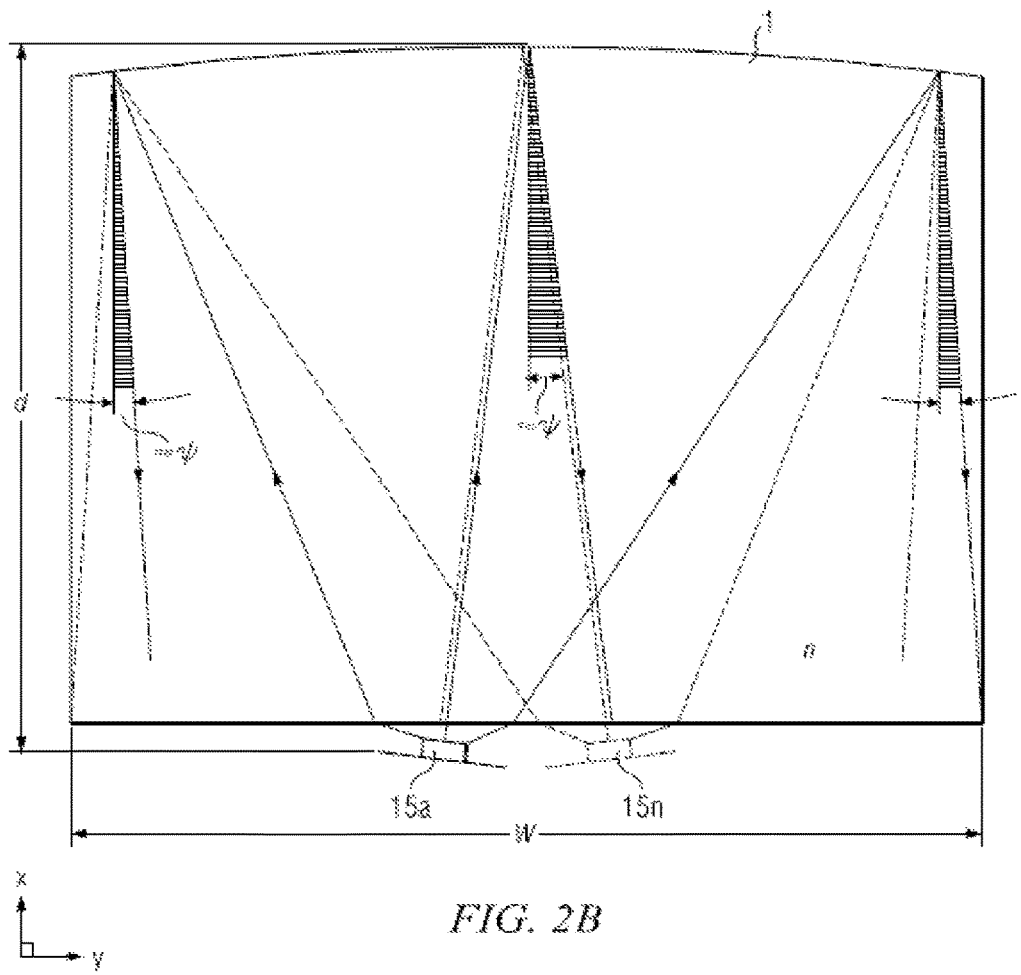
FIG. 2B is a schematic diagram illustrating light propagation in a front view of the directional display device of FIG. 2A, in accordance with the present disclosure.
Figure 2C:
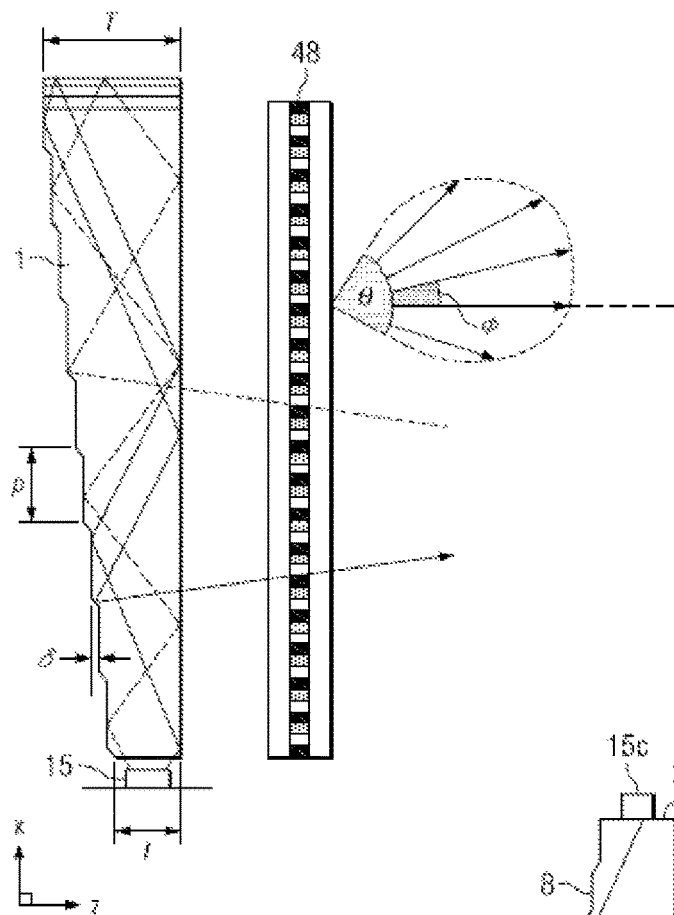
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the centre of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. The cylindrical reflecting surface at end 4 may typically be a spherical profile to optimize performance for on-axis and off-axis viewing positions. Other profiles may be used.

Figure 3:
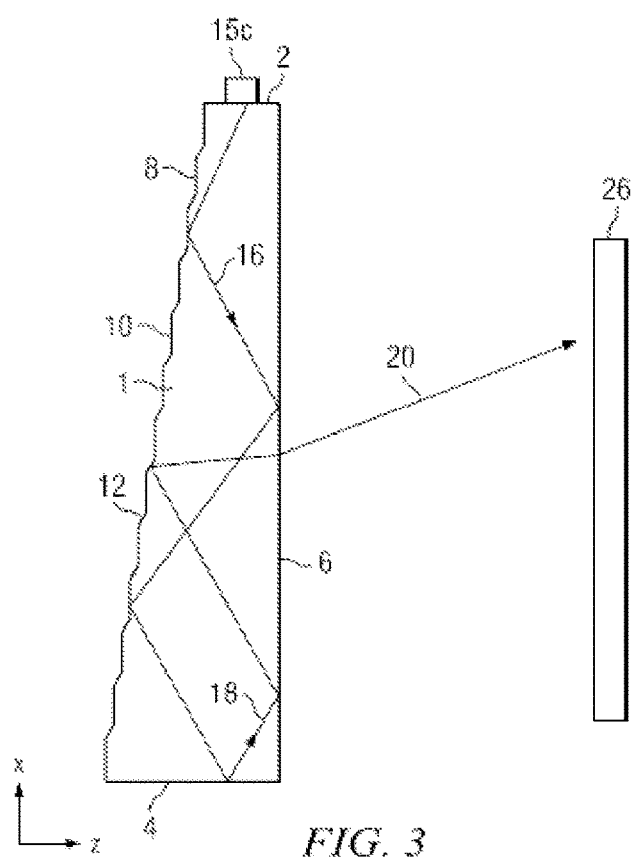
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Thus each viewing window 26 represents a range of separate output directions with respect to the surface normal direction of the spatial light modulator 48 that intersect with a plane at the nominal viewing distance.

Figure 4A:
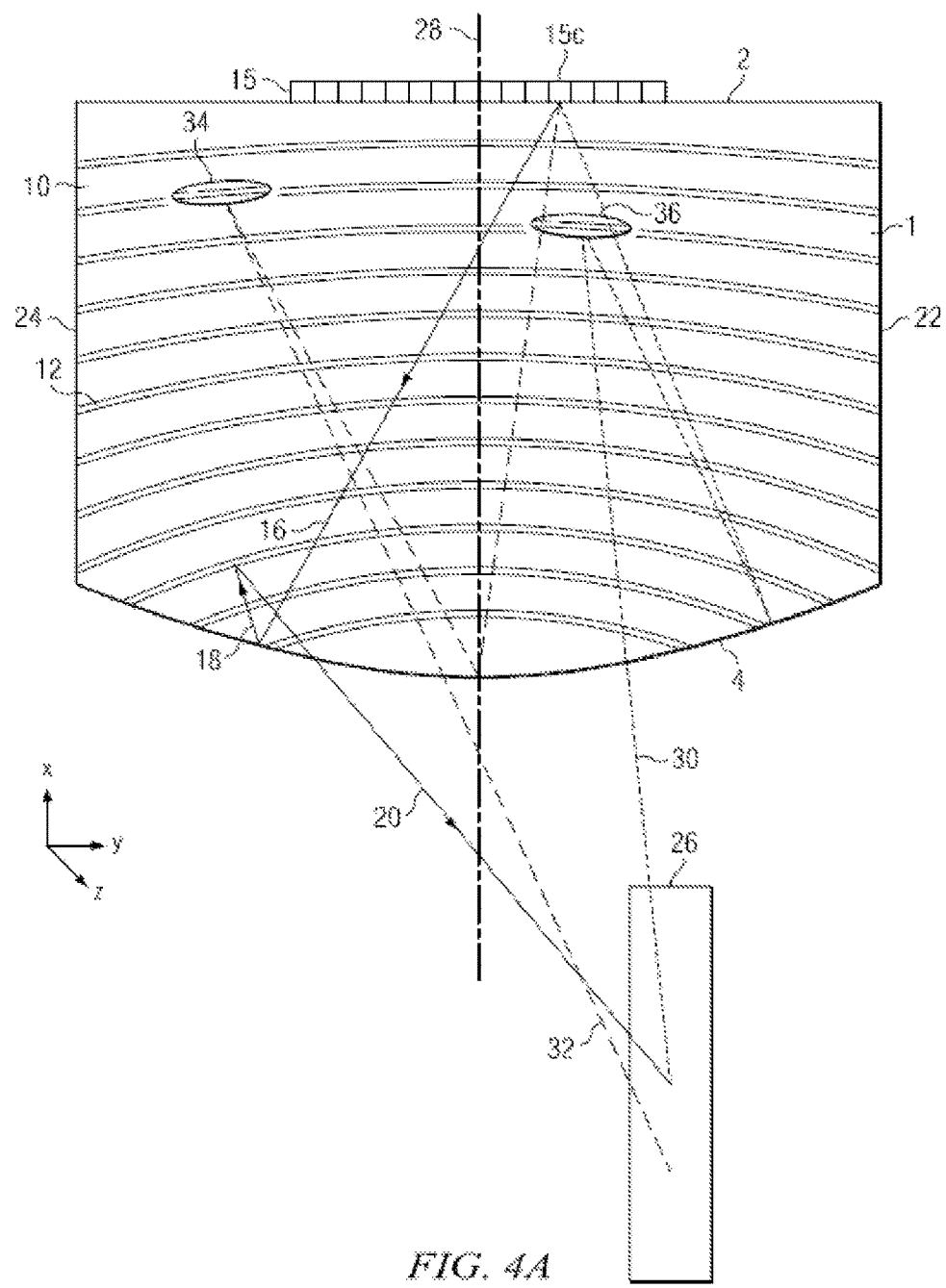
FIG. 4A is a schematic diagram illustrating in a front view, generation of a viewing window in a directional display device and including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15c of illuminator array 15, in the stepped waveguide 1 having an optical axis 28. In FIG. 4A, the directional backlight may include the stepped waveguide 1 and the light source illuminator array 15. Each of the output rays are directed from the input side 2 towards the same viewing window 26 from the respective illuminator 15c. The light rays of FIG. 4A may exit the reflective side 4 of the stepped waveguide 1. As shown in FIG. 4A, ray 16 may be directed from the illuminator element 15c towards the reflective side 4. Ray 18 may then reflect from a light extraction feature 12 and exit the reflective side 4 towards the viewing window 26. Thus light ray 30 may intersect the ray 20 in the viewing window 26, or may have a different height in the viewing window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8. Similar to other embodiments discussed herein, for example as illustrated in FIG. 3, the light extraction features of FIG. 4A may alternate with the guiding features 10. As illustrated in FIG. 4A, the stepped waveguide 1 may include a reflective surface on reflective side 4. In one embodiment, the reflective end of the stepped waveguide 1 may have positive optical power in a lateral direction across the stepped waveguide 1.

In another embodiment, the light extraction features 12 of each directional backlight may have positive optical power in a lateral direction across the waveguide.

In another embodiment, each directional backlight may include light extraction features 12 which may be facets of the second guide surface. The second guide surface may have regions alternating with the facets that may be arranged to direct light through the waveguide without substantially extracting it.

Figure 4B:
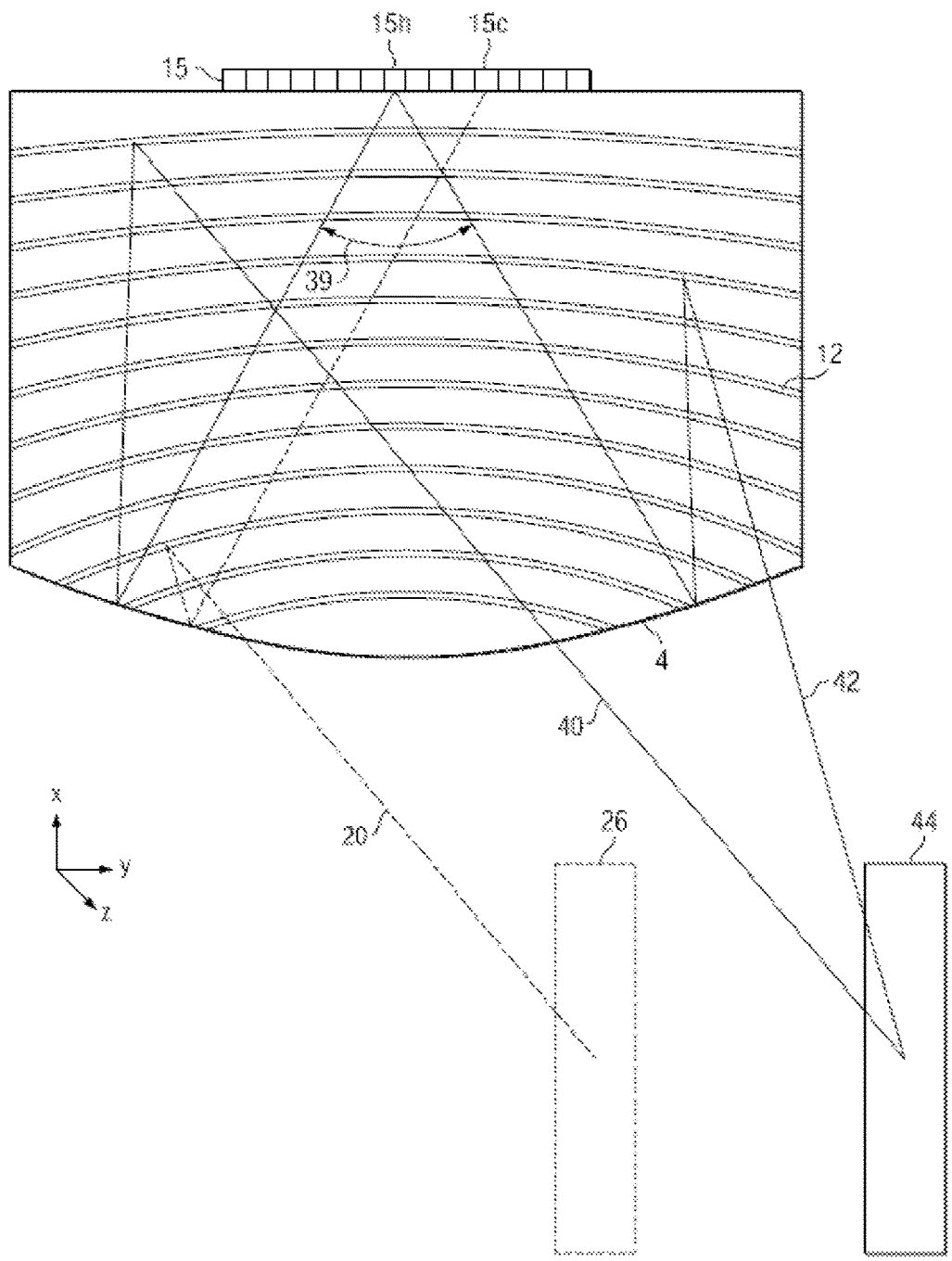
FIG. 4B is a schematic diagram illustrating in a front view, generation of a first and a second viewing window in a directional display device and including curved light extraction features, in accordance with the present disclosure.

FIG. 4B is a schematic diagram illustrating in front view a directional display device which may illuminated by a second illuminator element. Further, FIG. 4B shows the light rays 40, 42 from a second illuminator element 15h of the illuminator array 15. The curvature of the reflective surface on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
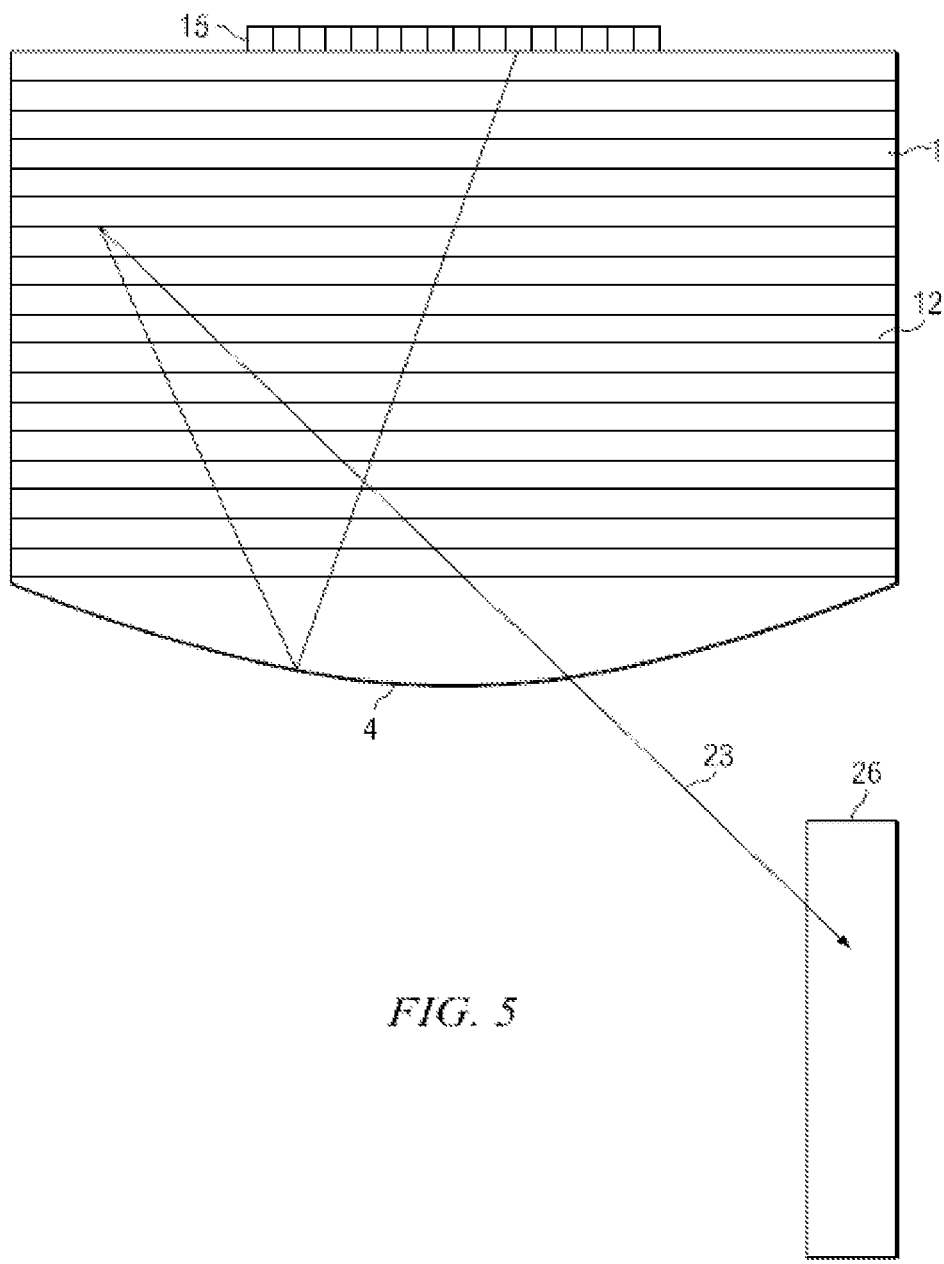
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B. The optical axis 321 of the directional waveguide 1 may be the optical axis direction of the surface at side 4. The optical power of the side 4 is arranged to be across the optical axis direction, thus rays incident on the side 4 will have an angular deflection that varies according to the lateral offset 319 of the incident ray from the optical axis 321.

Figure 6A:
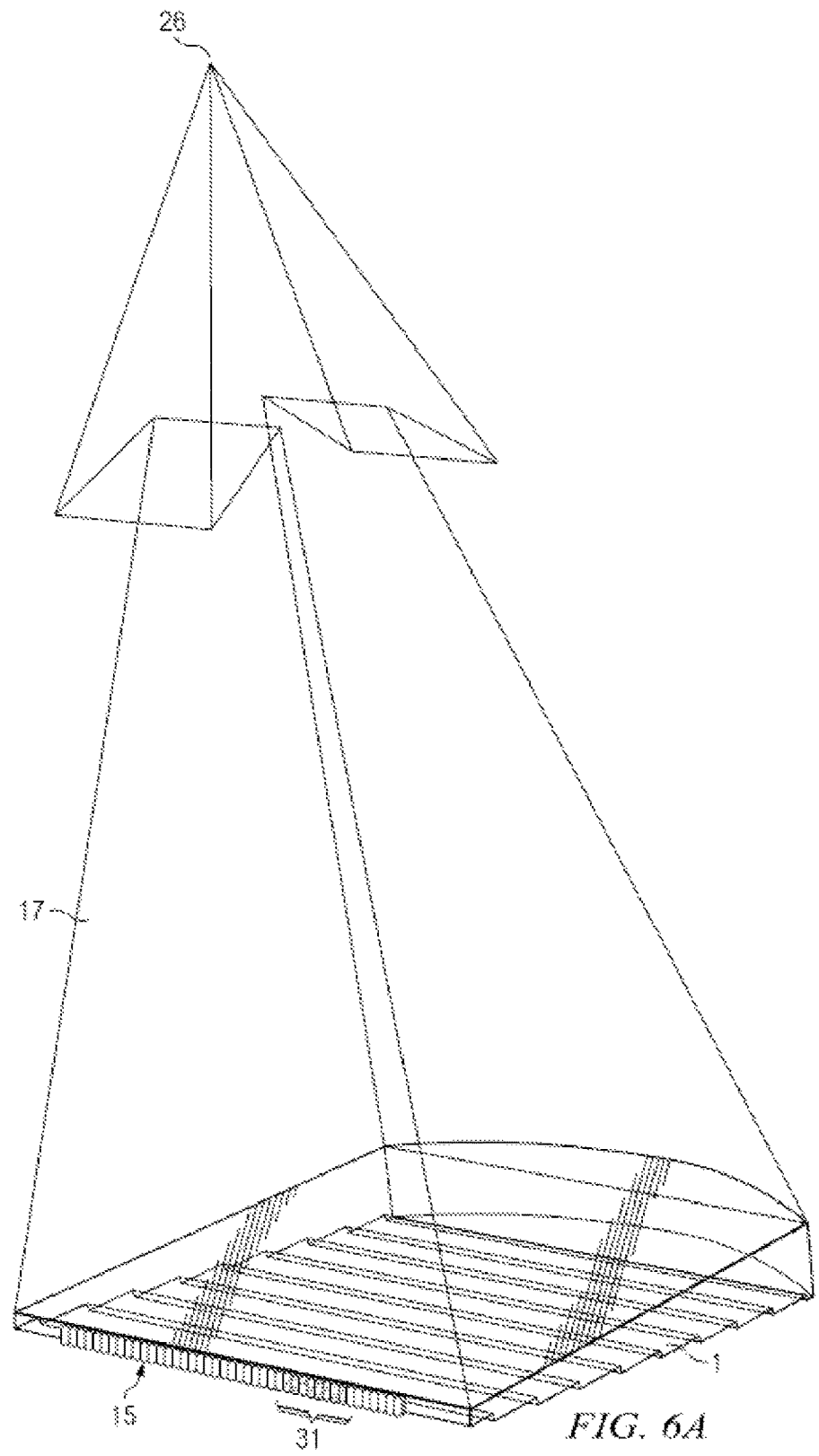
FIG. 6A is a schematic diagram illustrating one embodiment of the generation of a first viewing window in a time multiplexed directional display device, in accordance with the present disclosure.
Figure 6B:
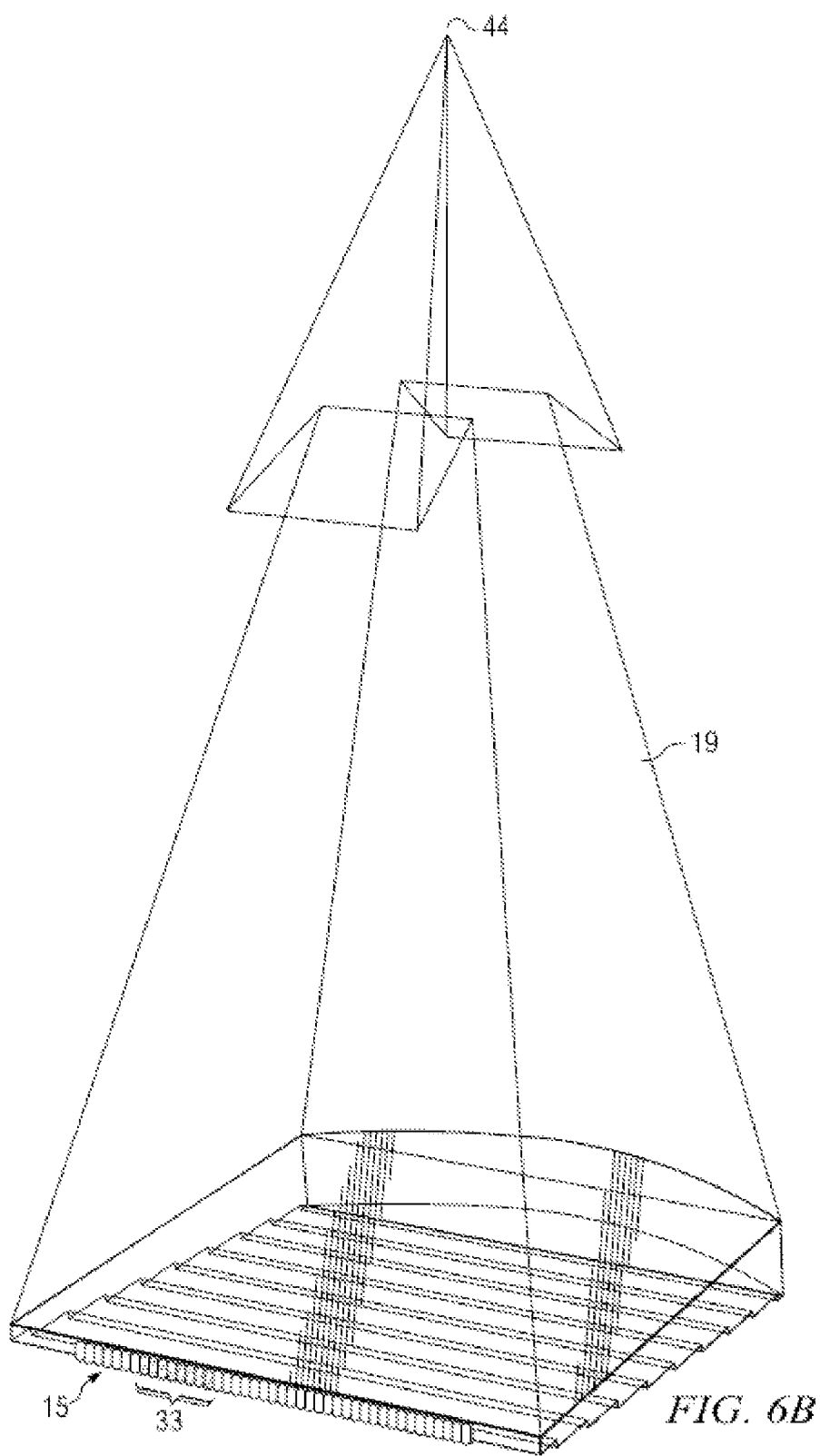
FIG. 6B is a schematic diagram illustrating another embodiment of the generation of a second viewing window in a time multiplexed directional display device in a second time slot, in accordance with the present disclosure.
Figure 6C:
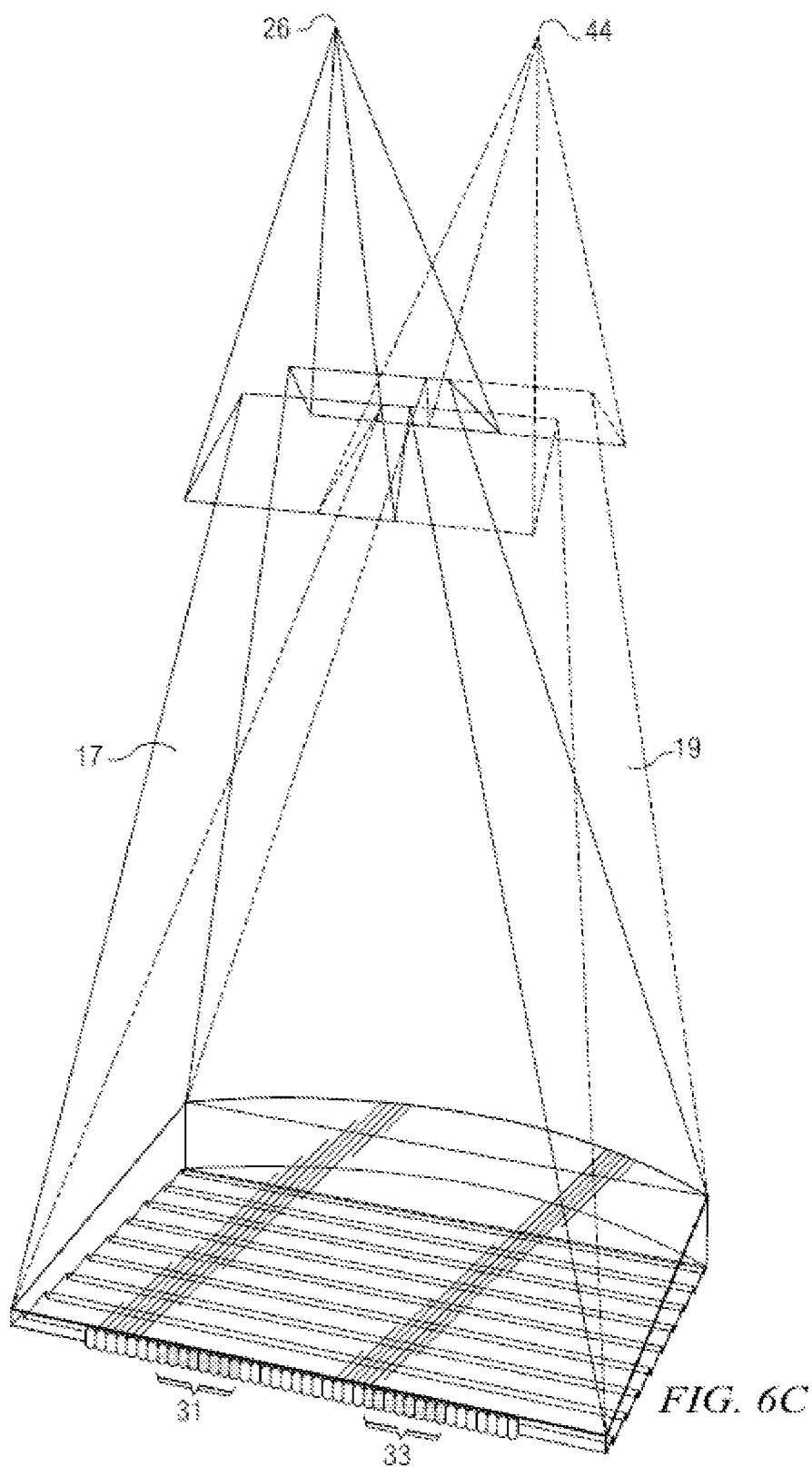
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of viewing window 26 from stepped waveguide 1. Illuminator element group 31 in illuminator array 15 may provide a light cone 17 directed towards a viewing window 26. FIG. 6B shows schematically the generation of viewing window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the imaging directional backlights described herein. Note that illuminator element groups 31, 33 each include one or more illumination elements from illumination elements 15a to 15n, where n is an integer greater than one.

Figure 7:
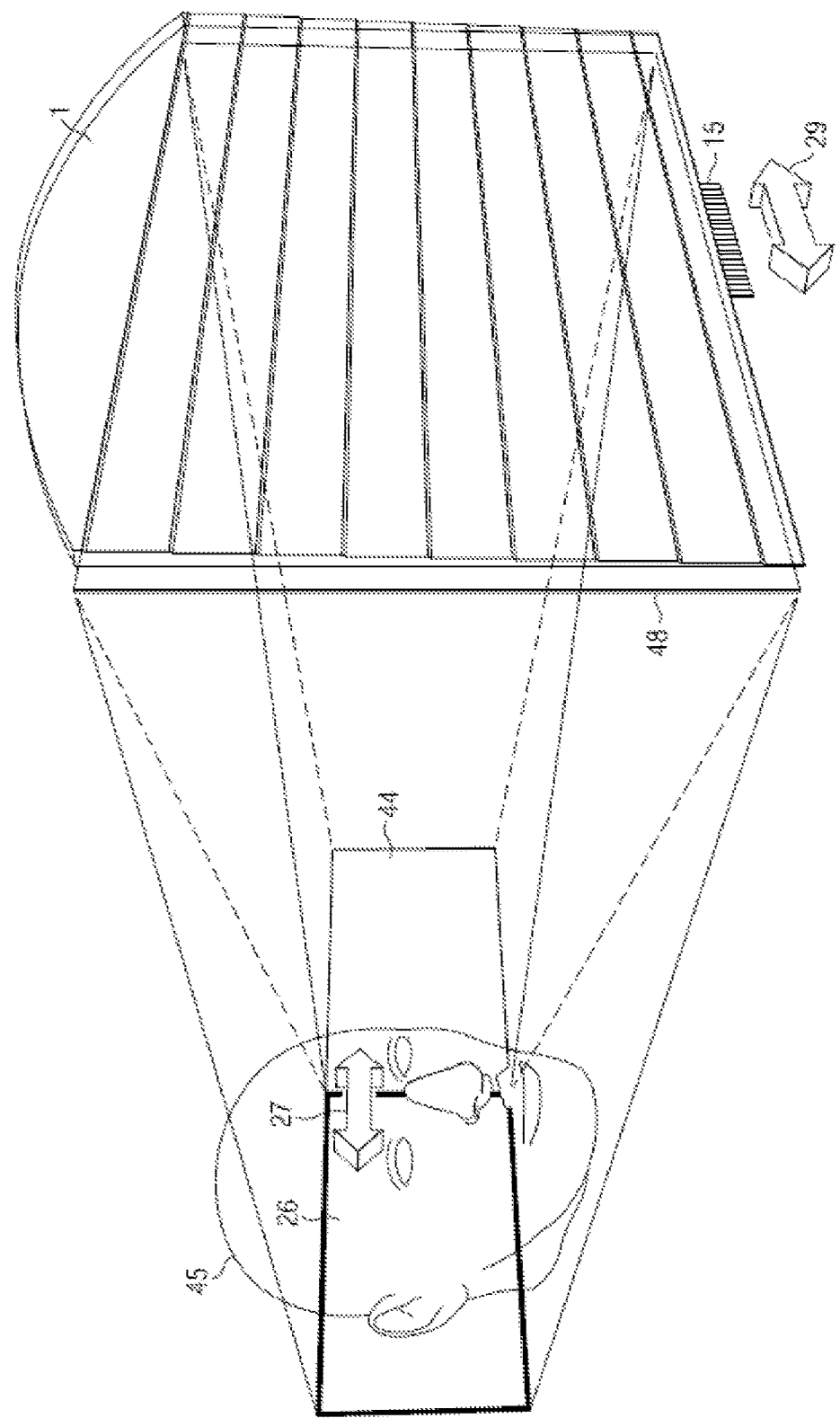
FIG. 7 is a schematic diagram illustrating an observer tracking autostereoscopic directional display device, in accordance with the present disclosure.

FIG. 7 is a schematic diagram illustrating one embodiment of an observer tracking autostereoscopic display apparatus including a time multiplexed directional display device. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the imaging directional backlights described herein.

Figure 8:
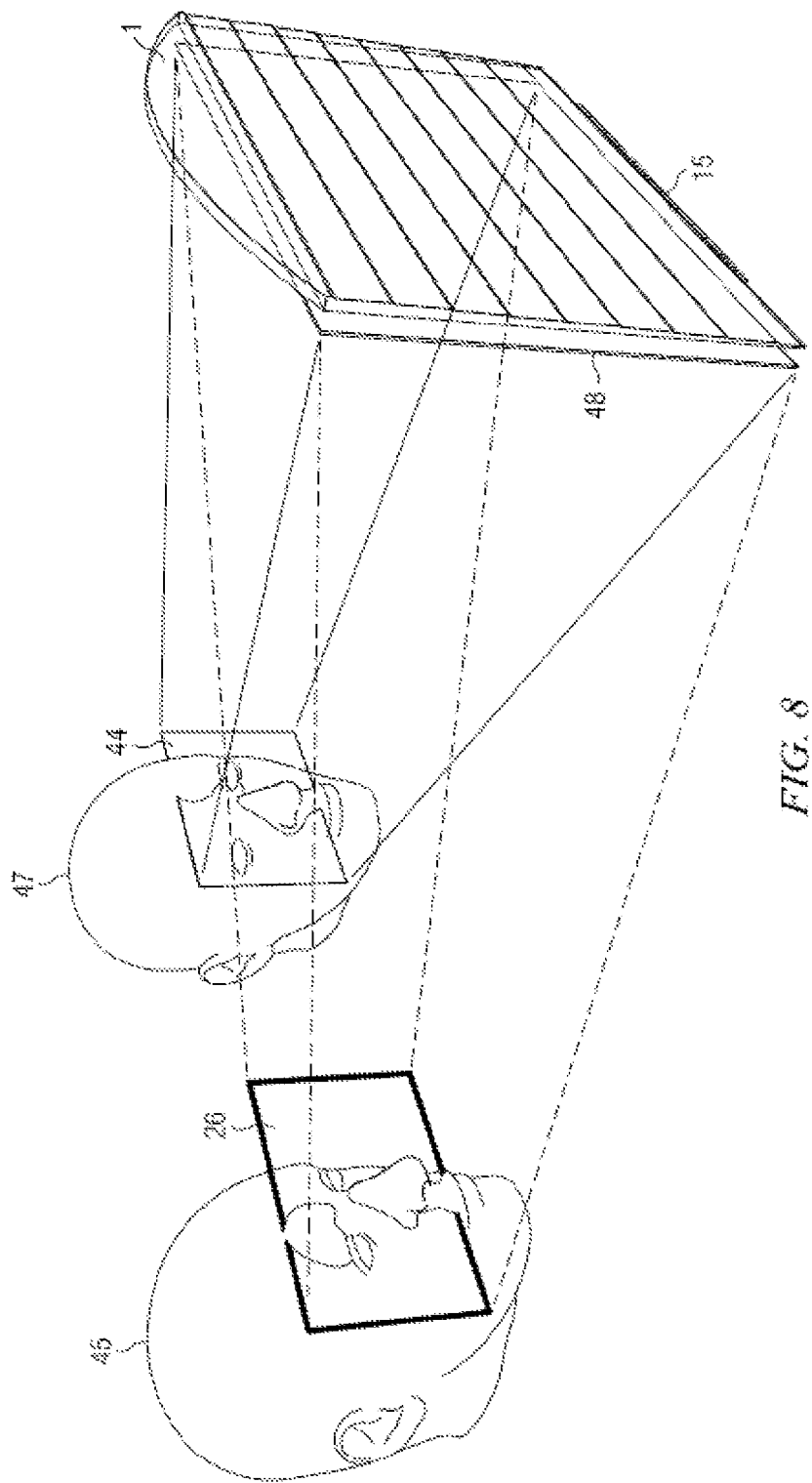
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images may be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in viewing window 26 will perceive a first image while an observer with both eyes in viewing window 44 will perceive a second image.

Figure 9:
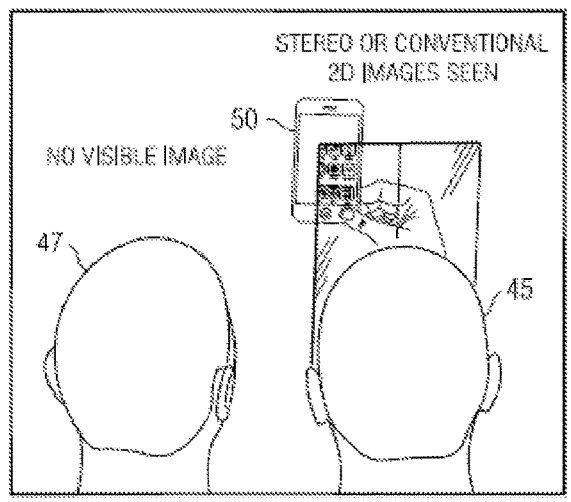
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
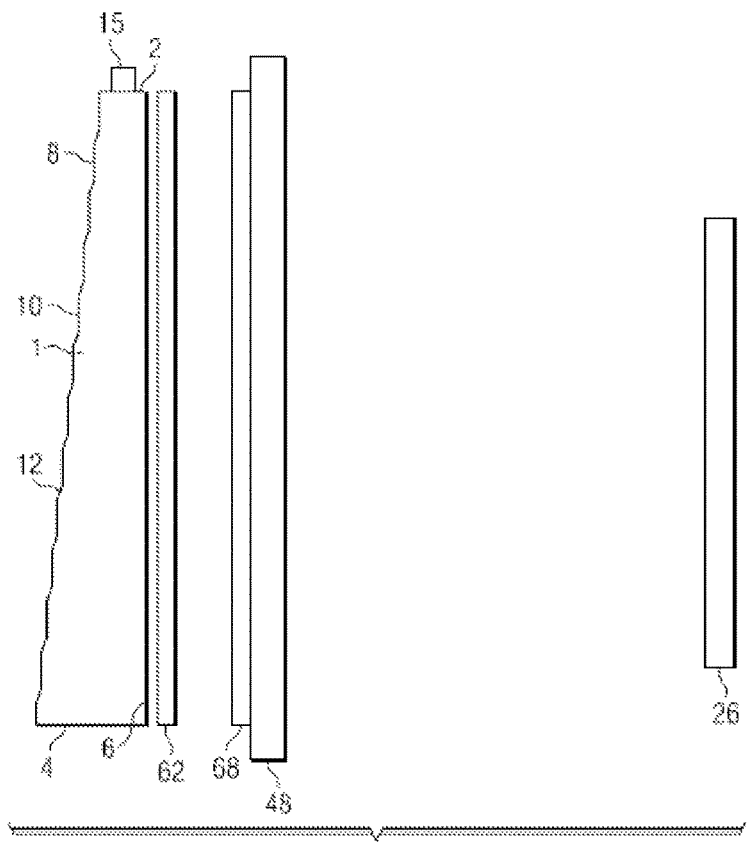
FIG. 10 is a schematic diagram illustrating in side view, the structure of a directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 for a substantially collimated output across the stepped waveguide 1 output surface. A vertical diffuser 68 may be arranged to extend the height of the viewing window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

There will now be described some waveguides, directional backlights and directional display devices that are based on and incorporate the structures of FIGS. 1 to 10 above. Except for the modifications and/or additional features which will now be described, the above description applies equally to the following waveguides, directional backlights and display devices, but for brevity will not be repeated. The waveguides described below may be incorporated into a directional backlight or a directional display device, 2D display device, or 3D display device as described above. Similarly, the directional backlights described below may be incorporated into a directional display device as described above.

Figure 11:
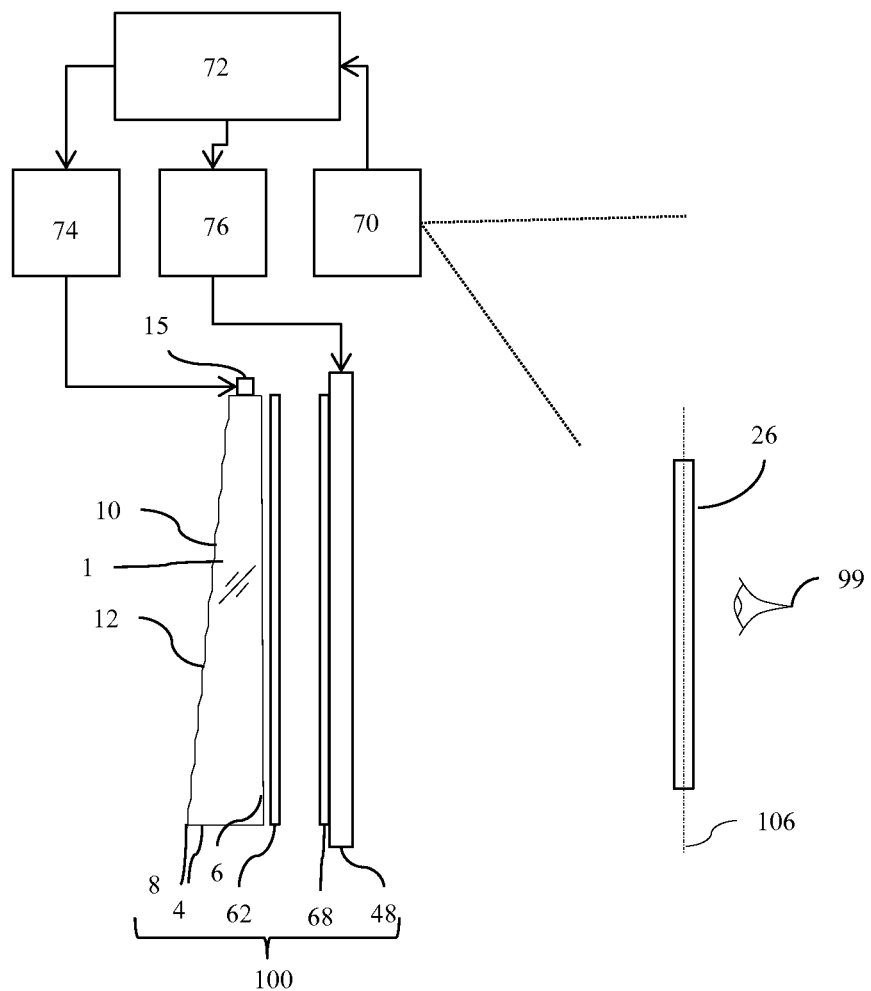
FIG. 11 is a schematic diagram illustrating control system for an observer tracking directional display apparatus, in accordance with the present disclosure.

FIG. 11 is a schematic diagram illustrating a directional display apparatus comprising a display device 100 and a control system. The arrangement and operation of the control system will now be described and may be applied, with changes as appropriate, to each of the display devices disclosed herein.

The directional display device 100 comprises a directional backlight that comprises waveguide 1 and an array of illuminator elements 15 arranged as described above. The control system is arranged to selectively operate the illumination elements 15a-15n to direct light into selectable viewing windows.

The waveguide 1 is arranged as described above. The reflective end 4 converges the reflected light. A Fresnel lens 62 may be arranged to cooperate with reflective end 4 to achieve viewing windows 26 at a viewing plane 106 observed by an observer 99. A transmissive spatial light modulator (SLM) 48 may be arranged to receive the light from the directional backlight. Further a diffuser 68 may be provided to substantially remove Moiré beating between the waveguide 1 and pixels of the SLM 48 as well as the Fresnel lens 62.

As illustrated in FIG. 11, a directional backlight may include a stepped waveguide 1 and a light source illuminator array 15. As illustrated in FIG. 11, the stepped waveguide 1 includes a light directing side 8, a reflective side 4, guiding features 10 and light extraction features 12.

The control system may comprise a sensor system arranged to detect the position of the observer 99 relative to the display device 100. The sensor system comprises a position sensor 70, such as a camera, and a head position measurement system 72 that may for example comprise a computer vision image processing system. The control system may further comprise an illumination controller 74 and an image controller 76 that are both supplied with the detected position of the observer supplied from the head position measurement system 72.

The illumination controller 74 selectively operates the illuminator elements 15 to direct light to into the viewing windows 26 in cooperation with waveguide 1. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 76 controls the SLM 48 to display images. To provide an autostereoscopic display, the image controller 76 and the illumination controller 74 may operate as follows. The image controller 76 controls the SLM 48 to display temporally multiplexed left and right eye images. The illumination controller 74 operate the light sources 15 to direct light into viewing windows in positions corresponding to the left and right eyes of an observer synchronously with the display of left and right eye images. In this manner, an autostereoscopic effect is achieved using a time division multiplexing technique.

The above descriptions may apply to each or all of the following apparatuses, modifications and/or additional features, individually, or any combination thereof, which will now be described.

In another embodiment, a directional display apparatus may further include a control system which may be arranged to selectively operate the light sources to direct light into viewing windows corresponding to output directions as previously discussed. This embodiment may also be used in conjunction with any of the directional backlights, directional display devices, directional display apparatuses, and so forth as described herein.

In another embodiment, a directional display apparatus may be an autostereoscopic display apparatus with a control system. The control system may be further arranged to control the directional display device to temporally display multiplexed left and right images and to substantially synchronously direct the displayed images into viewing windows in positions corresponding to at least the left and right eyes of an observer. The control system may include a sensor system which may be arranged to detect the position of an observer across the display device, and also may be arranged to direct the displayed images into viewing windows in positions corresponding to at least the left and right eyes of an observer. The position of the viewing windows may primarily depend on the detected position of the observer.

Figure 12:
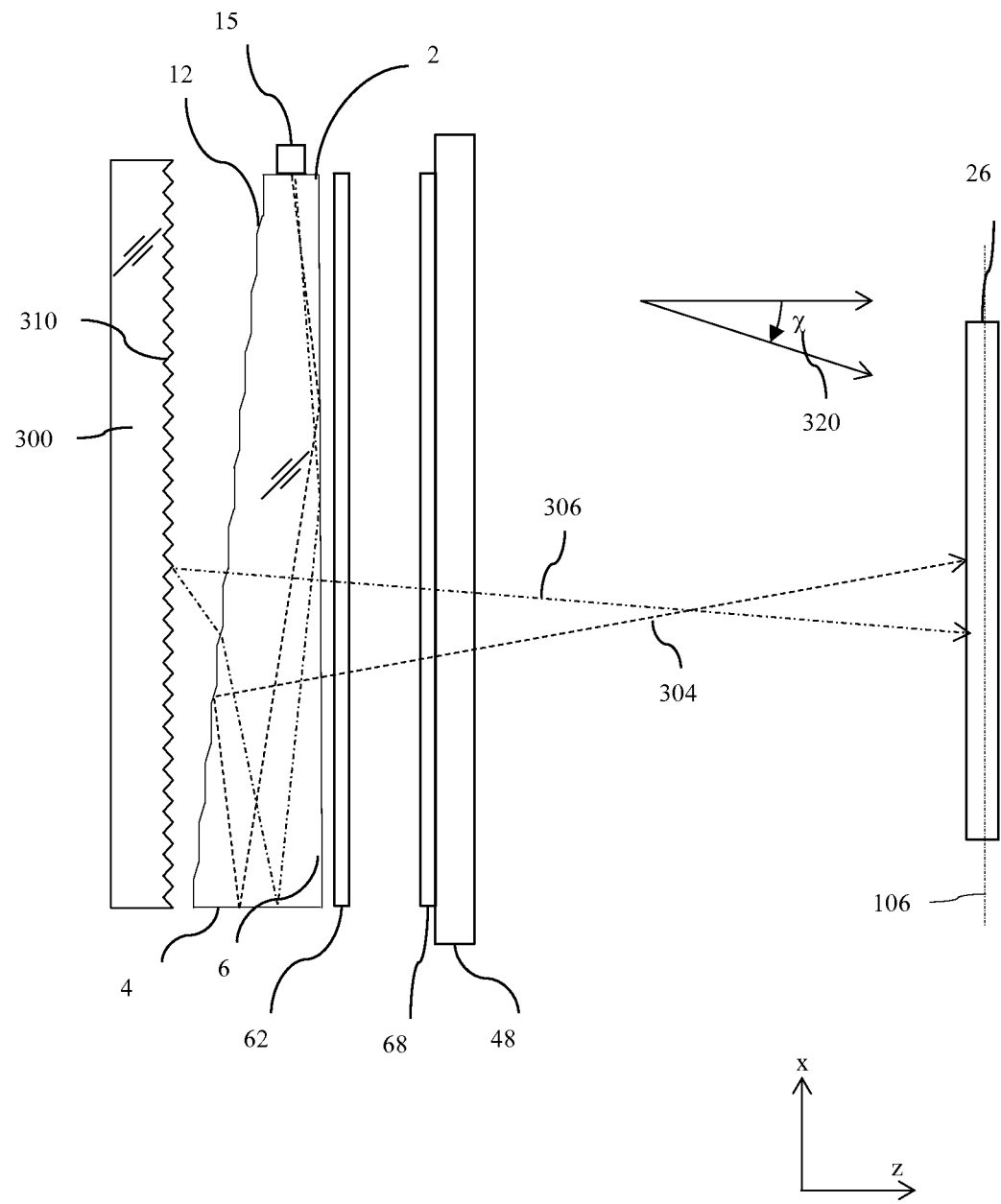
FIG. 12 is a schematic diagram illustrating a side view of a directional display device with a rear reflector with an array of reflective facets, in accordance with the present disclosure.

FIG. 12 is a schematic diagram illustrating a side view of a directional display device with a rear reflector 300. The directional display device may include a directional backlight and a transmissive spatial light modulator. The rear reflector 300 may include an array of reflective facets 310. The array is a linear array in that it repeats in a linear direction (e.g. vertically in FIG. 12). Light rays 304 that are reflected from light extraction features 12 of the waveguide 1 are directed to a vertical viewing position in the viewing window 26, with an angular distribution in the $\chi$ direction. Light rays that are reflected from light extraction 306 that are transmitted through the features 12 are lost to the system, or may interact with materials behind the display and scatter to produce undesirable cross talk between respective viewing windows.

In the present disclosure an optical window refers to the image of a single light source in the window plane. By way of comparison, a viewing window 26 is a region in the window plane 106 in which light is provided and which may include image data of substantially the same image from across the display area. Thus a viewing window may be formed from multiple optical windows. Typically the optical windows have a small lateral extent (y-axis direction) and a large extent in a vertical direction orthogonal to the lateral extent (x-axis direction).

In the present embodiment, light rays 306 that are transmitted through the features 12 are incident on the reflective facets of rear reflector 300. The light rays 306 are thus redirected towards the viewing window 26. For a given light source of the array 15, the lateral extent and position of the respective optical windows for rays 304, 306 is substantially the same; however the distribution of light in the vertical direction may be different for light ray bundles directed by reflection or transmission at features 12.

A directional backlight may thus include a waveguide and an array of light sources disposed at different input positions in a lateral direction across the input end of the waveguide. The waveguide may have an input end, may include first and second opposed guide surfaces for guiding light along the waveguide, and a reflective end facing the input end for reflecting the input light back through the waveguide. The first guide surface may be arranged to guide light by total internal reflection and the second guide surface may have a stepped shape which may include a plurality of facets oriented to reflect light from the light sources, after reflection from the reflective end, through the first guide surface into optical windows in output directions. The output directions may be distributed in a lateral direction to the normal to the first guide surface in dependence on the input positions, and intermediate regions between the facets that are arranged to direct light through the waveguide without extracting it. The directional backlight may also include a rear reflector which may include a linear array of reflective facets arranged to reflect light from the light sources that is transmitted through the plurality of facets of the waveguide, back through the waveguide to exit through the first guide surface into the optical windows.

A directional display device may thus also include a directional backlight and a transmissive spatial light modulator arranged to receive the output light from the first guide surface. A display apparatus may thus also include a directional display device, and a control system arranged to selectively operate the light sources to direct light into viewing windows corresponding to the output directions. The display apparatus may be an autostereoscopic display apparatus in which the control system is further arranged to control the display device to display temporally multiplexed left and right images and synchronously to direct the displayed images into viewing windows in positions corresponding to left and right eyes of an observer. The control system may further include a sensor system arranged to detect the position of an observer across the display device. The control system may be arranged to direct the displayed images into viewing windows in positions corresponding to left and right eyes of an observer, in dependence on the detected position of the observer.

Advantageously, the optical windows and viewing windows 26 achieved by the rays 304, 306 may substantially overlap in the lateral direction. Thus the cross talk of the display may be substantially maintained. Further the total intensity of light rays directed to viewing window 26 may be increased and the display brightness may be increased. The battery lifetime of a mobile display device may be increased, and the cost and number of light sources may be reduced for a desired brightness level. Further cross talk from unwanted transmitted light through features 12 is reduced or eliminated. Further, the reflector 300 may be formed in a thin film that may be mounted in the case of a display system, thus minimizing cost and thickness. Alternatively the structure of the reflector 300 may be formed on a rear case of the backlight, for example by molding the structure of the reflector 300 as part of the display case and then coating with a metallization layer. Advantageously this may provide a stiff and flat structure, achieving high window quality for the viewing windows 26 that are reflected from the reflector 300.

Figure 13:
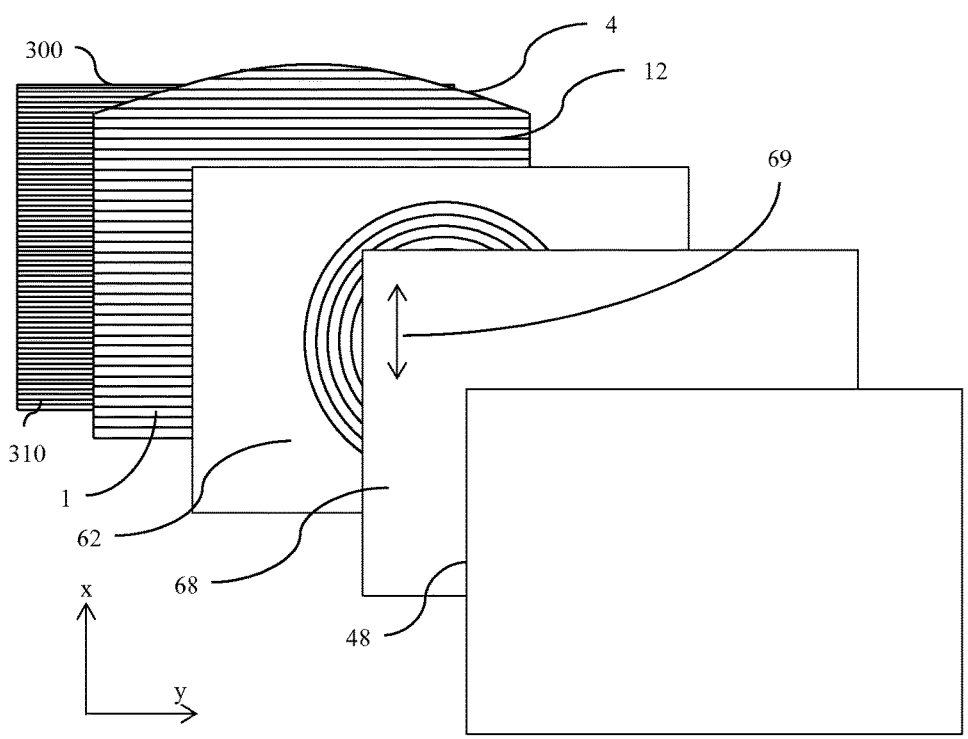
FIG. 13 is a schematic diagram illustrating a front view of a directional display device with a waveguide with linear light extraction features and a rear reflector with an array of linear reflective facets, in accordance with the present disclosure.

FIG. 13 is a schematic diagram illustrating a front view of a directional display device including a waveguide 1 with linear light extraction features 12 and a rear reflector 300 including an array of linear reflective facets 310. The array is a linear array in that it repeats in a linear direction, for example vertically in FIG. 13. The directional display device may include a directional backlight and a transmissive spatial light modulator. The features 12 may be arranged substantially parallel to the orientation of the reflective facets 310, advantageously achieving viewing windows that are substantially aligned with the same orientation for respective rays 304, 306.

The facets of the waveguide 12 and the reflective facets 310 of the rear reflector 300 may be inclined in the same sense in a common plane orthogonal to the lateral direction. In this example, the reflective facets 310 are linear, that is they extend linearly across the rear reflector 300, for example horizontally in FIG. 13. The reflective end 4 may have positive optical power in a lateral direction across the waveguide 1. Thus light from light source array 15 may have a divergence that is reduced to achieve filling of the area of the spatial light modulator 48 by light from the waveguide 1. The positive optical power may be arranged to substantially collimate light within the waveguide 1 and a Fresnel lens 62 with optical power in the same direction as the positive optical power of the reflective end 4 may be arranged to form viewing windows in the window plane. Asymmetric diffuser 68 with a major diffusion axis direction 69 may be arranged to achieve high diffusion in the direction orthogonal (x axis) to the lateral direction in which the optical windows and viewing windows are arranged (y axis). Advantageously the viewing window 26 can be diffused in the orthogonal direction while achieving low cross talk in the lateral direction.

Figure 14:
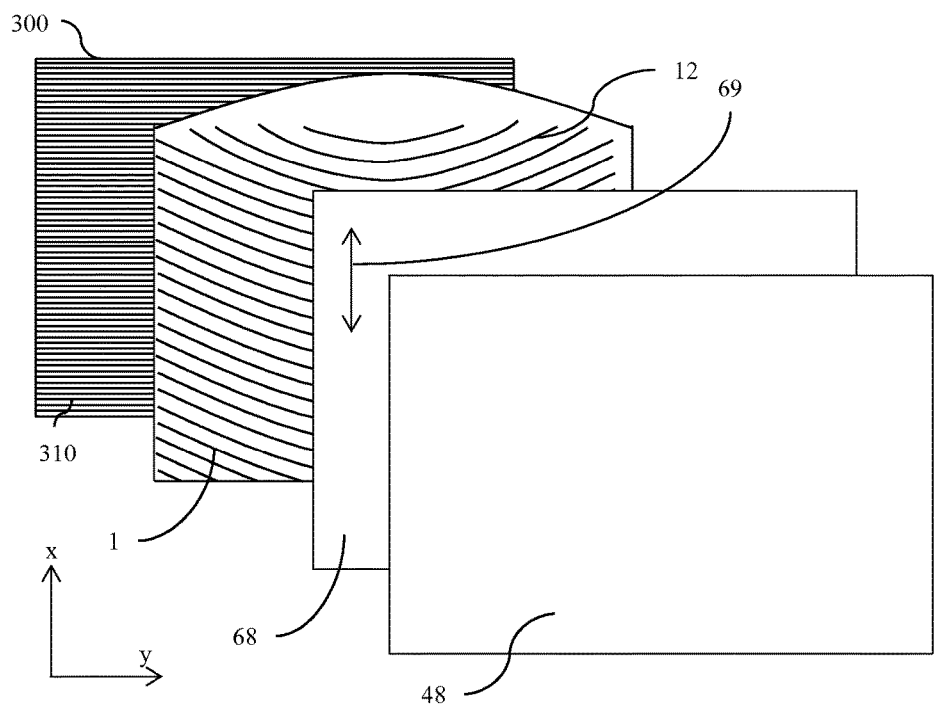
FIG. 14 is a schematic diagram illustrating a front view of a directional display device with a waveguide with curved light extraction features and a rear reflector with an array of linear reflective facets, in accordance with the present disclosure.

FIG. 14 is a schematic diagram illustrating a front view of a directional display device including a waveguide 1 with curved light extraction features 12 and a rear reflector 300 including an array of linear reflective facets 310. The directional display device may include a directional backlight and a transmissive spatial light modulator. The curved features 12 may be arranged to achieve viewing windows 26 at the window plane 106 without a Fresnel lens and may have a substantially uniform first radius of curvature in the x-y plane. Advantageously the thickness of the system and light losses due to additional surfaces can be reduced. Further the reflector 300 can be cut from a large continuous sheet of material compared to an arrangement wherein the reflective facets 310 are curved as will be described below, thus reducing cost.

Figure 15A:
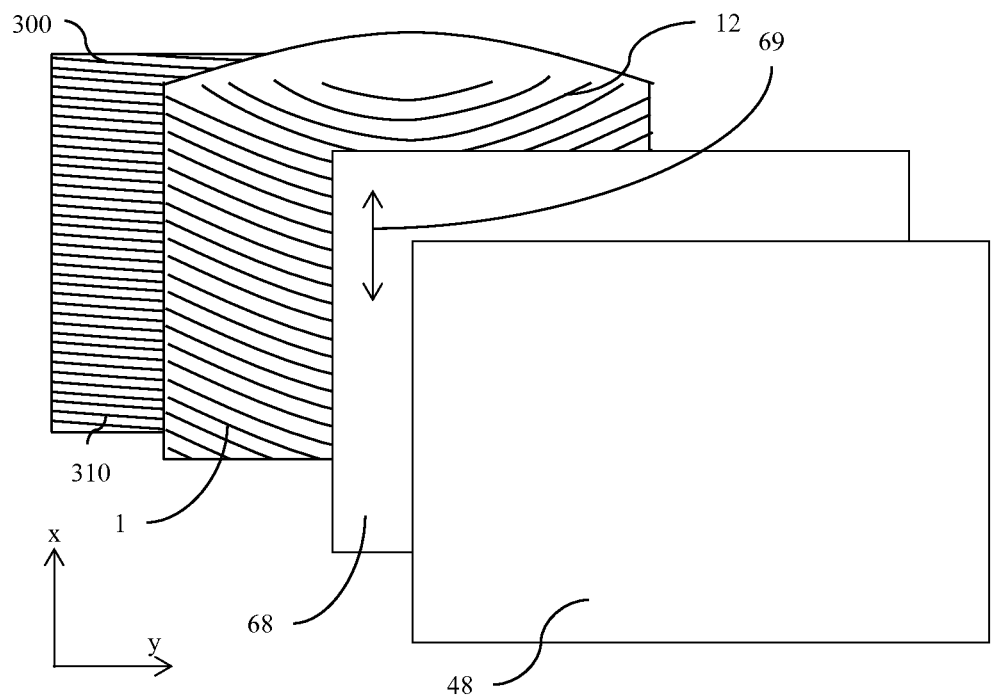
FIG. 15A is a schematic diagram illustrating a front view of a directional display device with a waveguide with curved light extraction features and a rear reflector with an array of curved reflective facets, in accordance with the present disclosure.

FIG. 15A is a schematic diagram illustrating a front view of a directional display device including a waveguide 1 with curved light extraction features 12 with a first radius in the x-y plane and a rear reflector 300 including an array of curved reflective facets 310. The array is a linear array in that it repeats in a linear direction, for example vertically in FIG. 15A. In this example, the reflective facets 310 extend across the rear reflector 300, for example horizontally in FIG. 15A, but are curved, not linear. In particular, the reflective facets 310 have a second radius in the x-y plane that may be approximately twice the first radius, arranged to direct light rays 306 of FIG. 12 to the same viewing window as light rays 304 without a Fresnel lens 62. The directional display device may include a directional backlight and a transmissive spatial light modulator. The reflective facets 310 may be arranged to cooperate with the curved light extraction features 12 so that the lateral direction of reflection of light rays 306 from reflective facets 310 is substantially the same as the lateral direction of reflection of light rays 304 from features 12. In this manner, the optical windows 26 produced by rays 304, 306 may be substantially overlapped. Advantageously the cross talk may be reduced while the display brightness may be increased.

Figure 15B:
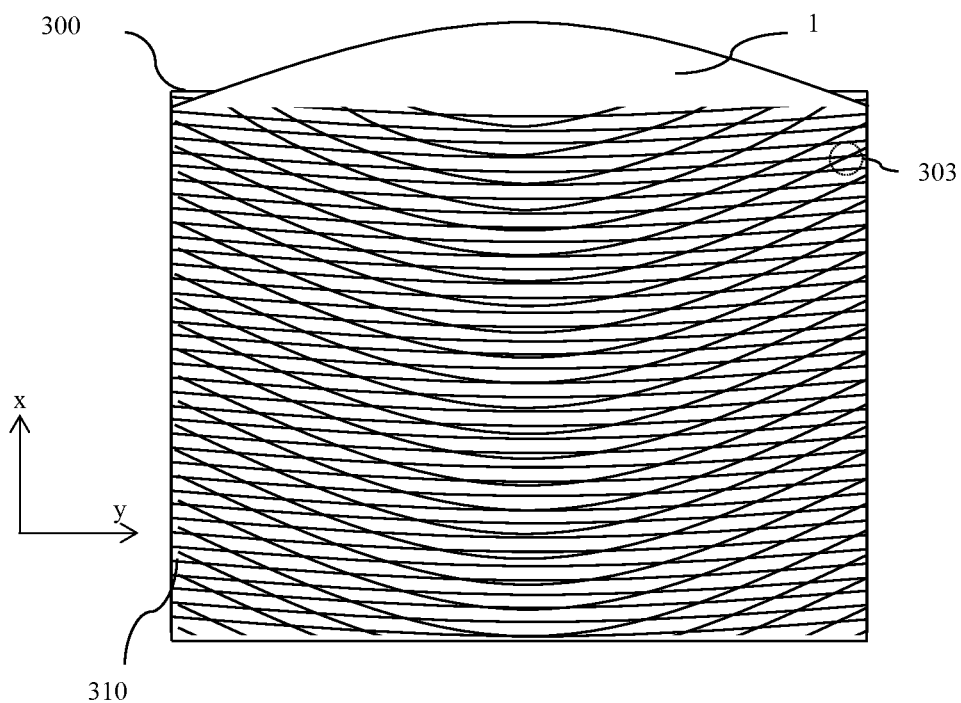
FIG. 15B is a schematic diagram illustrating a front view of a directional backlight including the waveguide and rear reflector of FIG. 15A, in accordance with the present disclosure.

FIG. 15B is a schematic diagram illustrating a front view of a directional display device including the waveguide 1 and rear reflector 300 of FIG. 15A, with the components shown as overlapping. The directional display device may include a directional backlight and a transmissive spatial light modulator. In region 303, the high point of the reflector 300 is contacted to the light extraction feature 12 of the waveguide 1. The area of the contact will be small and so light leakage due to loss of total internal reflection in the region 303 is minimized. Thus, the reflector 300 may be arranged in contact with the waveguide 1. Advantageously, the thickness of the structure may be reduced and uniform flatness of the reflector 300 achieved by structural support of the waveguide 1.

It may be desirable to reduce Moiré beating may occur between the rear reflector 300, extraction features, 12 and pixels of the spatial light modulator 48.

Figure 15C:
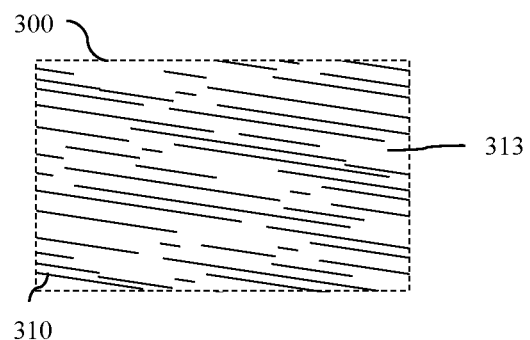
FIG. 15C is a schematic diagram illustrating a front view of a rear reflector comprising randomized reflective facets, in accordance with the present disclosure.

In the above described examples, the rear reflectors comprise a regular array of reflective facets 310 with a constant pitch. In contrast, FIG. 15C is a schematic diagram illustrating a front view of a rear reflector 300 comprising a randomized, irregular array of reflective facets 310 that have an irregular, randomized pitch. The facets 310 may be arranged to disrupt the appearance of Moiré beating in the display device. Regions 313 between the facets 310 may be arranged to be directly reflective, transmissive or absorbing.

Figure 16:
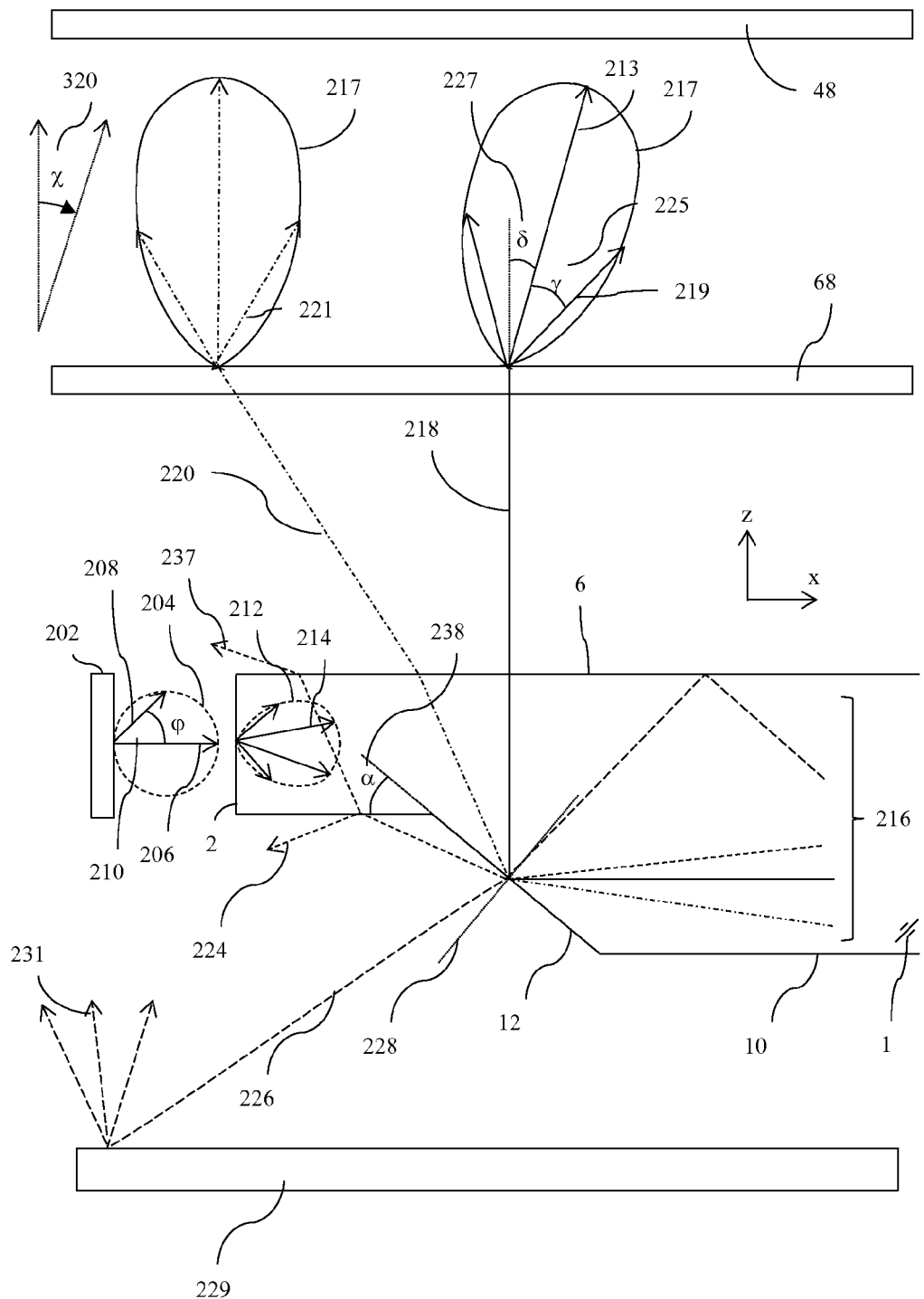
FIG. 16 is a schematic diagram illustrating a side view of a directional display device with a waveguide, in accordance with the present disclosure.

FIG. 16 is a schematic diagram illustrating a side view of a directional display device including a waveguide 1. The directional display device may include a directional backlight and a transmissive spatial light modulator. Light source 202 which may be an LED for example may be arranged to produce a substantially Lambertian optical output in air, shown by polar intensity profile 204 so that on-axis ray 206 has a greater intensity than ray 208 inclined at an angle φ 210 to the normal direction. After passing through the input side 2 of the waveguide 1, the polar intensity profile 212 for rays 214 in the waveguide 1 is modified from polar intensity profile 204 due to refraction at the input side 2. Thus the maximum angular extent φ 210 is set to be the critical angle $\theta_c$ of the material of the waveguide of the waveguide 1. Light rays 214 propagate along the waveguide 1 by total internal reflection and after reflection at the side 4 of the waveguide 1 (not shown), light ray bundle 216 returns towards the light extraction features 12.

In an illustrative example, for a tilt angle α 238 from the horizontal of the light extraction filter of 45°, horizontally (parallel to x-axis) propagating ray 218 in the waveguide 1 is redirected in a vertical direction (parallel to z-axis) and through the side 6 of the waveguide 1 to an asymmetric diffuser 68. Diffuser 68 may include an optical function that may be arranged to redirect a parallel beam with a polar intensity profile 217 with a tilt angle δ 227 and cone angle γ 225. Cone angle γ 225 may for example be the half angle of rays 219 with half intensity of the peak rays 213 of diffuser 68 in the z-x plane. In a further illustrative example, tilt angle δ 227 may be set to be 15° and cone angle γ 225 may be set to be 10°. Similarly ray 220 is redirected and diffused in the x-z plane producing half intensity ray 221 directions as shown.

Further, some rays 226 may be transmitted by light extraction feature 12 so that they are incident on a surface 229 (such as the back case of the display) whereon they scatter to form rays 231. Such rays 231 may be scattered in a manner that they fall outside the desired viewing windows for the light source 202 and can create unwanted image cross talk. Further rays 224 may be partially reflected at the side 10 and redirected towards surface 229 where they may further scatter light. Refracted rays 237 may have high angle within the display and cause unwanted off-axis illumination and may scatter with edges of the display increasing cross talk and reducing display uniformity. Further such rays may be absorbed at surface 229, reducing display brightness It may be desirable to reduce image cross talk and increase display brightness by means of rear reflector 300 including an array of reflective facets 310 as will be described in further detail below.

The luminous intensity of a display device is a measure of the power emitted by the display device in a particular direction per unit solid angle. The brightness of the display device 100 as perceived by the observer 99 is elicited by the luminance which is a photometric measure of the luminous intensity per unit area of light traveling in a given direction. The illuminator elements of the array 15 provide respective luminous flux.

Figure 17:
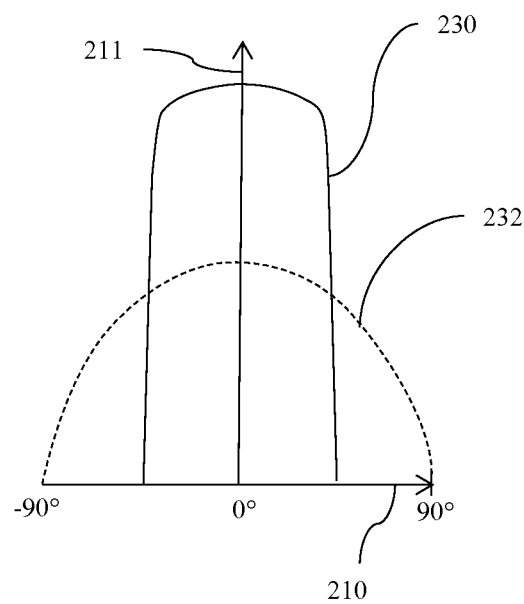
FIG. 17 is a schematic diagram illustrating a graph of luminous intensity against propagation angle outside and within a waveguide, in accordance with the present disclosure.

FIG. 17 is a schematic diagram illustrating a graph of luminous intensity against propagation angle outside and within a waveguide 1. Thus for light source 202 with a Lambertian intensity profile, intensity 211 may be plotted against angle φ 210 providing intensity curve 230 for the light cone in air and curve 232 for the refracted light cone within the optical valve.

Figure 18:
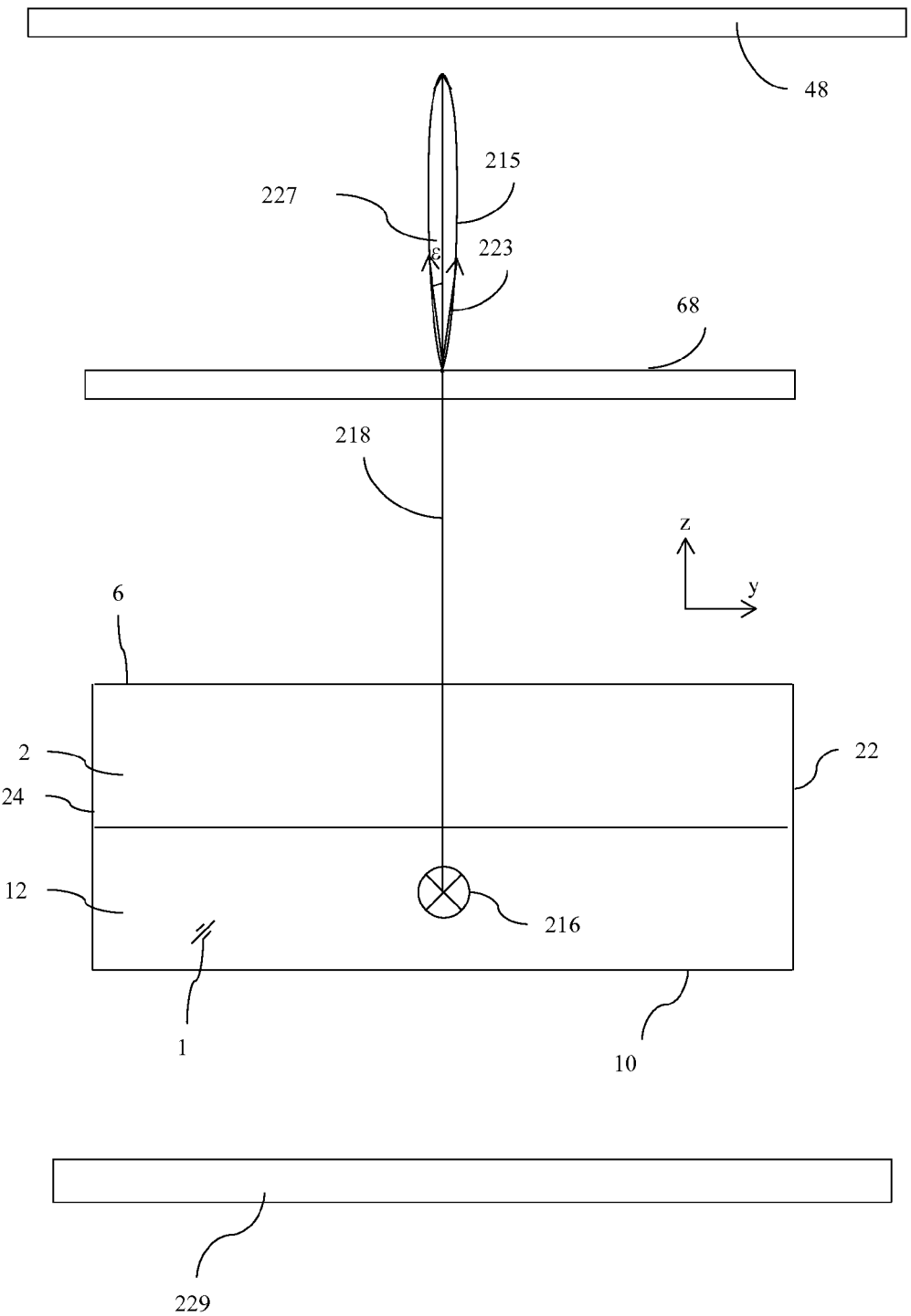
FIG. 18 is a schematic diagram illustrating a further side view of a directional display device with a waveguide, in accordance with the present disclosure.

FIG. 18 is a schematic diagram illustrating a further side view of a directional display device including a waveguide 1. The directional display device may include a directional backlight and a transmissive spatial light modulator. Thus in the z-y plane, light ray 218 is redirected by feature 12 to be parallel to the z-axis. At the asymmetric diffuser in this axis, the diffusion angle ε 227 for half intensity rays 223 in polar intensity profile 215 means that the spread of light in the y-axis is limited. For the present purposes the y-axis is termed the lateral direction and relates to the direction of the array of light sources 202 in the array 15. Thus the lateral direction is the direction in which the array of optical windows is arranged.

Figure 19A:
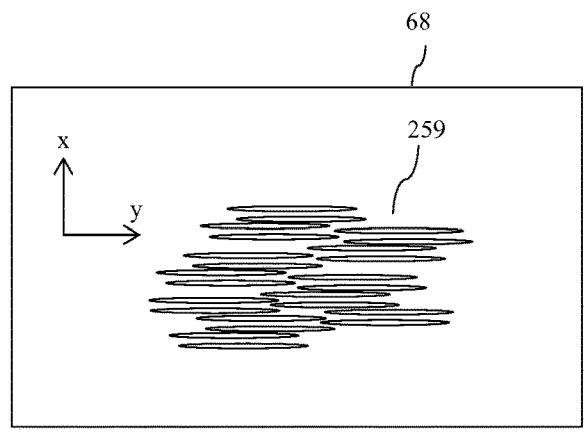
FIG. 19A is a schematic diagram illustrating front and side views of an asymmetric diffuser, in accordance with the present disclosure.
Figure 19B:
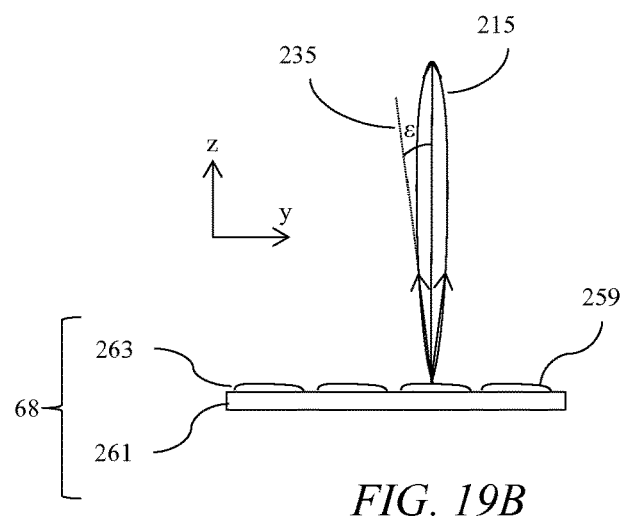
FIG. 19B is a schematic diagram illustrating front and side views of an asymmetric diffuser, in accordance with the present disclosure.
Figure 19C:
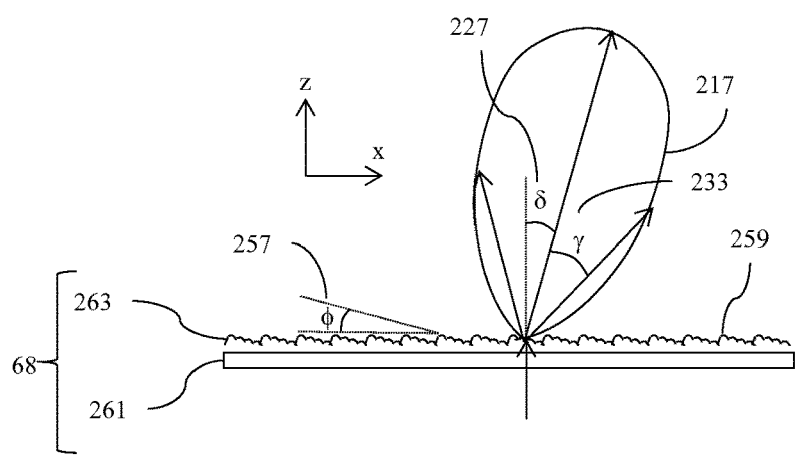
FIG. 19C is a schematic diagram illustrating front and side views of an asymmetric diffuser, in accordance with the present disclosure.

FIGS. 19A-19C are schematic diagrams illustrating front and side views of an asymmetric diffuser. The asymmetric diffuser 68 may include for example a surface relief diffuser that includes surface features with asymmetric structures 259 as shown in front view FIG. 19A. FIG. 19B shows a side view in the y-z plane so that small diffusion angle ε 235 is achieved in the lateral (y axis) direction. FIG. 19C shows a side view in the x-z plane wherein surface relief structures 259 in layer 263 may further include an array of prismatic structures with a nominal tilt angle φ 257 to achieve a diffusion cone tilt δ 227 and diffusion cone angle γ 233 in the vertical (x axis) direction. The diffusion angle γ 233 may for example be the full width half maximum of the light cone from a collimated input. For applications such as autostereoscopic display angles ε 235 may be relatively low, for example 1 to 3 degrees to achieve low cross talk. However angle ε 235 may be larger in displays that are used for 2D applications such as low power modes, high brightness modes and privacy modes, for example 3 degrees to 20 degrees or more to advantageously achieve uniform output and a desirable drop off in luminance with viewing angle for wide angle use.

The diffuser 68 may for example include, but is not limited to, a UV cured layer 263 formed on a substrate 261 that may be a glass or polymer substrate such as PET or PMMA. Alternatively the surface relief may be formed within a single material by molding. The structures may be mastered by means of diamond tooling, laser writing into photopolymer or other known mastering techniques. Alternatively the diffuser 68 may include a volume diffuser such as a photopolymer material recorded through an asymmetric photomask.

A directional backlight may further include an asymmetric diffuser 68 disposed to receive light output through the first guide surface 6, the asymmetric diffuser 68 may be arranged to provide greater angular dispersion in a direction orthogonal to said lateral direction than in said lateral direction.

Figure 20:
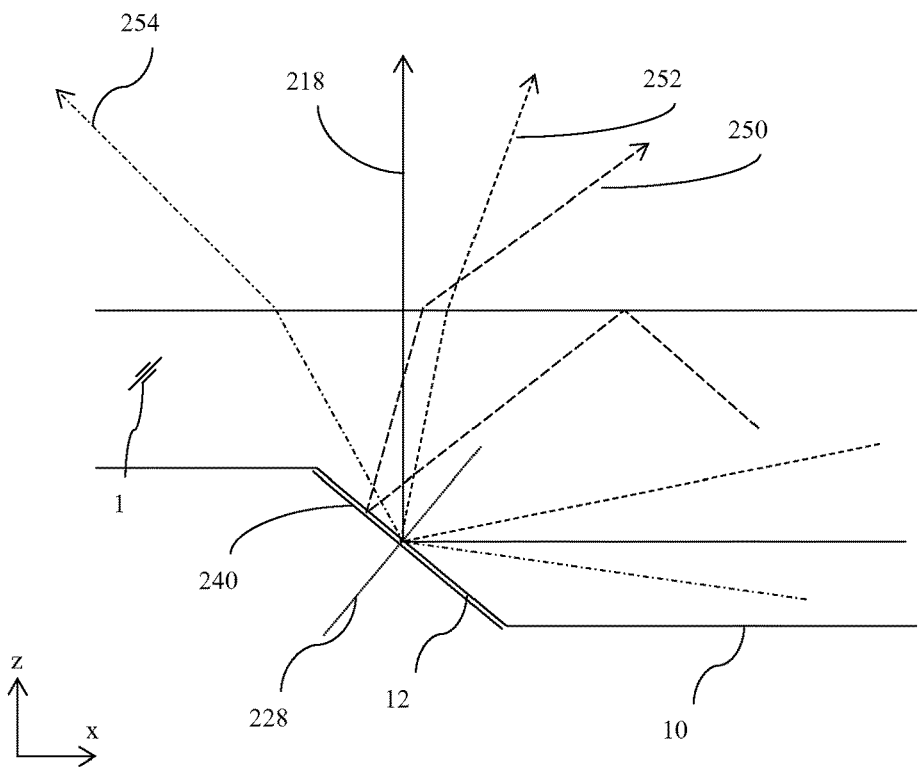
FIG. 20 is a schematic diagram illustrating a further side view of a waveguide with silvered light extraction features, in accordance with the present disclosure.

FIG. 20 is a schematic diagram illustrating a further side view of a waveguide 1 with silvered light extraction features 12. By way of comparison with the present embodiments, it may be considered that light output can be increased by coating the light extraction features with a reflective material 240. Thus in addition to light rays 218, 254 that may be achieved by total internal reflection alone, light rays 250, 252 may be directed towards the observer, achieving a substantially Lambertian output in air in the x-z plane.

Figure 21:
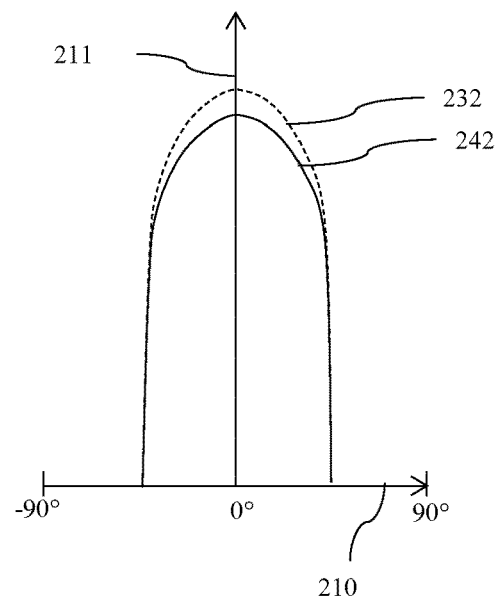
FIG. 21 is a schematic diagram illustrating a graph of luminous intensity against propagation angle outside and within the waveguide of FIG. 20, in accordance with the present disclosure.

FIG. 21 is a schematic diagram illustrating a graph of luminous intensity against propagation angle outside and within the waveguide 1 of FIG. 20. Intensity curve 242 has a lower maximum than curve 232 due to the reflection losses at the feature 12. In an illustrative example a silver coating may have a reflectivity of less than 92% compared to substantially 100% for totally internally reflected light rays. Further, the process to apply the material 240 to the features 12 alone can be complex and expensive. It may be considered that both the features 12 and 10 are coated, reducing cost and complexity. However, the absorption of material 240 when applied to the features 10 may result in substantial losses for guided light within the waveguide of the waveguide 1.

Figure 22:
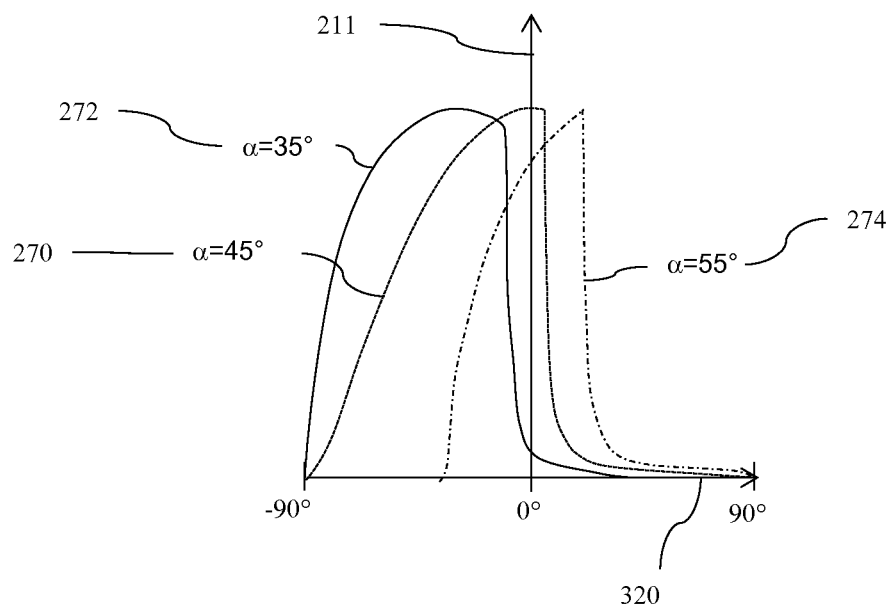
FIG. 22 is a schematic diagram illustrating a graph of luminous intensity against propagation angle for light exiting the waveguide of FIG. 16 by means of reflection from light extraction features prior to an asymmetric diffuser, in accordance with the present disclosure.

FIG. 22 is a schematic diagram illustrating a graph of luminous intensity against propagation angle for light exiting the waveguide 1 of FIG. 16 by means of reflection from light extraction features prior to an asymmetric diffuser 68 for tilt angles α 238 of 45° in curve 270, 35° in curve 272, and 55° in curve 274. Thus the width and angular cut-off point of the rays that undergo total internal reflection at feature 12 can be varied. It may typically be desirable to increase the brightness of the peak intensity and to place the peak intensity on axis at 0° or close to 0°, for example at 10° above the normal to the spatial light modulator 48 for a laterally on-axis optical window.

Figure 23:
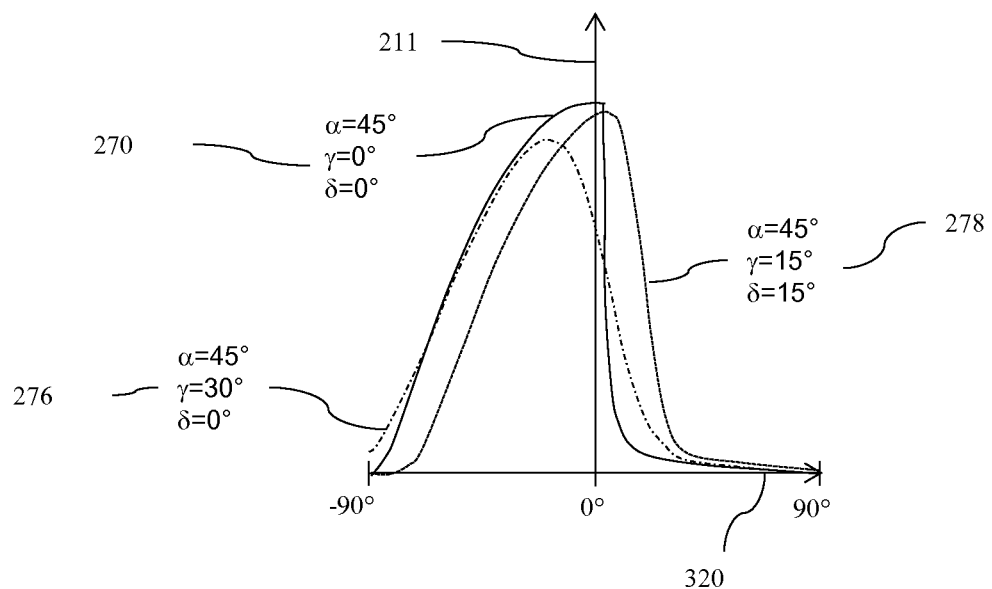
FIG. 23 is a schematic diagram illustrating a graph of luminous intensity against propagation angle for light exiting the waveguide of FIG. 16 by means of reflection from light extraction features after an asymmetric diffuser, in accordance with the present disclosure.

FIG. 23 is a schematic diagram illustrating a graph of luminous intensity against propagation angle for light exiting the waveguide 1 of FIG. 16 by means of reflection from light extraction features after an asymmetric diffuser with varying optical properties as indicated, assuming a 45° light extraction feature angle. Thus, the peaks may be blurred to achieve increased uniformity of display illumination.

Figure 24A:
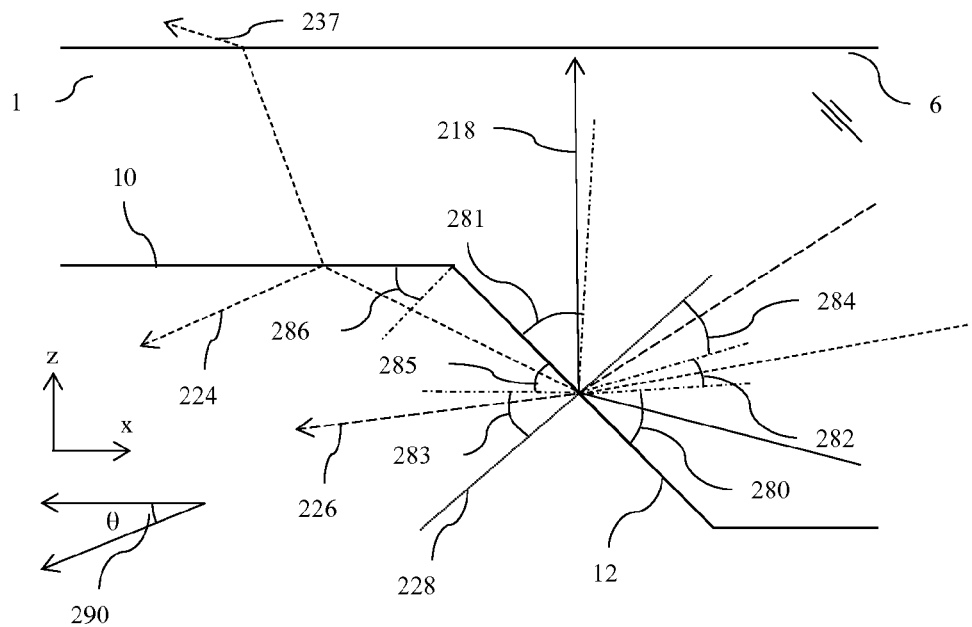
FIG. 24A is a schematic diagram illustrating a side view of ray propagation paths in a waveguide by means of transmission through light extraction features, in accordance with the present disclosure.

FIG. 24A is a schematic diagram illustrating a side view of ray propagation paths in a waveguide 1 by means of transmission through and reflection from light extraction features 12. Thus light rays 218 in cones 280, 281 are reflected, light rays 224 in cones 282, 283 are transmitted by feature 12 and partially reflected from feature 10 and light rays 226 in cones 284, 285, 286 are directly transmitted by the feature 12.

Figure 24B:
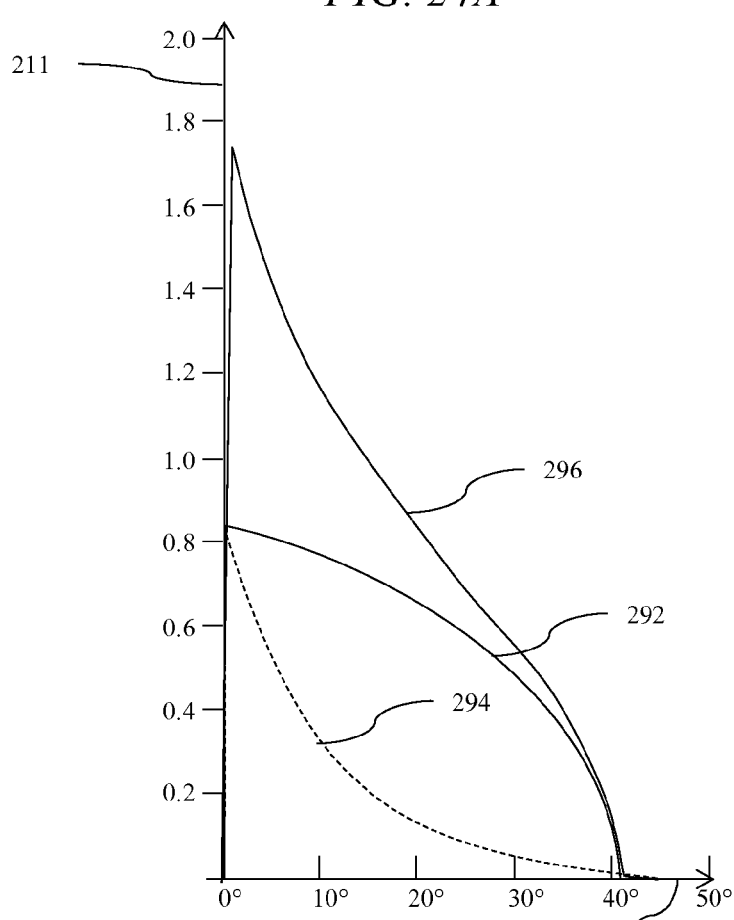
FIG. 24B is a schematic diagram illustrating a graph of luminous intensity against propagation angle for light exiting the waveguide of FIG. 24A by means of transmission through light extraction features, in accordance with the present disclosure.

FIG. 24B is a schematic diagram illustrating a graph of luminous intensity against propagation angle for light exiting the waveguide 1 of FIG. 24A by means of transmission through light extraction features. Thus translated to output angles in air, the intensity curve 292 for the ray bundle in cone 283 and intensity curve 294 for the ray bundle in cone 285 can be calculated from analysis of Fresnel reflection coefficients in s and p polarization states. For the present illustrative example it is assumed that the light is unpolarized within the valve, the angle α 238 is 45° and the refractive index of the waveguide 1 is 1.5. The total intensity in the two light cones is given by curve 296.

Figure 25A:
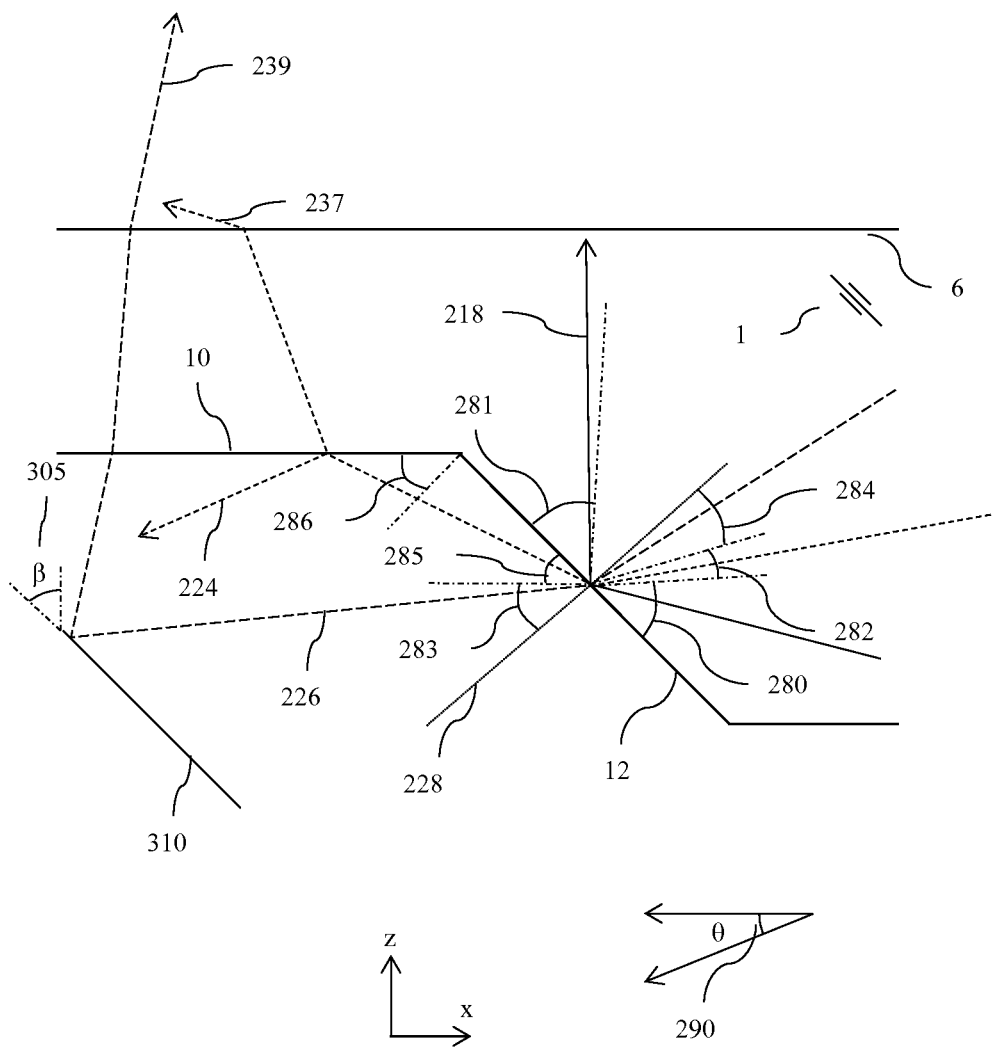
FIG. 25A is a schematic diagram illustrating a side view of ray propagation paths in a waveguide by means of transmission through light extraction features and interacting from reflecting facets, in accordance with the present disclosure.

FIG. 25A is a schematic diagram illustrating a side view of ray propagation paths in a waveguide 1 by means of transmission through light extraction features 12 and interacting with reflective facets 310. Rays 226 may be incident on a reflective facet 310 arranged with an angle β 305 to direct light back through the waveguide 1, achieving light rays 239 that are directed towards the SLM 48 of the display system. Advantageously light rays 226 that are directed through the facets 12 rather than reflected may be directed towards the viewing windows 26 of the display system, increasing brightness and efficiency.

Figure 25B:
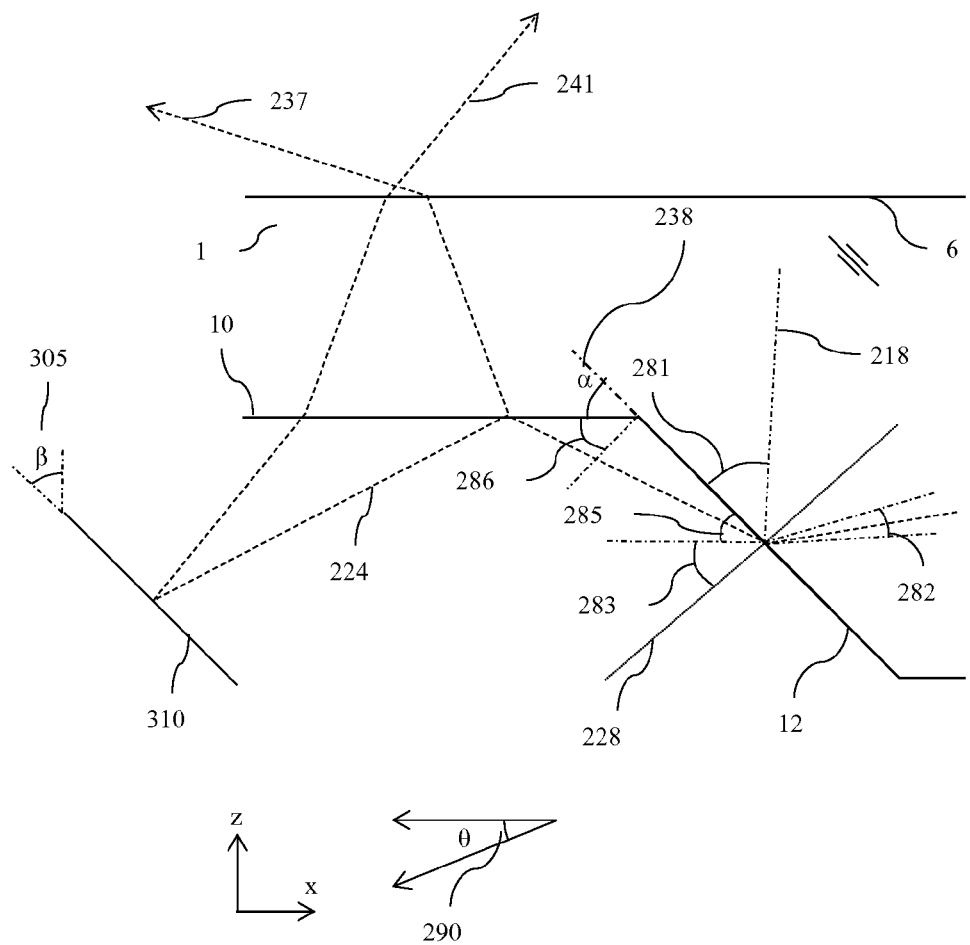
FIG. 25B is a schematic diagram illustrating a side view of ray propagation paths in a waveguide by means of transmission through light extraction features and further interacting with light guiding features and reflecting facets, in accordance with the present disclosure.

FIG. 25B is a schematic diagram illustrating a side view of ray propagation paths in a waveguide 1 by means of transmission through light extraction features 12 and further interacting with light guiding features 10 and reflecting facets 310. Such light rays are reflected to exit as rays 241 from the waveguide. Advantageously light rays 224 that are directed through the facets 12 rather than reflected may be directed towards the viewing windows 26 of the display system, increasing brightness and efficiency.

Figure 25C:
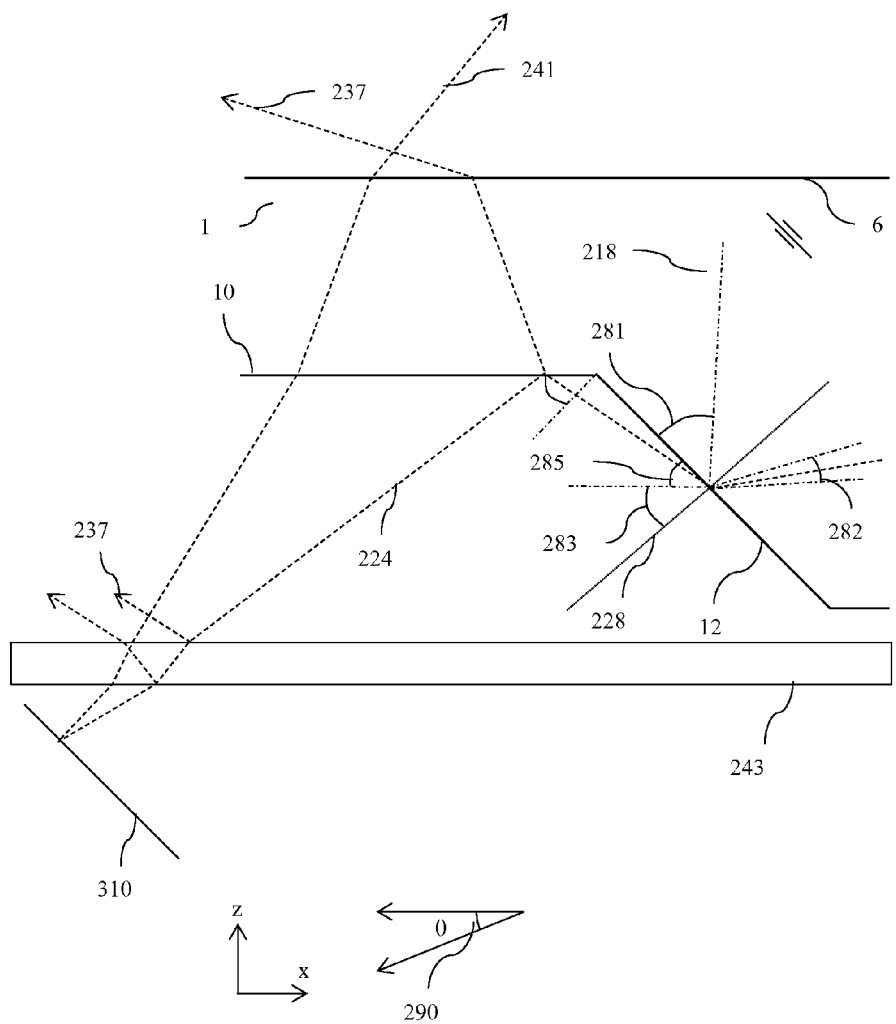
FIG. 25C is a schematic diagram illustrating a side view of ray propagation paths in a waveguide by means of transmission through light extraction features, interacting with light guiding features, further comprising a layer arranged between the waveguide and reflecting features, in accordance with the present disclosure.

FIG. 25C is a schematic diagram illustrating a side view of ray propagation paths in a waveguide 1 by means of transmission through light extraction features 12 and light reflecting facets 310, further comprising a layer 243 arranged between the waveguide and reflecting features. The further layer 243 may comprise for example a waveplate, diffuser, deflector or combination therein. Light rays 224 have relatively high angles of incidence at the input to the layer 243 and thus additional light rays 237 are produced. In general it is thus preferable that no additional layer 243 is introduced between the waveguide 1 and reflecting facet 310.

Figure 26:
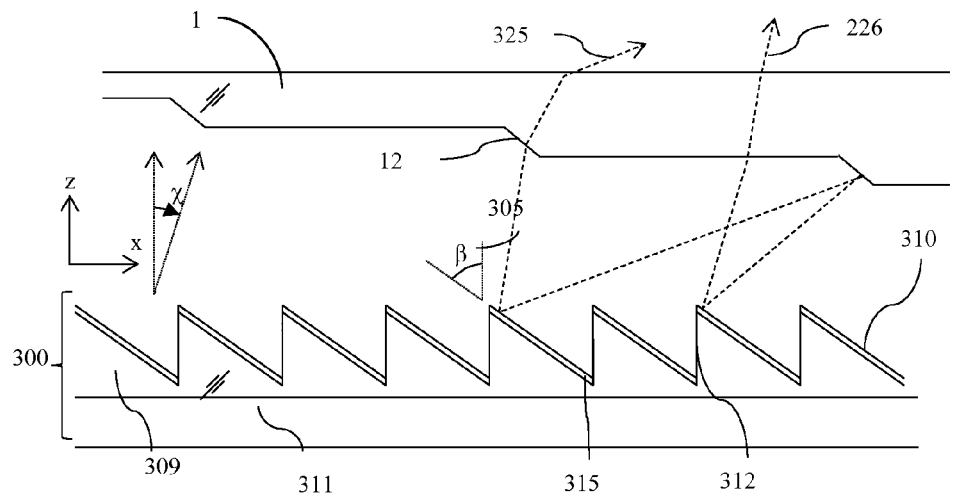
FIG. 26 is a schematic diagram illustrating a detail of side views of a waveguide with a rear reflector with an array of reflective facets, in accordance with the present disclosure.

FIG. 26 is a schematic diagram illustrating a detail of a side view of a waveguide 1 including a rear reflector including an array of reflective facets. Thus reflector 300 may include a saw-tooth structure with reflective facets 310 and drafts or intermediate facets 312. The tilt angle β 305 from the vertical of the facet 310 may be determined as will be described below. Thus light rays 226 transmitted through the feature 12 (otherwise termed herein facet 12) are directed back through the waveguide 1. The light rays 226 advantageously increase the brightness of the viewing windows while maintaining the directionality of the viewing windows, reducing image cross talk.

The reflector may be formed from an embossed film. The reflector 300 may for example include, but is not limited to, a UV cured layer 309 formed on a substrate 311 that may be a glass, a polymer substrate such as PET or PMMA or may be the case of a display apparatus. Desirably the flatness of the reflector 300 is arranged to maintain alignment of viewing windows 26 formed by rays 306 from the reflector film to be in alignment with the viewing windows 26 that are formed by rays 304 that arise by total internal reflection at the features 12. Alternatively the surface relief may be formed within a single material by molding. The structures may be mastered by means of diamond tooling, laser writing into photopolymer or other known mastering techniques. Alternatively the diffuser 68 may be a volume diffuser such as a photopolymer material recorded through an asymmetric photomask. A reflective material 315 may be applied by known coating methods to the reflective facets 310 of the reflector or may be applied to the reflective facets 310 and intermediate facets 312. Reflective material 315 may comprise aluminium, silver, chrome, silicon oxides or other known materials used in substrate coating to achieve desirable reflectivity, low scatter, low cost and ruggedness.

As illustrated by ray 325, a small proportion of the light from the facet 310 will be incident on the feature 12 of the waveguide 1. The amount of light that is incident on the features 12 is small, in an illustrative example the features 12 may have a width 0.01 mm on a pitch of 0.5 mm, so that approximately 2% of the light from facet 310 will be incident on the feature 12. However, the light rays 325 may be directed to substantially the same viewing window 26 as the light rays 226, so these light rays may not significantly degrade optical performance.

Figure 27:
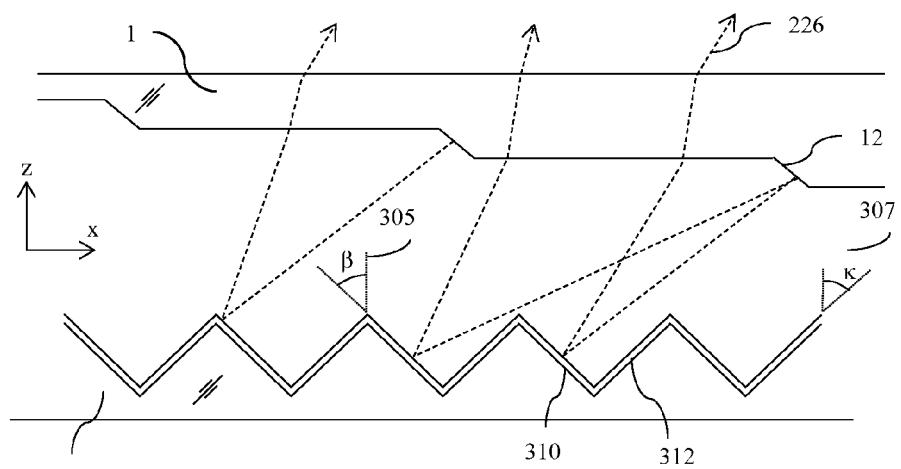
FIG. 27 is a schematic diagram illustrating a detail of side views of a waveguide with a rear reflector with an array of reflective facets, in accordance with the present disclosure.

FIG. 27 is a schematic diagram illustrating a detail of a side view of a waveguide 1 including a rear reflector including an array of reflective facets. In this embodiment the intermediate facets 312 may be arranged with a tilt angle κ 307 from the vertical that is arranged so that transmitted light from the features 12 is arranged not to reflect from the intermediate facets 312 by shielding provided by the reflective facets 310.

The rear reflector may be spaced from the waveguide 1 such that the light from an individual facet of the waveguide 1 is incident on plural reflective facets 310 of the rear reflector 300, the rear reflector 300 may further include intermediate facets 312 extending between the reflective facets of the rear reflector, the intermediate facets being inclined in an opposite sense from the reflective facets of the rear reflector at an angle such that said light from the light sources that is transmitted through the plurality of facets of the waveguide is not incident on the intermediate facets.

Advantageously the arrangement of FIG. 27 may be more conveniently manufactured with uniform reflectivity and is less susceptible to incorrect fitting during the display assembly process.

Figure 28A:
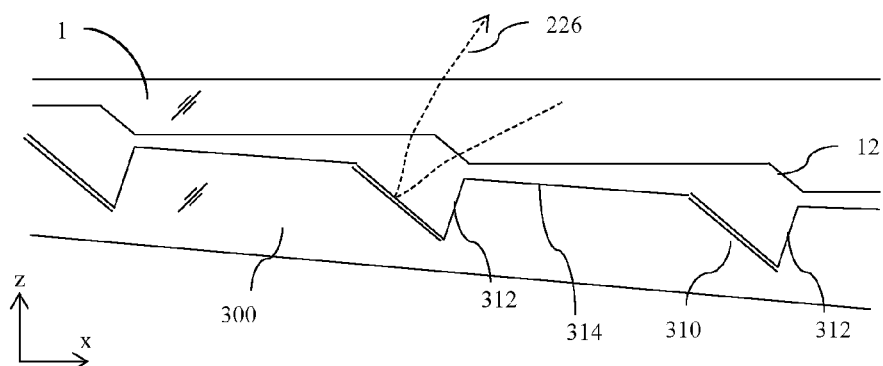
FIGS. 28A-28E are schematic diagrams illustrating a detail of side views of a waveguide with a rear reflector with an array of reflective facets, in accordance with the present disclosure.

FIG. 28A is a schematic diagram illustrating a detail of a side view of a waveguide 1 including a rear reflector including an array of reflective facets 310. The facets are aligned with the features 12 of the waveguide 1 and planar regions 314 which may be coated or uncoated are arranged between the facets 310 and intermediate facets 312.

The facets 310 of the rear reflector 300 may thus be disposed behind respective ones of the facets 12 of the waveguide 1 and arranged to reflect most to all of the light incident thereon from the light sources that is transmitted through the respective one of the facets 12 of the waveguide 1. Advantageously Moiré patterning between the extraction features 12 of the waveguide 1 of the optical valve may be minimized in comparison to the embodiments of FIGS. 26 and 27. Note that some of the light transmitted through the facets is directed back through the regions 10 and towards off-axis viewing positions without incidence onto the rear reflector as will be described with reference to FIG. 32B.

As illustrated in FIG. 28A, the rear reflector 300 includes an intermediate facet 312, a planar region 314, and a reflective facet 310. In another example, the rear reflector 300 may be configured to include a planar region 314 and a reflective facet 310 and eliminate the intermediate facet 312. In this example, the reflective facet 310 may maintain approximately the same slope and the slope of the planar region 314 may become a steeper, positive slope to enable the planar region 314 to join to the reflective facet 310. Further, the planar region 314 may slope in a generally upwardly direction and may connect with the top end of the reflective facet 310. Continuing this example, the facets of the rear reflector 300 may still be approximately aligned with the features 12 of the waveguide 1.

Figure 28B:
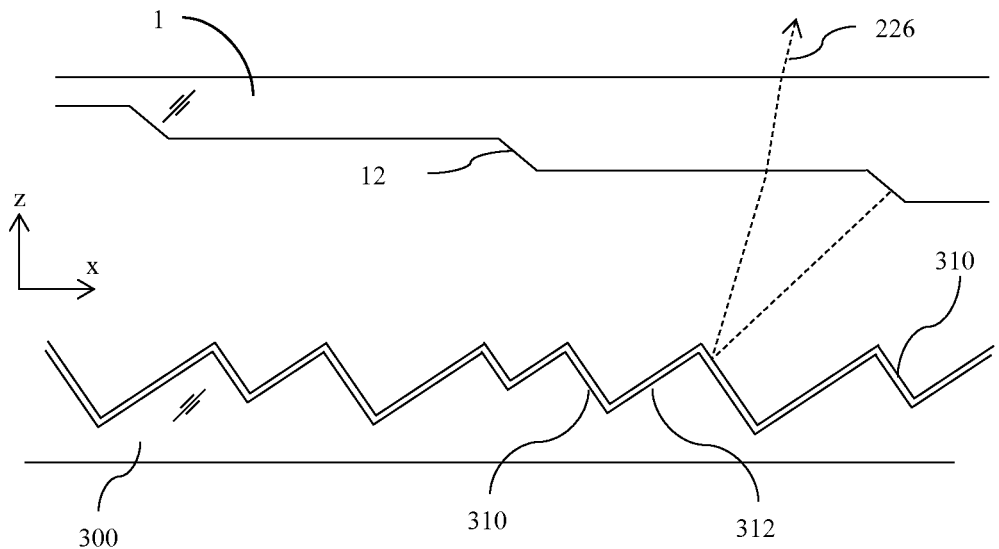

FIG. 28B is a detailed schematic diagram illustrating of a side view of a waveguide 1 which includes a rear reflector including an array of reflective facets 310. The facets are angles equivalently but are advantageously randomly spaced or spaced with repeating structures to minimize Moiré interference with the optionally periodic extraction features 12 of the waveguide 1 and SLM 48.

Figure 28C:
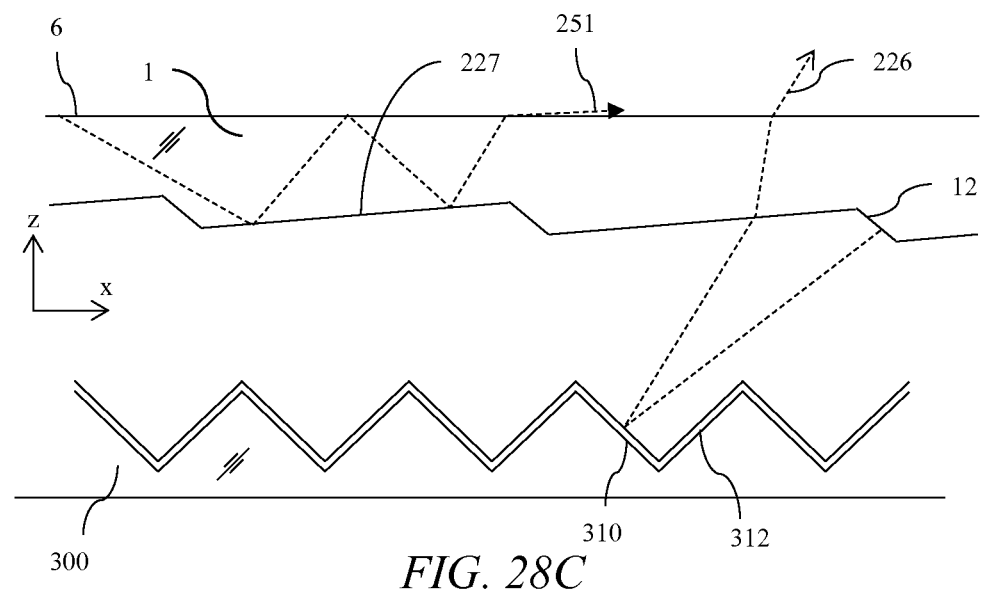

FIG. 28C is a further schematic diagram illustrating a side view of a waveguide 1 and rear reflector 300, wherein the waveguide comprises light guiding features 227 that are not parallel with the guiding surface 6 of the waveguide and may be used in combination with a rear reflector including an array of reflective facets 310. The deflection angle achieved by the facets 10 may be modified to compensate for the non-parallel guiding surfaces of the waveguide 1. Advantageously the thickness of the waveguide 1 may be reduced and thus the thickness of the optical stack may be minimized.

Light rays 251 that are propagating between the input end 2 and the reflective end 4 and that are extracted by the taper of the waveguide 1 may be substantially directed parallel to the side 6 and may thus be absorbed within the device or may be output at high angles and such rays may not be seen by an observer.

Some light rays 253 that are extracted may be incident on the rear reflector and directed towards the observer, achieving unwanted illumination of optical windows for light propagating within the waveguide from the light source array 15 to the reflective end 4. It may be desirable to eliminate this light.

Figure 28D:
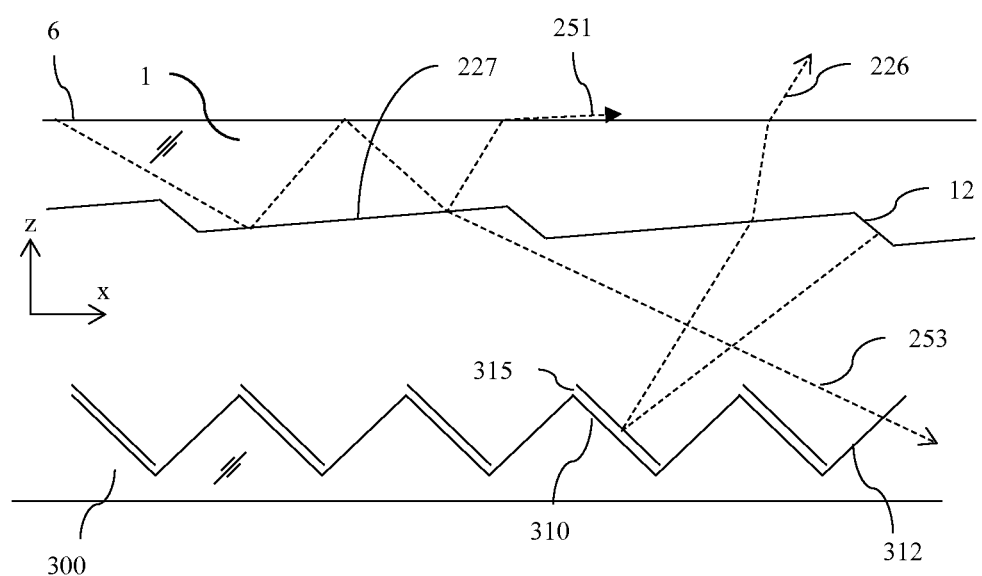

FIG. 28D is a schematic diagram illustrating a side view of a waveguide 1 and rear reflector 300 comprising reflective facets 310 and non-reflective facets 312. Thus light rays 253 may be directed through the rear reflector 300 whereas rays 251 are directed to optical windows. Directional coating techniques may be arranged to provide different reflectivities for facets 310, 312. Advantageously stray light visibility for rays 253 is reduced or eliminated.

Figure 28E:
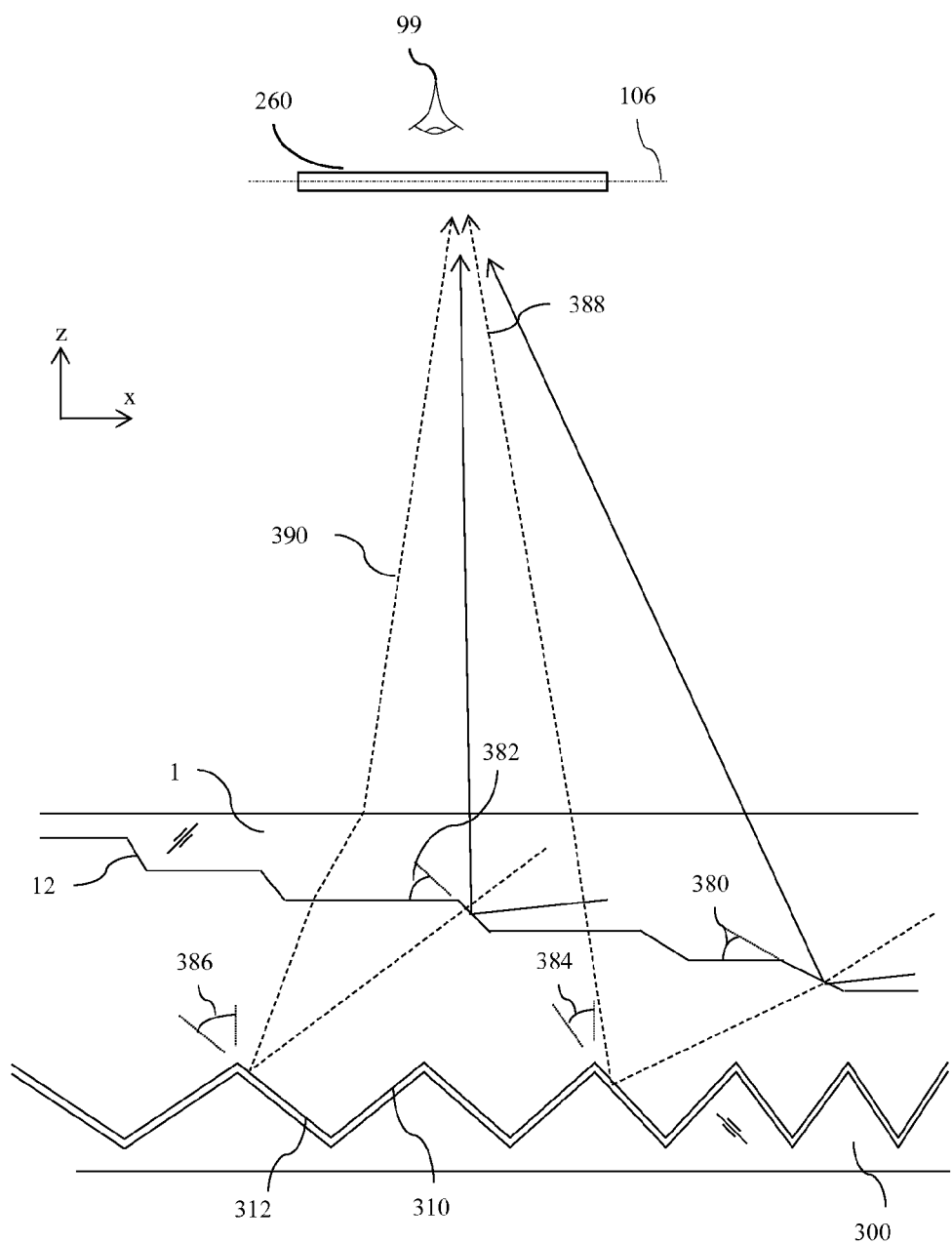

FIG. 28E is a schematic diagram illustrating a side view of a waveguide 1 and rear reflector 300. The light extraction features 12 may have inclination angles α 380, 382 and reflector facet angles β 384, 386 that vary in the x-axis direction orthogonal to the lateral direction. Such an arrangement may achieve direction of output light rays 388, 390 that vary across the display width and so provide some pupillation in this direction, achieving some focussing of light into the viewing windows in the x-direction. Further, the reflective facets of the rear reflector have an inclination that varies across the array of reflective facets. Peak light intensity may thus be directed toward the optical window 260 at the window plane 106 from different positions along the light path propagating within the waveguide 1. In use light source array may be located to one side of the directional backlight so that light can be directed with either a downward or upward bias toward the top or bottom of the display respectively. Advantageously display brightness and uniformity may be increased.

It may be desirable to increase the reflectivity of the rear reflector 300 compared to that shown in FIG. 26 for example, while reducing cost. High reflectivity planar reflectors may be formed by stretching sandwiches of materials with different birefringence properties, such as uniaxial polymeric materials. The refractive index steps between the respective layers may achieve transmission for one electric vector orientation and reflection for the orthogonal vector. By aligning such reflectors orthogonally, a high reflectivity reflector may be achieved, with reflectivity greater than that for metallized structures, for example greater than 95% reflectivity.

Figure 28F:
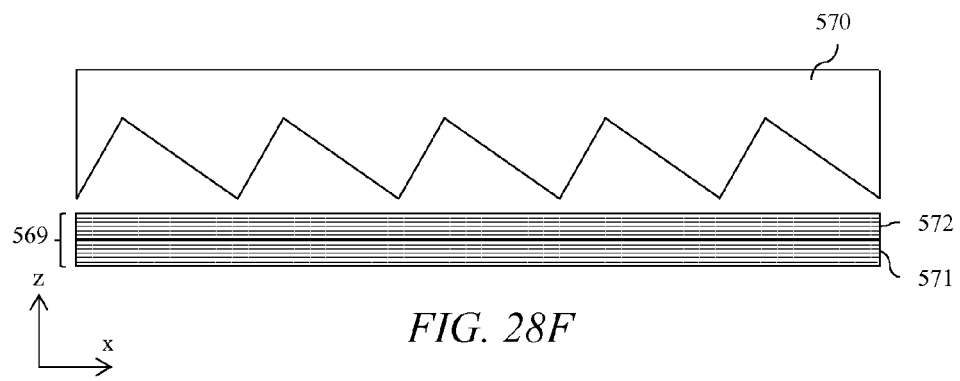
FIGS. 28F-28I are schematic diagrams illustrating side views of methods to form a rear reflector, in accordance with the present disclosure.
Figure 28G:
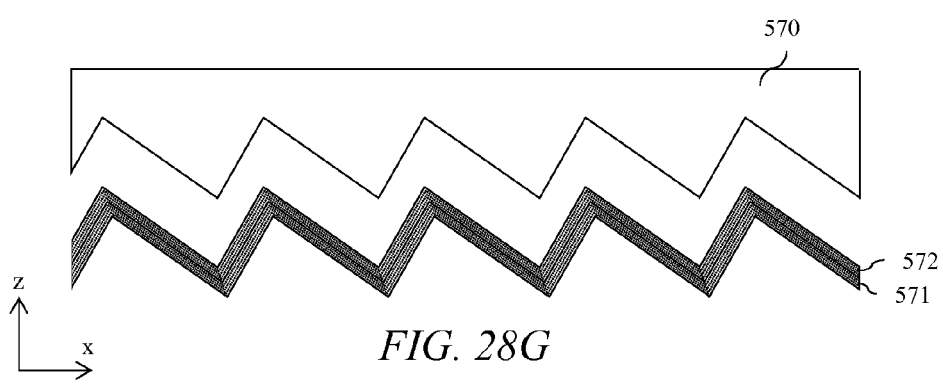
Figure 28H:
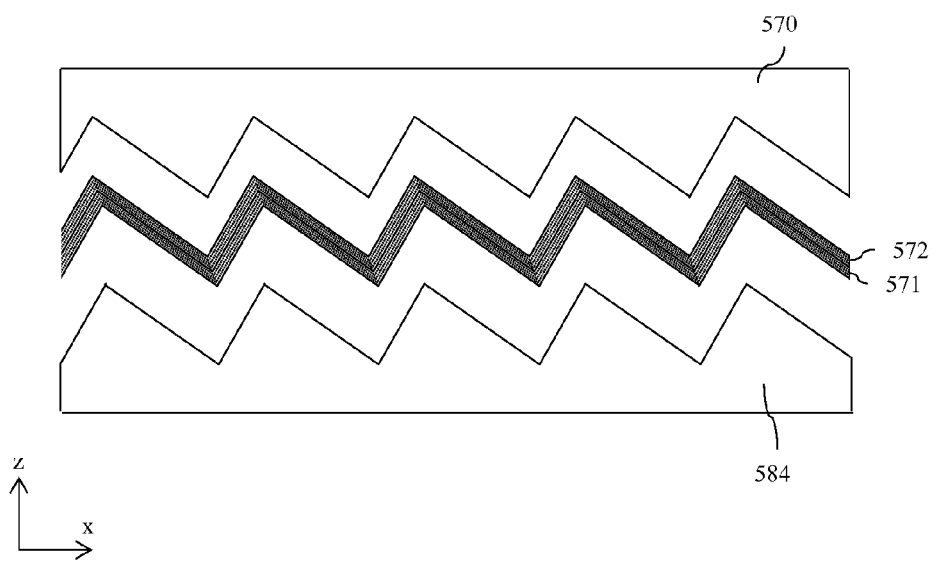
Figure 28I:
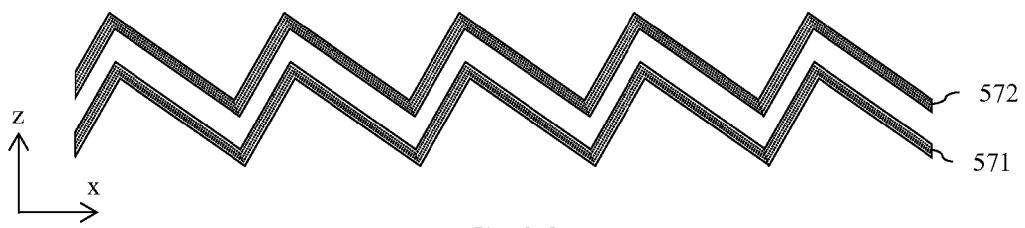

FIGS. 28F-28I are schematic diagrams illustrating side views of methods to form a rear reflector. Reflector sheet 569 crossed reflective layers 571, 572 may be heated and embossed under pressure by stamping tool 570 to achieve surface relief reflectors 571, 572 as shown in FIGS. 28F-G. To ensure that the structure is formed in both reflectors, a matching stamping tool 584 may be provided on the reverse side of the layer. Alternatively, the first and second reflectors 571, 572 may be separately formed and arranged as a stack of rear reflectors as shown in FIG. 28I. Advantageously the reflectivity of the rear reflector can be increased compared to metallized structures as shown in FIG. 26 for example.

Figure 28J:
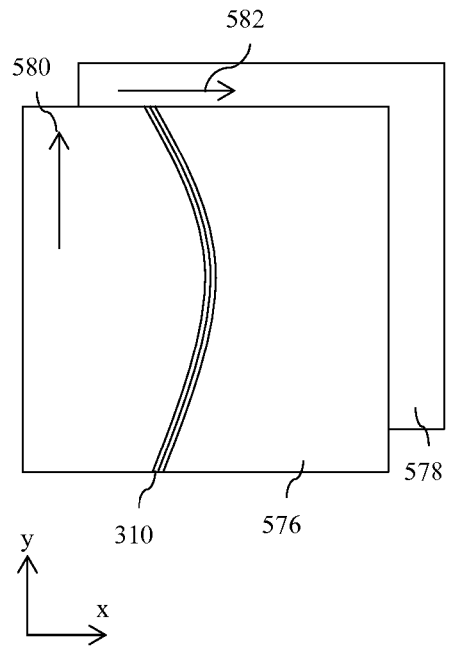
FIGS. 28J-28K are schematic diagrams illustrating front views of rear reflectors, in accordance with the present disclosure.
Figure 28K:
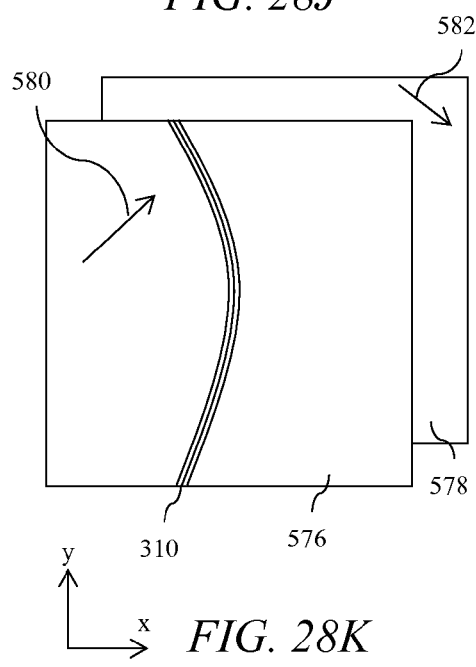

FIGS. 28J-K are schematic diagrams illustrating front views of rear reflectors. The rear reflector 300 is formed by at least two polarized reflector sheets 576, 578 arranged to reflect light that is polarized in respective polarization directions 580, 582 that are orthogonal to each other, the polarized reflector sheets being shaped to form said linear array of reflective facets. The orientation of curved reflective facets 310 may be substantially parallel to one of the polarization directions 580 as shown in FIG. 28J or may be at 45 degrees as shown in FIG. 28K. The orientation of the top reflector 572 may be arranged to align to advantageously achieve maximum reflectivity for the preferred incident polarization state.

Figure 29:
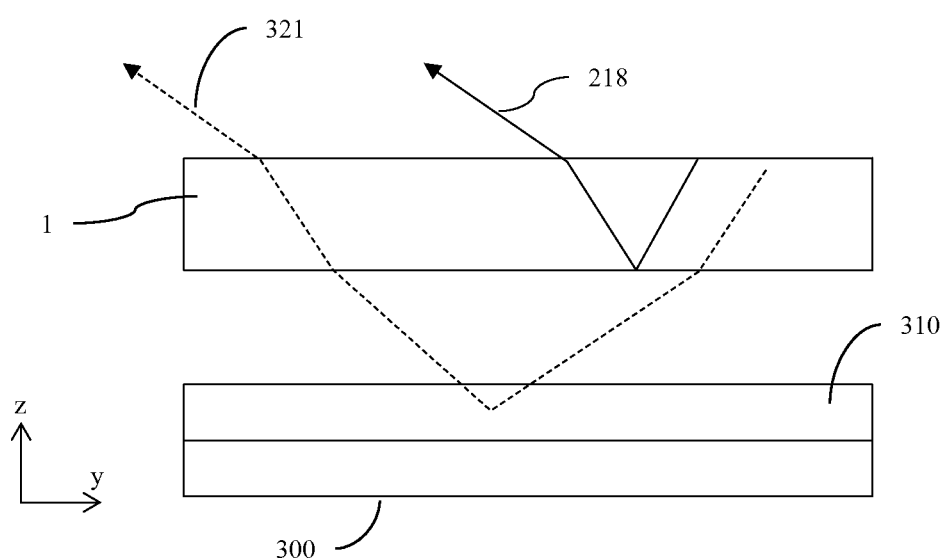
FIG. 29 is a schematic diagram illustrating a detail of a further side view of a waveguide with a rear reflector with an array of reflective facets, in accordance with the present disclosure.

FIG. 29 is a schematic diagram illustrating a detail of a further side view of a waveguide 1 including a rear reflector including an array of reflective facets. A cross section in the y-z plane is illustrated. Thus, transmitted light ray 321 from the waveguide 1 of the waveguide 1 is directed towards a reflective facet 310 of the reflector 300. The reflected light is transmitted through the waveguide 1 so that it is parallel to the ray 218 that was directed by total internal reflection at the facet 12 of the waveguide 1. In this manner, light rays 321 will be directed to the same optical window as the rays 218, and thus cross talk will be minimized while brightness will be increased.

Figure 30:
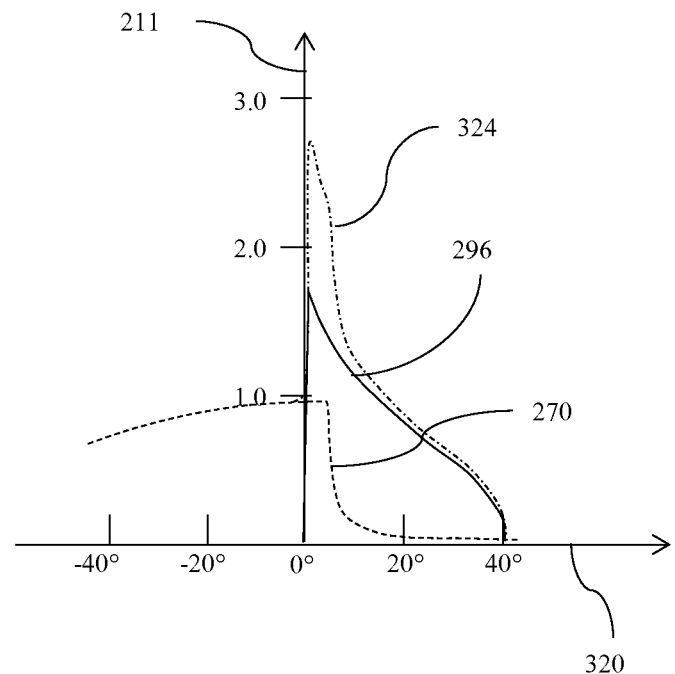
FIG. 30 is a schematic diagram illustrating a graph of luminous intensity against propagation angle from a directional backlight apparatus with a waveguide with a rear reflector with an array of reflective facets before an asymmetric diffuser, in accordance with the present disclosure.

FIG. 30 is a schematic diagram illustrating a graph of luminous intensity 211 against propagation angle 320 from a directional backlight apparatus including a waveguide 1 with a rear reflector including an array of reflective facets before an asymmetric diffuser. Curve 296 from FIG. 24B is deflected in a direction around the normal to the spatial light modulator 48 and is added to the TIR light curve 270 from FIG. 23, to achieve the total intensity distribution 324 in air prior to the asymmetric diffuser 68. It can be observed that the peak intensity may be more than twice the peak intensity from the TIR curve 270 alone. Such a desired increase in brightness can be achieved when the curve 296 is arranged to overlap the curve 270.

For rays 304 the limit of such a condition may arise when guiding rays propagating within the waveguide 1, with a material of refractive index n and critical angle $\theta_c$, are incident at the critical angle on the feature 12 which has a tilt angle to the normal to the first guide surface 6 of $(\pi/2-\alpha)$. Such rays 304 have an output angle $\chi_1$ in air of $$\chi_1 = \sin^{-1}(n \cdot \sin(\alpha - \theta_c)) \qquad \text{eqn. 1}$$

The reflective facets 310 of the rear reflector may be inclined at an angle ν to the normal to the first guide surface, so that for rays 306 that are propagating substantially parallel to the first guide surface and then reflected by the facets 310, the output angle $\chi_2$ in air is given by $$\chi_2 = \pi/2 - 2\beta \qquad \text{eqn. 2}$$

Thus the angle β 305 may be arranged according to the following condition so that light rays 304 and 306 achieve an angular overlap in the viewing window 26, achieving increased brightness.

$$2\beta > \pi/2 - \sin^{-1}(n \cdot \sin(\alpha - \theta_c)) \qquad \text{eqn. 3}$$

Thus the facets 12 of the waveguide 1 may be inclined at an angle $(\pi/2-\alpha)$ to the normal to the first guide surface 6 and the reflective facets 310 of the rear reflector 300 may be inclined at an angle β 305 to the normal to the first guide surface 6, and $2\beta > \pi/2 - \sin^{-1}(n \cdot \sin(\alpha - \theta_c))$, $\theta_c$ being the critical angle of the facets of the waveguide and n being the refractive index of the material of the waveguide. In arrangements wherein there is a tilt between the first guide surface 6 and light guiding features 10, the expression of eqn. 3 may be varied accordingly.

In an illustrative example, the refractive index of the waveguide 1 may be 1.5, the critical angle may thus be 41.8°, the facet angle α may be 45° so that the angle β 305 of the facet 310 may be set to be 42.6° or greater to achieve an increased brightness gain without a substantial gap between the angular intensity profiles of the ray fans represented by rays 304, 306 in FIG. 12.

Figure 31:
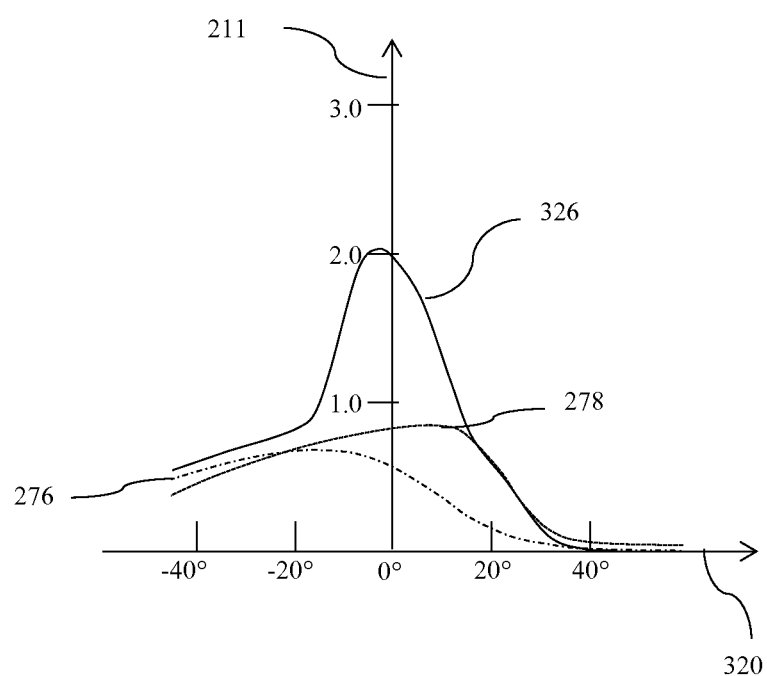
FIG. 31 is a schematic diagram illustrating a graph of luminous intensity against propagation angle from a directional backlight apparatus with a waveguide with a rear reflector with an array of reflective facets after an asymmetric diffuser, in accordance with the present disclosure.

FIG. 31 is a schematic diagram illustrating a graph of luminous intensity 211 against propagation angle 320 from a directional backlight apparatus which may include a waveguide 1 with a rear reflector. The rear reflector may include an array of reflective facets after an asymmetric diffuser. As described previously the asymmetric diffuser 68 blurs the output peaks reducing non-uniformities of illumination across the display and as the observer moves in a direction orthogonal to the lateral direction with respect to the display.

Figure 32A:
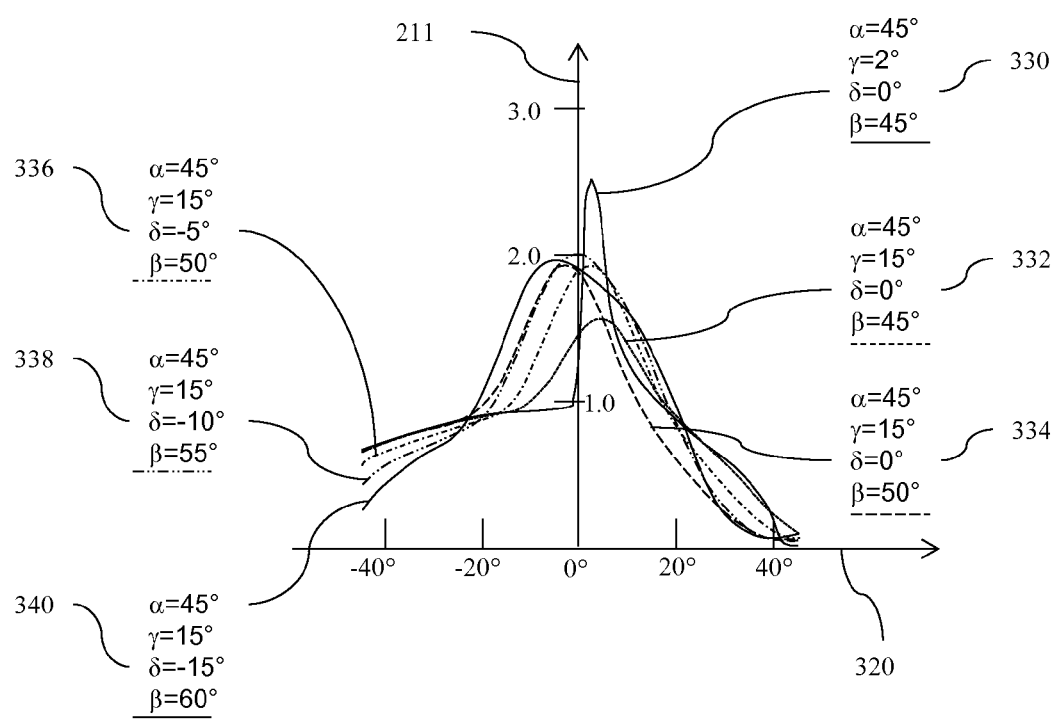
FIG. 32A is a schematic diagram illustrating a graph of luminous intensity against propagation angle from a directional backlight apparatus with a waveguide with a rear reflector with an array of reflective facets after an asymmetric diffuser, in accordance with the present disclosure.

FIG. 32A is a schematic diagram illustrating a graph of luminous intensity 211 against propagation angle 320 from a directional backlight apparatus which may include a waveguide 1 with a rear reflector. The rear reflector may include an array of reflective facets after an asymmetric diffuser. Various arrangements 330, 332, 334, 336, 338, 340 of facet 12 tilt angle α 238, reflective facet 310 tilt angle β 305 and asymmetric diffuser properties including angles γ 233 and δ 227 are illustrated. Advantageously, the central luminance can be substantially increased with wide intensity distribution over acceptable viewing angles.

Figure 32B:
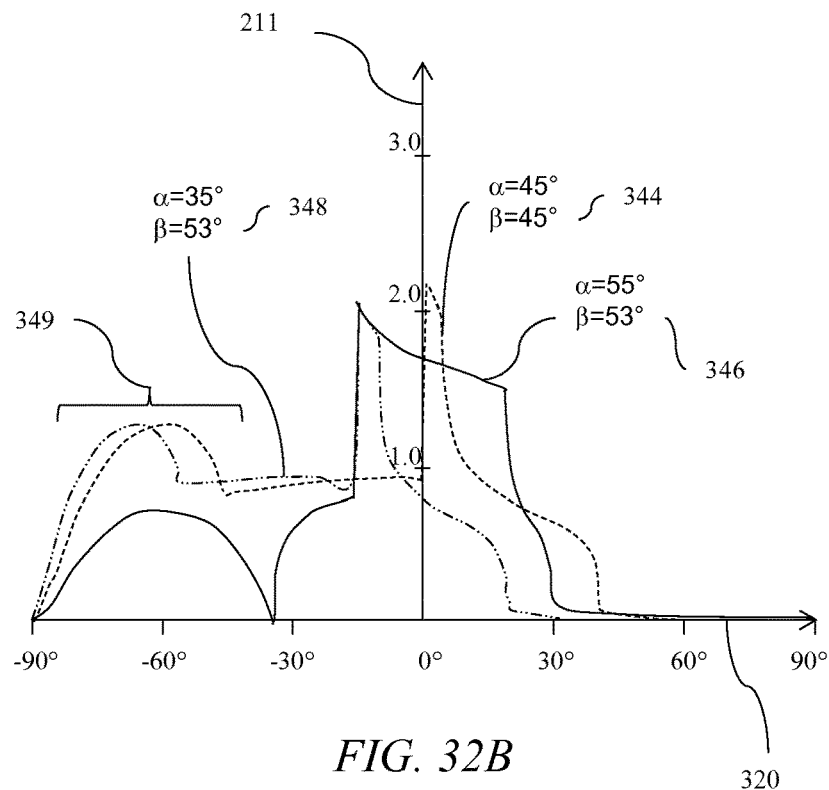
FIG. 32B is a schematic diagram illustrating a graph of luminous intensity against propagation angle from a directional backlight apparatus with a waveguide with a rear reflector with an array of reflective facets, in accordance with the present disclosure.

FIG. 32B is a schematic diagram illustrating a graph of luminous intensity 211 against propagation angle 320 from a directional backlight apparatus with a waveguide with a rear reflector with an array of reflective facets for arrangements 344, 346, 348 of angles α 238 and β 305. The graphs are shown over a wider angle than for FIG. 32A and comprise the luminous intensity from light rays 237 and 241 as shown in FIG. 25B for example. Thus an off-axis illumination peak 349 may be observed for high off-axis viewing positions.

Figure 32C:
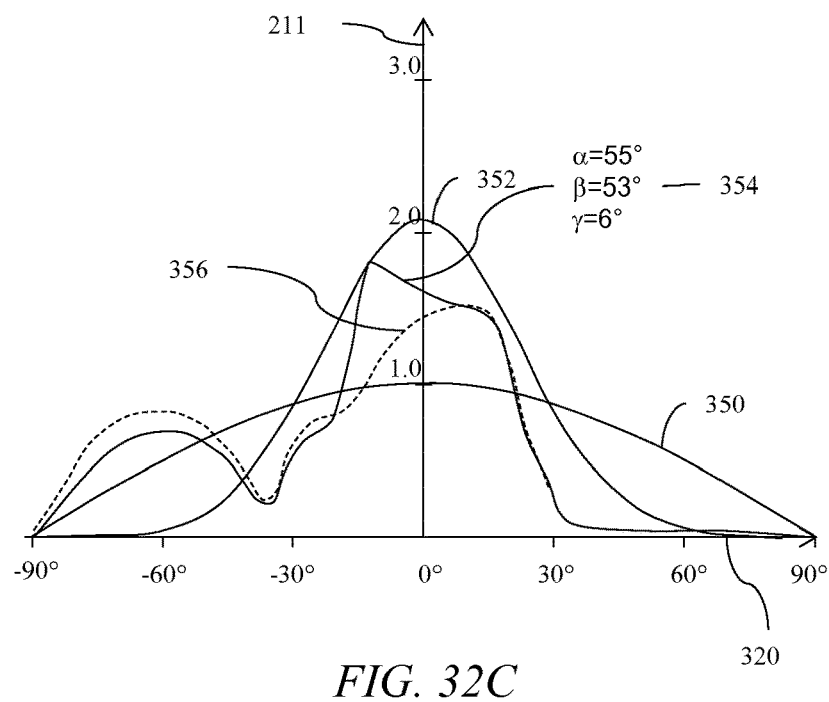
FIG. 32C is a schematic diagram illustrating a graph of luminous intensity against propagation angle from a directional backlight apparatus with a waveguide with a rear reflector with an array of reflective facets after an asymmetric diffuser, in accordance with the present disclosure.

FIG. 32C is a schematic diagram illustrating a graph of luminous intensity 211 against propagation angle 320 from a directional backlight apparatus with a waveguide 1 with a rear reflector with an array of reflective facets 310 after an asymmetric diffuser 68. Arrangement 354 may provide a luminous intensity distribution that is similar in profile to a profile 352 that has a gain of approximately 2 in comparison to a Lambertian distribution 350. Further increasing the diffusion angle γ 233 to 15° for example can further increase the similarity of the peak shape. The peak luminous intensity may be substantially maximised for on-axis viewing; such an arrangement is particularly advantageous for mobile display devices wherein the device is required to be rotated between landscape and portrait modes of operation. Arrangement 356 is shown for an additional layer 243 as shown in FIG. 25C for example, indicating losses associated with increased reflection of light rays 237 at the layer 243.

Figure 32D:
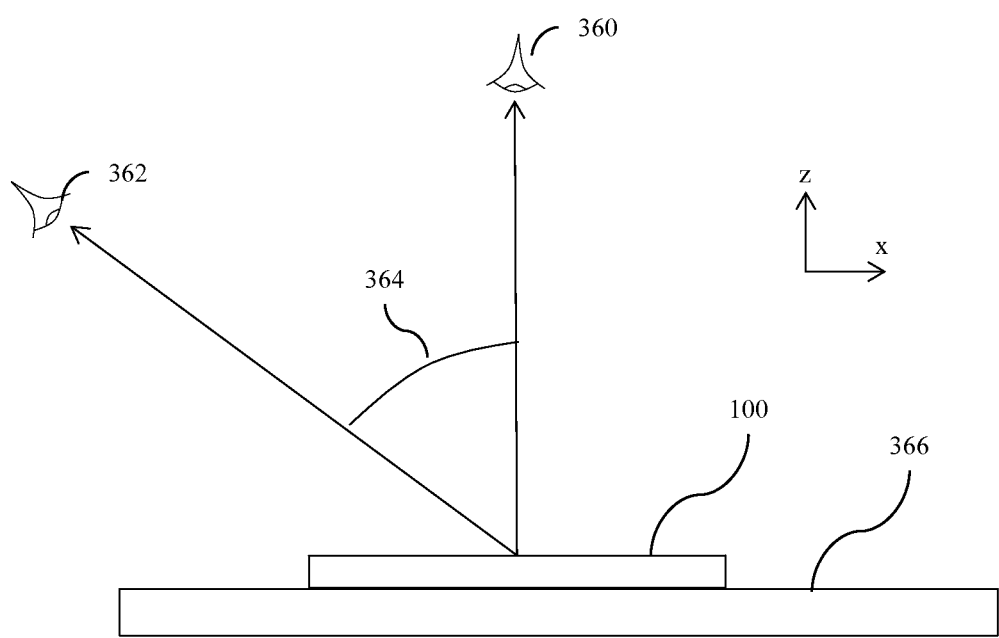
FIG. 32D is a schematic diagram illustrating a side view of the use of the optical output of the present embodiments in a display arranged on a table surface, in accordance with the present disclosure.

FIG. 32D is a schematic diagram illustrating a side view of the use of the optical output of the present directional backlight embodiments in a display 100 arranged on a table surface 366 and viewed in a landscape arrangement when the array 15 is arranged along the long edge of the waveguide 1. The peak 349 will provide a luminance that varies with 1/cos χ where the angle χ 320 is the viewing angle of the display. At high viewing angles 364, for example greater than 45°, the display luminance to observer 362 may substantially increase because of the small resolved display area and advantageously the display may be used to achieve a high luminance image for low power consumption at such high angles.

Figure 32E:
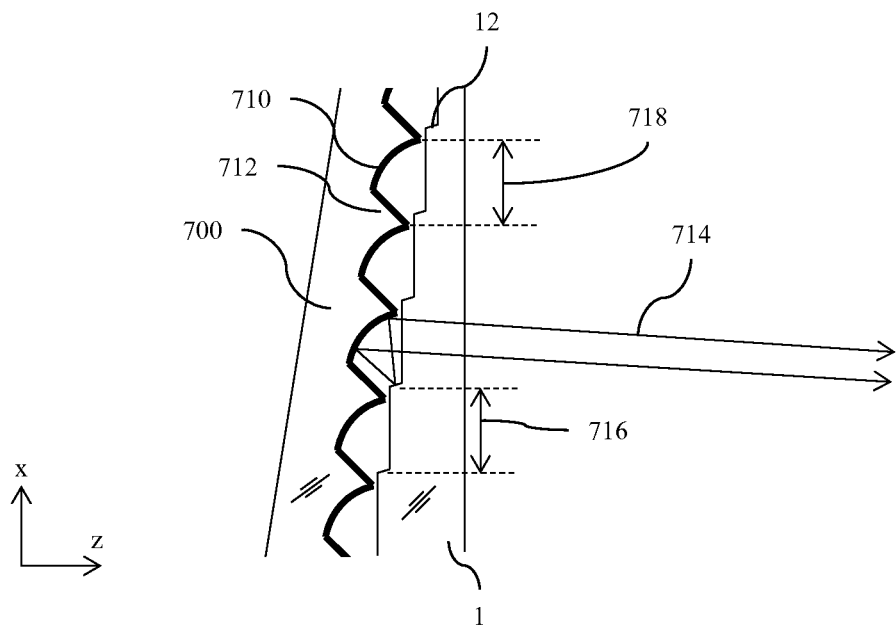
FIG. 32E is a schematic diagram illustrating a side view of a rear reflector wherein the facets of the rear reflector are concave and arranged to image light from respective aligned light extraction features of an optical valve, in accordance with the present disclosure.

FIG. 32E is a schematic diagram illustrating a side view of a rear reflector wherein the facets of the rear reflector are arranged to image light from respective aligned light extraction features of an optical valve comprising waveguide 1 with extraction facets 12. The reflective facets 710 of the rear reflector 700 are concave, and arranged in alignment with the facets 12 of the waveguide 1. Light rays 714 from a light extraction facet 12 are incident on curved reflector 710 of rear reflector 700. Draft regions 712 are provided to connect concave reflectors 710. In operation reflectors 710 are arranged with a focus substantially at the extraction feature 12 of the waveguide 1. Light from the feature 12 is thus substantially collimated and passed through the waveguide 1. The pitch 716 of the extraction features is set as substantially the same as the pitch 718 of the reflectors 710.

Figure 32F:
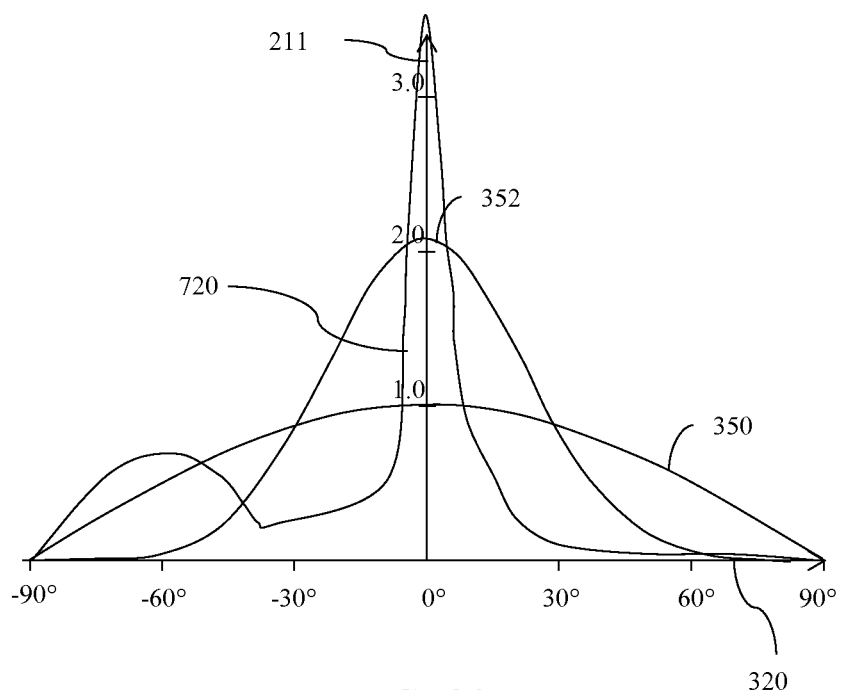
FIG. 32F is a schematic diagram illustrating a graph of luminous intensity against propagation angle from a directional backlight apparatus comprising the arrangement of FIG. 32E, in accordance with the present disclosure.

FIG. 32F is a schematic diagram illustrating a graph of luminous intensity against propagation angle from a directional backlight apparatus comprising the arrangement of FIG. 32E. Thus luminous intensity profile 720 has a sharper peak than that achieved by the arrangement of FIG. 27 for example.

In the present embodiments, concave describes a curvature of the reflective facets 710 in the x-z plane as shown in FIG. 32E whereas curved describes a curvature of the reflective facets 310 in the x-y plane as shown for example in FIG. 15A. Facets of the rear reflector may be concave and curved to advantageously achieve viewing windows with very high gain characteristics in both x and y axes. Further diffuser layers may be arranged to tune the desired output characteristics. The reflection from the rear reflector facets 710 can be arranged to overlap the direct reflection from the facets 12 of the waveguide 1. Such an arrangement can advantageously achieve a very high luminance display with low power consumption. The orientation angle α 238 may be arranged with a high value so that most of the light incident on the facet 12 is transmitted to the rear reflector facet 710.

The angle between the facets 710, 712 can be set as substantially 90° to achieve polarization recirculation as described elsewhere in the present embodiments.

Figure 33A:
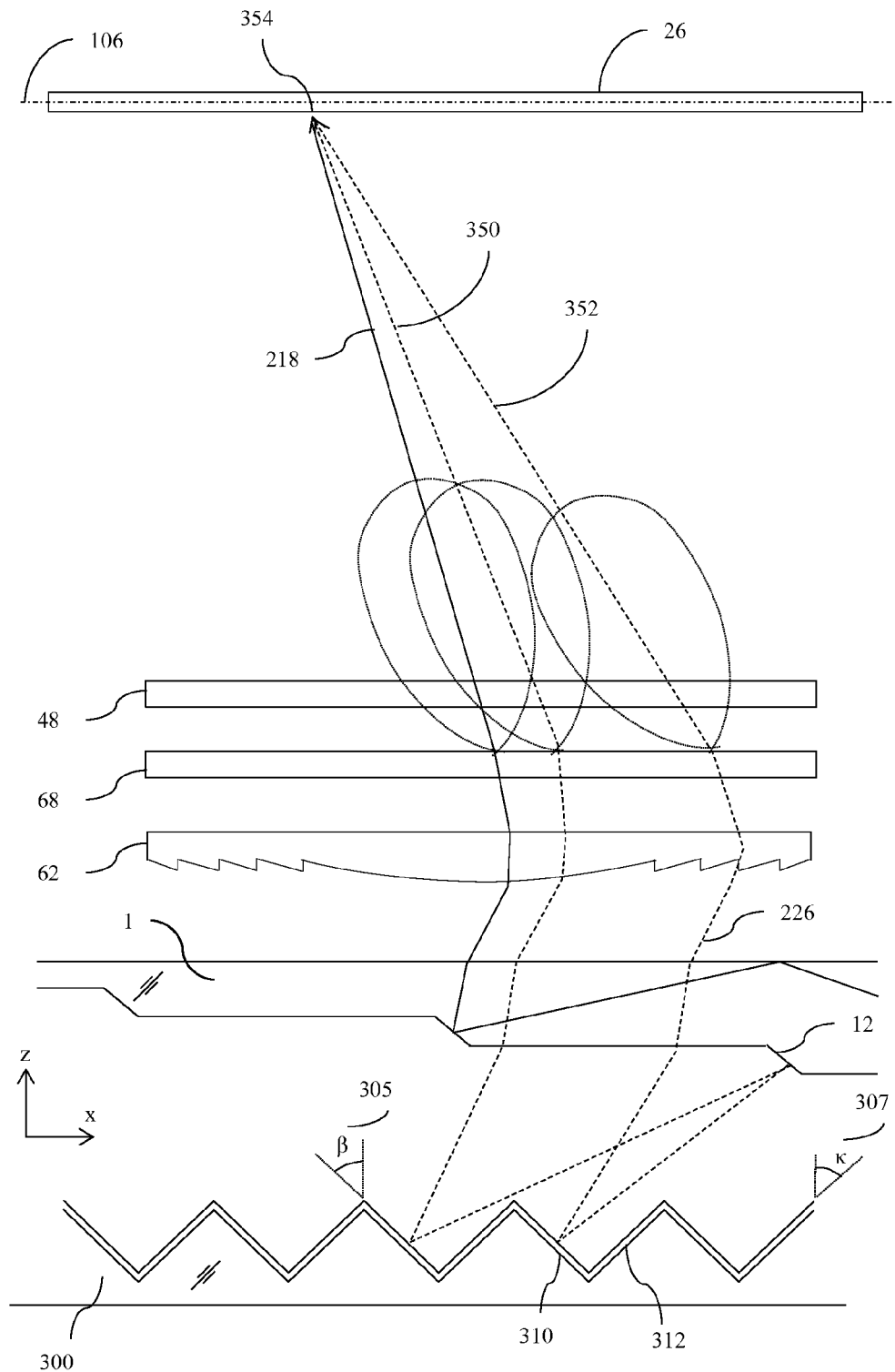
FIG. 33A is a schematic diagram illustrating a side view of a directional display device with a waveguide with a rear reflector with an array of reflective facets, a Fresnel lens and an asymmetric diffuser, in accordance with the present disclosure.

FIG. 33A is a schematic diagram illustrating a side view of a directional display device which may include a waveguide 1 with a rear reflector. The directional display device may include a directional backlight and a transmissive spatial light modulator. The rear reflector may include an array of reflective facets, a Fresnel lens and an asymmetric diffuser. The Fresnel lens 62 may be arranged with optical power in the x-z plane. In this manner, while the angular intensity of the light may vary as shown for example in FIG. 32, the Fresnel lens 62 may achieve pupillation of the light directed to the viewing window 26 in the window plane 106. Thus for an observer's eye at position 354, advantageously a substantially uniform intensity may be seen across the height of the spatial light modulator 48.

A directional backlight may thus further include a Fresnel lens 62 having optical power in at least the lateral direction, disposed between the first guide surface of the waveguide and the asymmetric diffuser and further may include a Fresnel lens having optical power at least in the lateral direction disposed to receive light output through the first guide surface. Further the Fresnel lens may have optical power in the direction orthogonal to the lateral direction.

To optimise brightness, viewing freedom and cross talk, it may be desirable to achieve overlapping windows 26 in a single viewing plane 106 for light reflected both from the light extraction features 12 and reflecting facets 310. Further it may be desirable to reduce device thickness and complexity by using curved light extraction features 12. A method to calculate the radius of curvature of the reflective facets 310 for a given radius of curvature of light extraction features 12 will now be described.

Figure 33B:
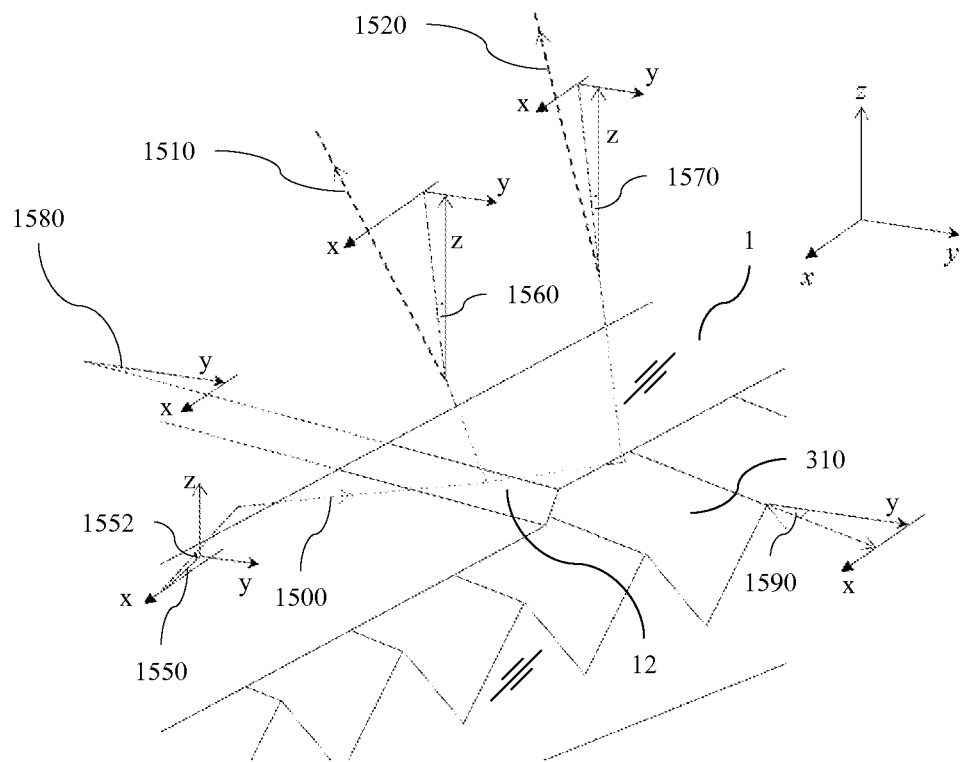
FIG. 33B is a schematic diagram illustrating exemplary ray paths used to determine the relationship between the curvatures of light extraction features and rear reflector facets, in accordance with the present disclosure.

FIG. 33B is a schematic diagram illustrating the optional paths of a guiding incident ray 1500 having an in-plane (in the x-y plane) angle 1550. Depending on its out-of-plane angle 1552, the ray may either reflect off the extraction feature 12 and exit out of the guide toward a viewer as ray 1510, or transmit through the feature 12 and reflect off a reflection facet 310 and exit as ray 1520. Ray tracing can relate the deflection angles 1560 and 1570 to in-plane orientations 1580 of the extraction feature 12 and 1590 of the reflector facet 310.

Figure 33C:
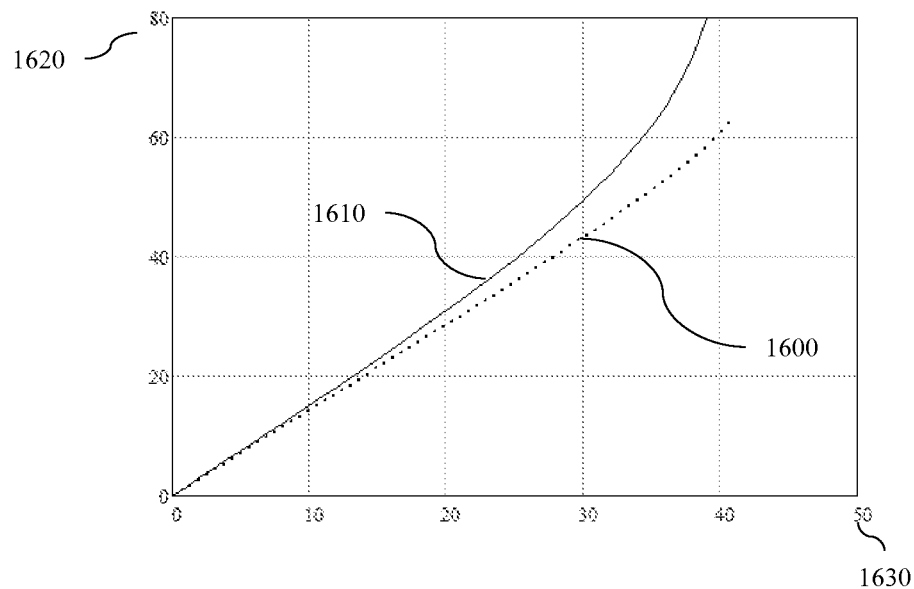
FIG. 33C is a schematic diagram illustrating a graph of extracted ray angles against incident ray angles as illustrated in FIG. 33B, in accordance with the present disclosure.

FIG. 33C is a schematic diagram of a graph showing an example of the exiting angles 1560 and 1570 of rays along axis 1620 as a function of reflector in-plane orientation angles 1580 and 1590 along axis 1630. Trace 1610 is that of a −x propagating ray (angle 1550 equal to zero in FIG. 33B) reflecting off the extraction feature, where trace 1600 is that of similarly incident ray reflecting off a reflector facet. The approximately 10% difference in gradients between these two traces may determine the difference in orientations required to provide the same exiting angle or focal point for the two ray paths. This indicates the facet radius of a curved reflection film may be approximately 10% shorter than the radius of curvature of an optical valve's curved extraction features for matching focal points. Alternatively, the radii of the reflector facet and light extraction features may be substantially the same. Alternatively the radii may be different so that viewing windows are created in different window planes and of different sizes. Advantageously the display uniformity and longitudinal viewing freedom may be increased. Further Moiré may be reduced between the two structures, and the structure of the pixels of the SLM 48.

In an illustrative example, a display of size 75×50 mm may be illuminated by an optical valve comprising waveguide 1 and rear reflector 300. The window plane 106 distance may be set to be 300 mm. For a refractive index of 1.5 of the waveguide, the radius of curvature of the light extraction features 12 may be approximately 450 mm. The radii may be fixed so that the pitch of the features 12 in the radial direction may vary slightly with lateral position, although may remain constant in the x-direction orthogonal to the lateral direction. The radius of the reflective facets 310 of the rear reflector 300 may be approximately 400 mm.

In a further illustrative example, the pitch of structures may be set differently to minimize Moiré beating between the various structures. The pitch of the rear reflector facets may for example be 40 micrometers, the pitch of the features of the features 12 of the waveguide 1 may be 200 micrometers and pitch of the features of the diffuser may be of order 10 micrometers or less and the pitch of the pixels of the spatial light modulator may be 25×75 micrometers. A spacing of 250 micrometers may be introduced between the waveguide 1 and reflector 300. Moiré may be substantially eliminated.

Figure 33D:
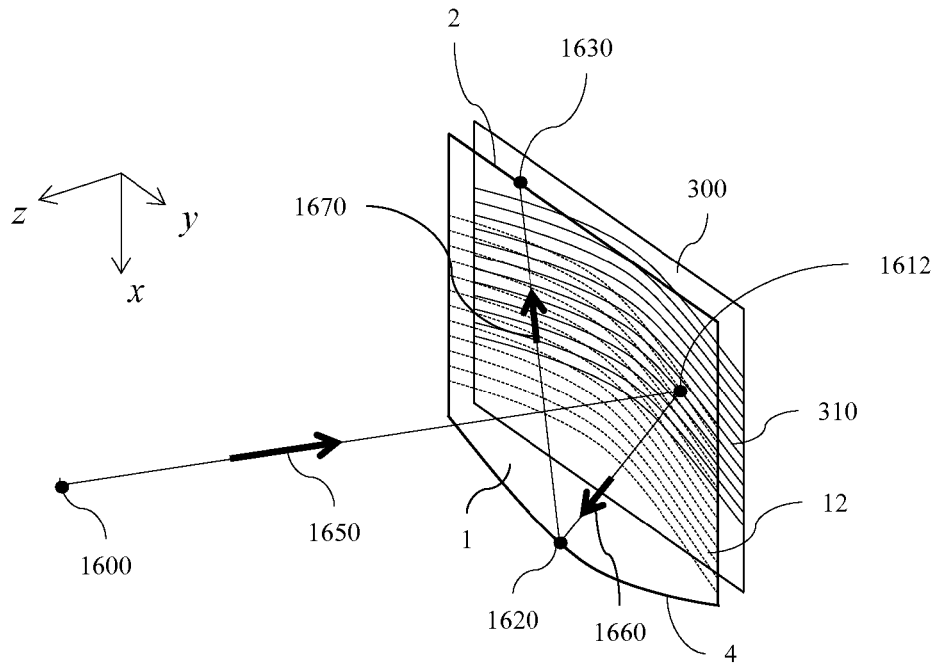
FIG. 33D is a schematic illustrating the ray paths traced to optimize illumination system design, in accordance with the present disclosure.

FIG. 33D is a schematic diagram illustrating the ray path of a ray 1650 emanating from a single nominal viewing point 1600, incident on either an extraction feature 12 or reflector facet 310 at position 1612, guiding within the optical valve 1 as ray 1660, reflecting off the curved end 4 before propagating as ray 1670 towards a position 1630 along the entrance aperture of the side 2.

Figure 33E:
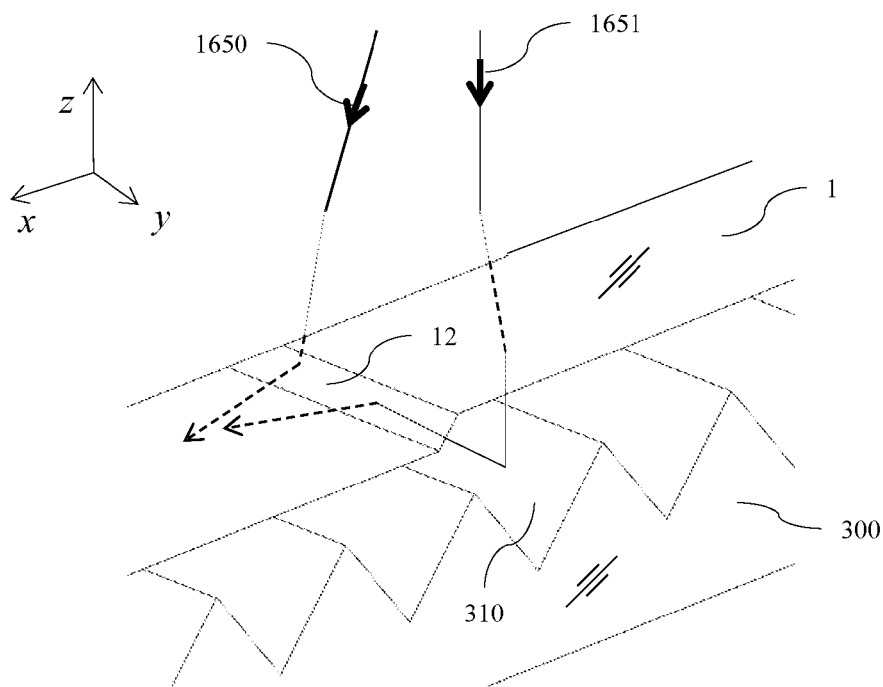
FIG. 33E is a schematic illustrating the off-extraction feature and off-reflection facet ray paths traced to optimize illumination system design, in accordance with the present disclosure.

FIG. 33E is a schematic diagram illustrating the two optional paths from similar incident rays 1650 and 1651. Tracing these rays through the system enables system optimization. Localization of the positions 1630 in FIG. 33D for rays emanating from the same position 1600 is desirable.

Figure 33F:
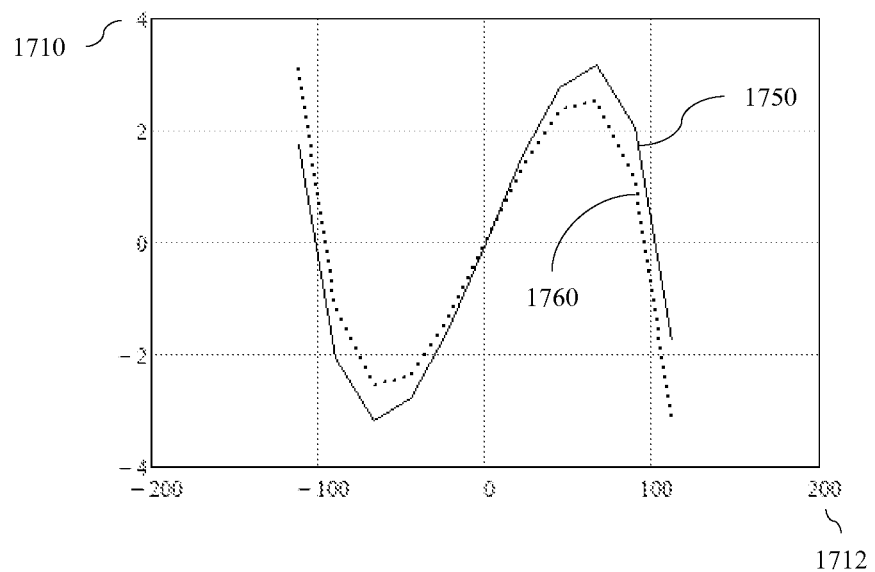
FIG. 33F is a schematic diagram illustrating a graph of ray emitting position versus horizontal screen position for those rays emanating from a single viewing point either reflecting off extraction features or reflector facets, in accordance with the present disclosure.

FIG. 33F is a schematic diagram illustrating a resulting graph showing the traced ray position 1710 in millimeters (mm) along the entrance aperture at side 2 for different entrance positions 1712 in mm along a horizontal line bisecting the optical valve. In this graph, the viewing position 1600 is normal and centered on the valve at a viewing distance of 400 mm. The two traces shown in the graph are for the two ray path options depicted in FIG. 33E (1750 for rays reflecting off the extraction feature; trace 1760 for rays reflecting off the reflector facets). The radii of the curved reflecting features and that of the imaging surface 4 were adjusted for best localization along the entrance aperture of side 2. This result is consistent with the reflector facet radius of curvature being 10% smaller than the radius of curvature of the valve's extraction features. Optimizing for different off-axis viewing positions and viewing distances suggest the relative radii values of extraction features and reflective facets for best performance to fall within 0-12% of each other with the reflection film having the smaller radius.

In other words, the distance from the waveguide and reflector 300 to the window plane 106 may be substantially the same for light reflected directly from the features 12 and for light directed through the features 12 and reflected from the reflective facet 310 and back through the waveguide 1. Advantageously the viewing windows may be substantially aligned achieving increased brightness and viewing freedom while reducing image cross talk.

Transmissive spatial light modulators 48 such as liquid crystal displays typically require polarized input light of a given first polarization. To optimise brightness and efficiency it may be desirable to utilize both light of the first polarization and light of a second polarization that is orthogonal to the first polarization state in the present embodiments comprising light reflection facets 310, as will now be described.

Figure 34:
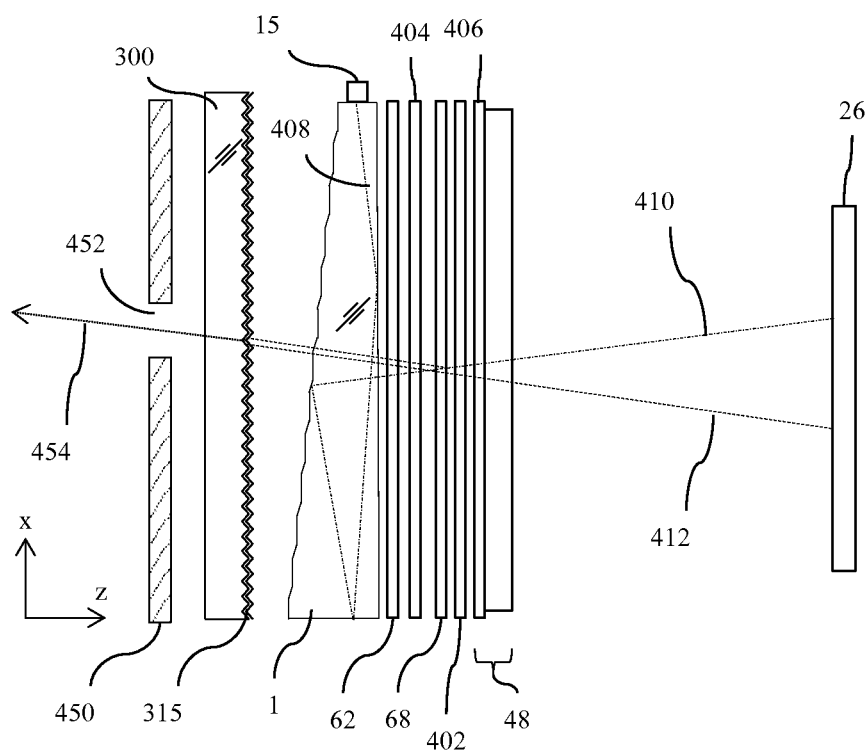
FIG. 34 is a schematic diagram illustrating a side view of an embodiment of a directional display device with polarization recovery, in accordance with the present disclosure.

FIG. 34 is a schematic diagram illustrating a side view of an embodiment of a directional display device with polarization recovery. The directional display device may include a directional backlight and a transmissive spatial light modulator. The directional display device includes waveguide 1, and illuminator array 15, as well as an SLM 48 which receives the output light from the waveguide 1, being arranged as described above. The display device may further comprise the following components in series between the waveguide 1 and an SLM 48: Fresnel lens 62, optional phase retarder such as a half wave retarder 404, asymmetric diffuser 68, reflective polarizer 402, and clean up polarizer 406 at the input to the spatial light modulator 48. A prismatic reflective film 300 is disposed behind the second guide surface of the SLM 48 and functions as a rear reflector.

In operation, due to the reflective polarizer 402 that is arranged between the first guide surface of the waveguide 1 and the SLM 48 being arranged to transmit the first polarization component, unpolarized light rays 408 propagating in waveguide 1 are directed as light rays 410 to viewing window 26 as described above, with a first polarization that is transmitted through reflective polarizer 402 and clean up polarizer 406. Light rays 410 of the second polarization component having a polarization orthogonal to the first polarization are reflected by the reflective polarizer 402 as rejected light and are transmitted through the waveguide 1 to prismatic reflective film 300 whereon they are reflected and directed as light rays 412 back to the SLM 48. The vertical position of the light ray 412 at window 26 may thus be different to the position of light ray 410. However, such light rays may include the same optical window directionality in a lateral (y-axis) direction.

The prismatic reflective film 300 converts the polarization of the rejected light into the first polarization as will be described below.

The reflective coating 315 arranged on the prismatic surface of the reflector 300 may be arranged to be partially transmitting, for example by controlling its thickness so that light rays 454 with low intensity are directed to the rear of the display structure. A mask 450 may be arranged with aperture 452 configured to direct light to the rear of the display for product branding purposes for example.

Figure 35A:
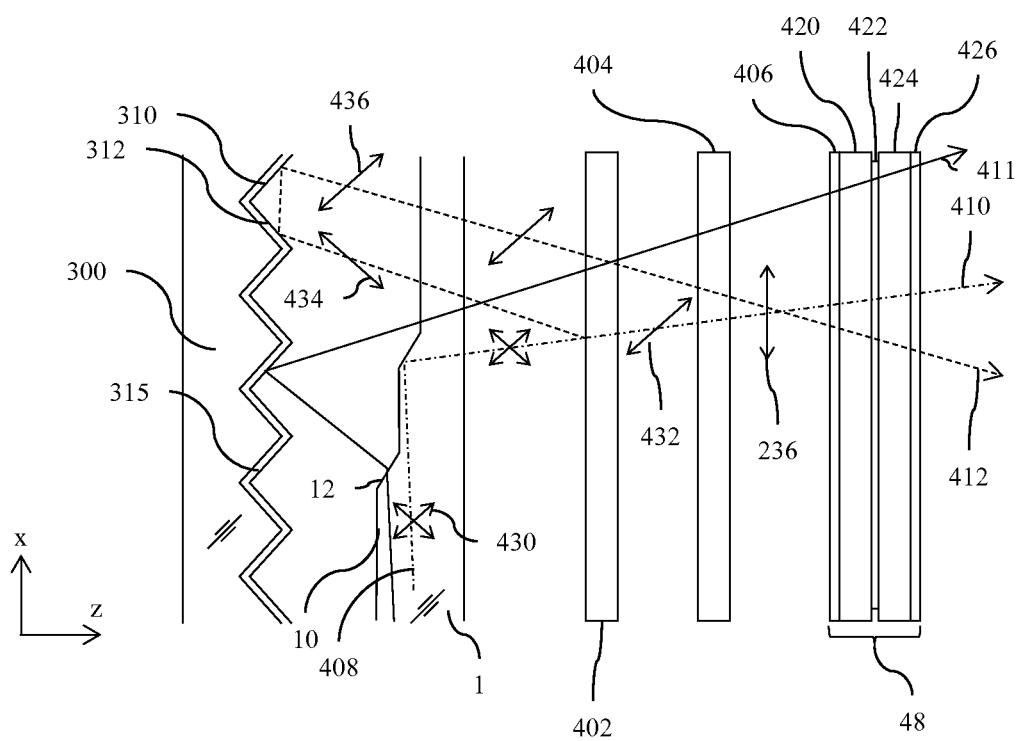
FIG. 35A is a schematic diagram illustrating a side view of an embodiment of a directional display device with polarization recovery of FIG. 34, in accordance with the present disclosure.
Figure 35B:
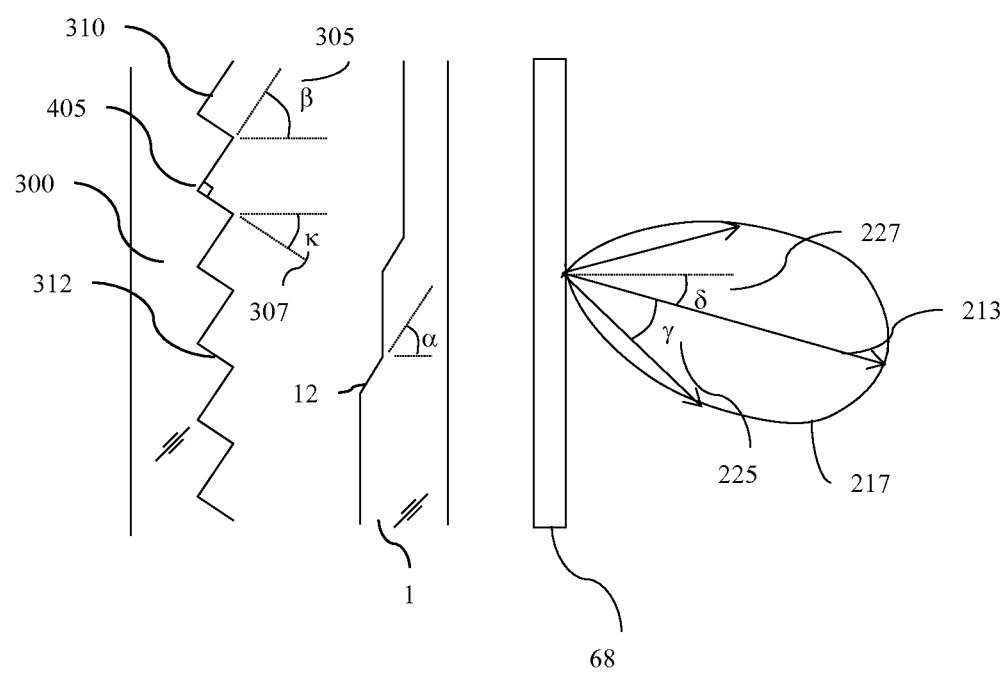
FIG. 35B is a schematic diagram illustrating a further side view of a detail of the polarization recovery arrangement of FIG. 34, in accordance with the present disclosure.
Figure 35C:
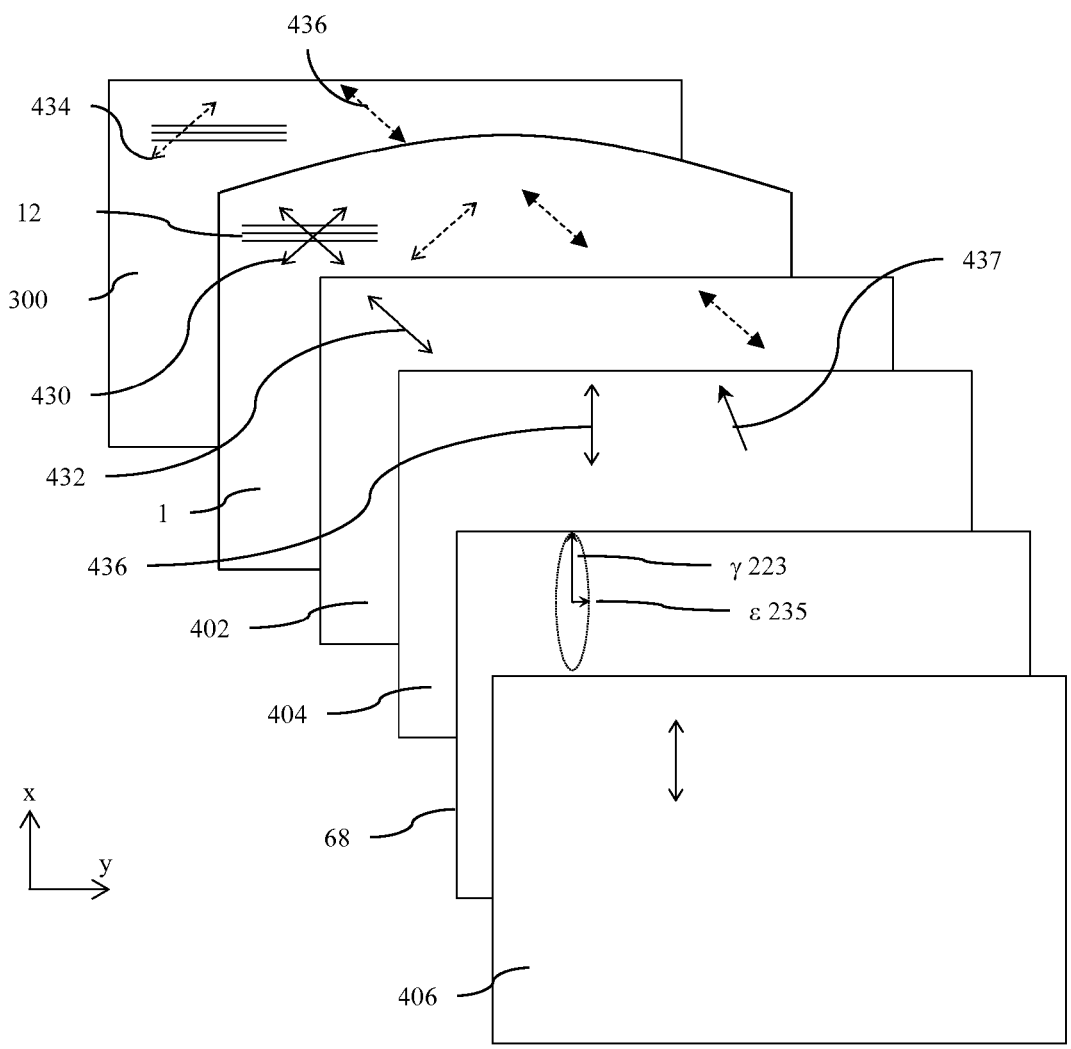
FIG. 35C is a schematic diagram illustrating a front view of the polarization recovery arrangement of FIG. 34, in accordance with the present disclosure.

FIG. 35A is a schematic diagram illustrating a side view of a detail of a directional display device with polarization recovery of FIG. 34. The directional display device may include a directional backlight and a transmissive spatial light modulator. FIG. 35B illustrates a side view of an arrangement of reflector 300, waveguide 1 and diffuser 68 in an illustrative example. FIG. 35C is a schematic diagram illustrating a schematic front view of the polarization recovery embodiment of FIG. 34. For clarification purposes Fresnel lens 62 and diffuser 68 are not shown in FIGS. 35A-C.

Light rays 408 propagating in the waveguide of waveguide 1 include unpolarized light state 430. Light rays reflected by total internal reflection from light extraction feature 12 are substantially unpolarized and incident on reflective polarizer 402 as described above.

Light rays 410 transmitted through reflective polarizer 402 are directed through an optional retarder 404 which may be a half wave retarder with appropriately oriented optical axis direction 437 arranged to direct the first polarization component 436 on to the transmission axis of clean up input polarizer 406 of spatial light modulator 48. Desirably the polarization transmission axes of the polarizer 402 and polarizer 406 are substantially parallel to minimize the visibility of off-axis retardation variations in the retarder 404 that may be a stack of retarders.

Diffuser 68 may be inserted into the stack with vertical (x-axis) diffusion angle γ 223 and horizontal (y-axis) diffusion angles 235, further providing deflection δ 227 in the vertical (x axis) direction as required. Diffuser 68 may be positioned between the waveguide 1 and SLM 48 input polarizer 406. Desirably the diffuser does not substantially change ray paths before the reflective polarizer 402 and so is positioned between the reflective polarizer and clean up polarizer. Further diffuser may be incorporated between the waveguide 1 and reflective facets 310; however losses associated with high angles of incidence and shown in FIG. 32C for example may be present.

Spatial light modulator 48 may further include substrates 420, 424 such as glass substrates, liquid crystal layer 422 and output polarizer 426.

Light rays 412 reflected by reflective polarizer 402 as rejected light are transmitted through waveguide 1 and incident on the prismatic reflective film 300. The prismatic reflective film 300 may comprise a linear array of pairs of reflective corner facets 310, 312. The corner facets 310, 312 are inclined in opposite senses in a common plane so that the individual light rays 412 undergo a reflection from a pair of the corner facets 310, 312. That common plane in which the corner facets 310, 312 are inclined is oriented around the normal to SLM 48 so that the rear reflector converts the polarization of the rejected light supplied back to spatial light modulator into the first polarization on reflection from a pair of corner facets. This may be achieved by the common plane extending at 45° to the polarization of the second polarization component at the reflector 200.

Thus as shown in FIG. 20, light rays 412 are reflected by both facets 310, 312 of the prismatic reflective film 300. Light rays 434 are incident with a polarization state 434 at an angle of 45° with respect to the elongate prismatic facets 310, 312 of the prismatic reflective film 300, as illustrated in FIG. 35C. After the reflections at facets 310, 312, a polarization state rotation for ray 412 is achieved so that polarization state 434 is rotated to polarization state 436 due to the respective phase changes on reflection at each inclined facet 310, 312. Thus light ray 412 outputted through the spatial light modulator 48 has the polarization state 436 that is substantially the same as the polarization state 432 of rays 412.

In an illustrative example, angle α 238 of waveguide 1 features 12 may be set to 45° angle β 305 may be set to 60°, angle κ 307 may be set to 30° so that the apex angle 405 shown in FIG. 35B is set to 90° and the facets 310, 312 are arranged to achieve a retroreflection of light rays 412 in the x-z plane, achieving a polarization reflection of state 434 to state 436 in reflection. If the apex angle 405 is set to a different angle than 90°, the incident polarization state 434 angle may be adjusted in comparison to the extent of the facets 312, 310 in the y direction to optimise polarization recirculation, although complete rotation of polarization state 434 may not be achieved. As shown by curve 332 in FIG. 32, the diffuser angle γ 225 and δ 227 may be set to 15° and −15° respectively, which may increase brightness by adding rays 411 to rays 410 by a factor of two. Further rays 411, 412 may undergo polarization recirculation so that the brightness of the display may be further increased by a factor of up to two. Thus the total display brightness may be increased by a factor of up to four compared to that achieved by rays 410.

Figure 35D:
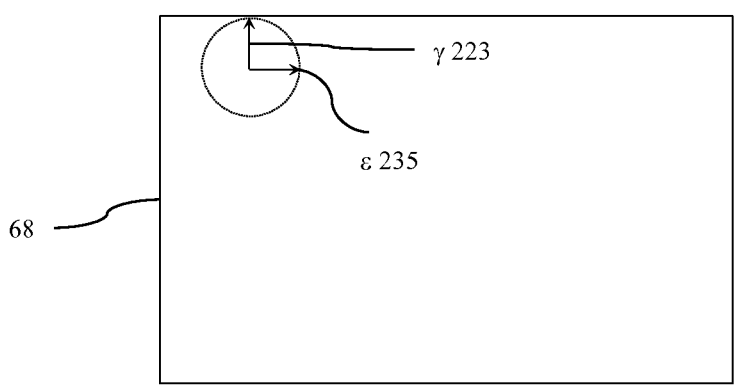
FIG. 35D is a schematic diagram illustrating a front view of a symmetric diffuser for use in the arrangement of FIG. 36A, in accordance with the present disclosure.

FIG. 35D is a schematic diagram illustrating the front view of a symmetric diffuser that may alternatively be used in the arrangement of FIG. 35C. Such a symmetric diffuser may be used in arrangements wherein the amount of diffusion desirable in the y-axis is similar to the amount of diffusion desirable in the x-axis. In an illustrative example, a 12 degree full width half maximum diffusion angle in the y-axis may be arranged with a high brightness 2D display or a low power consumption 2D display to achieve viewing window (that may be composed of multiple optical windows) that have a nominal width at the window plane 106 of 300 mm of 60 mm. A similar diffusion angle may be desirable in the x-axis to achieve a variation of luminous intensity that is similar to the profile 352 shown in FIG. 32C.

Figure 35E:
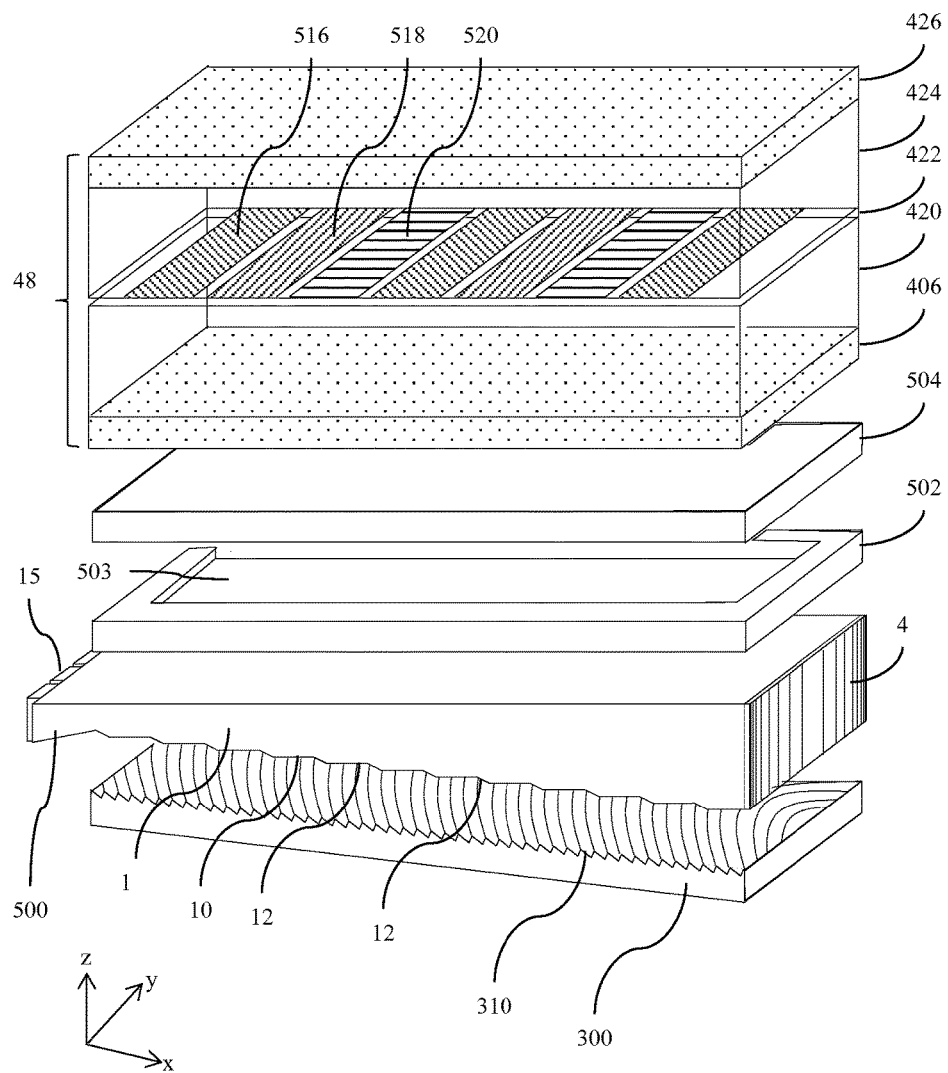
FIG. 35E is a schematic diagram illustrating a perspective view of an optical stack-up comprising an optical valve, a rear reflector, an optical control layer and a spatial light modulator, in accordance with the present disclosure.

FIG. 35E is a schematic diagram illustrating a perspective view of an optical stack-up comprising an optical valve comprising waveguide 1, a rear reflector 300, an optical control layer 504 and a spatial light modulator 48. Reflective end 4 of waveguide 1 may comprise a Fresnel mirror and a taper region 500 may be introduced to the waveguide 1 to achieve increased light coupling from light emitting element array 15 into the waveguide 1. Shading layer 502 with aperture region 503 may be arranged to hide the edges of the backlight to a display observer. Optical control layer 504 may comprise reflective polarizer, retarder and diffuser layers as described elsewhere in the present embodiments. Spatial light modulator 48 may comprise input polarizer 406, TFT glass substrate 420, liquid crystal layer 422, colour filter glass substrate 424 and output polarizer 426. Red pixels 516, green pixels 518 and blue pixels 520 may be arranged within the liquid crystal layer.

Figures 35F, 35G:
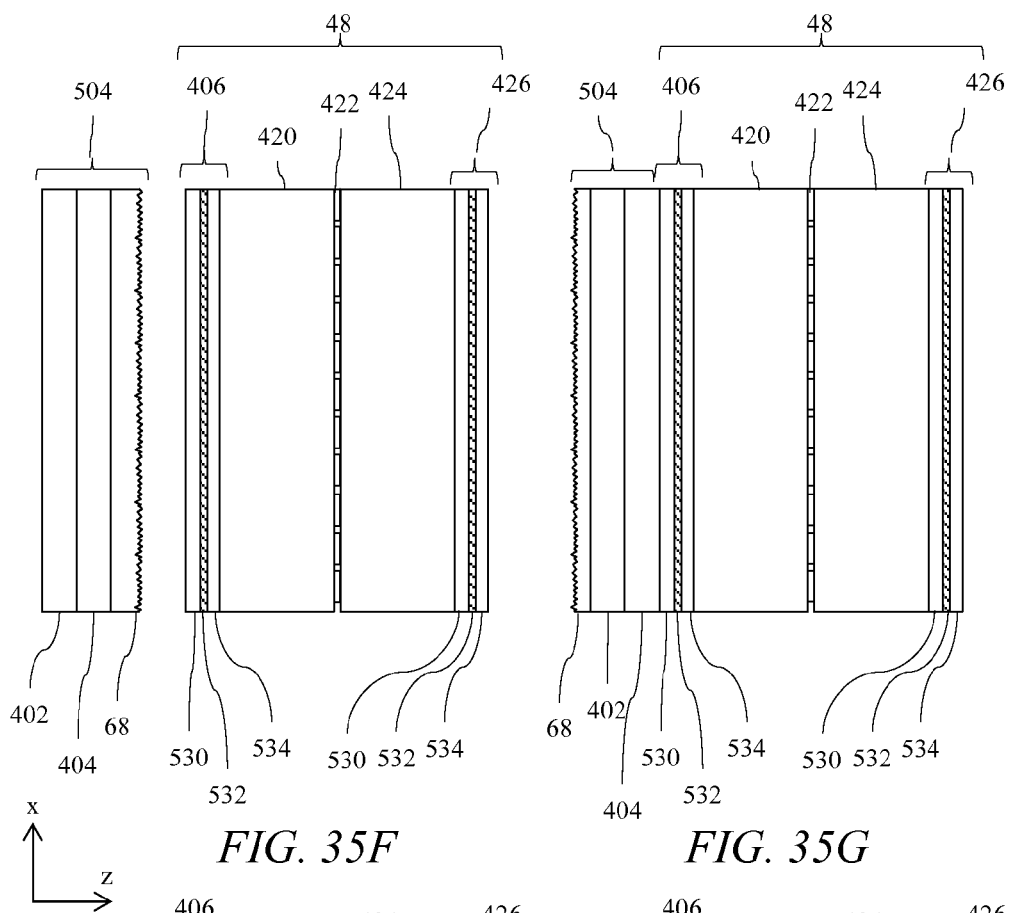
FIGS. 35F-35I are schematic diagrams illustrating side views of an optical stack-up comprising an optical control layers and a spatial light modulator, in accordance with the present disclosure.

FIGS. 35F-3M are schematic diagrams illustrating side views of an optical stack-up comprising an optical control layers 504 and a spatial light modulator 48. FIG. 35F illustrates optical control layer 504 may comprise reflective polarizer 402, half wave retarder 404 and diffuser 68. Polarizers 406, 426 may each comprise a polarization absorption layer 532 such as iodine and stretched PVA, further comprising encapsulant layers 530, 534. FIG. 35G illustrates a further embodiment wherein the optical control layer 504 is attached to the input polarizer 406, for example by means of a pressure sensitive adhesive layer (not shown). The diffuser 68 may be formed on the input side of the layer 504. Advantageously the optical losses are reduced compared to the arrangement of FIG. 35F, increasing display efficiency.

Figures 35H, 35I:
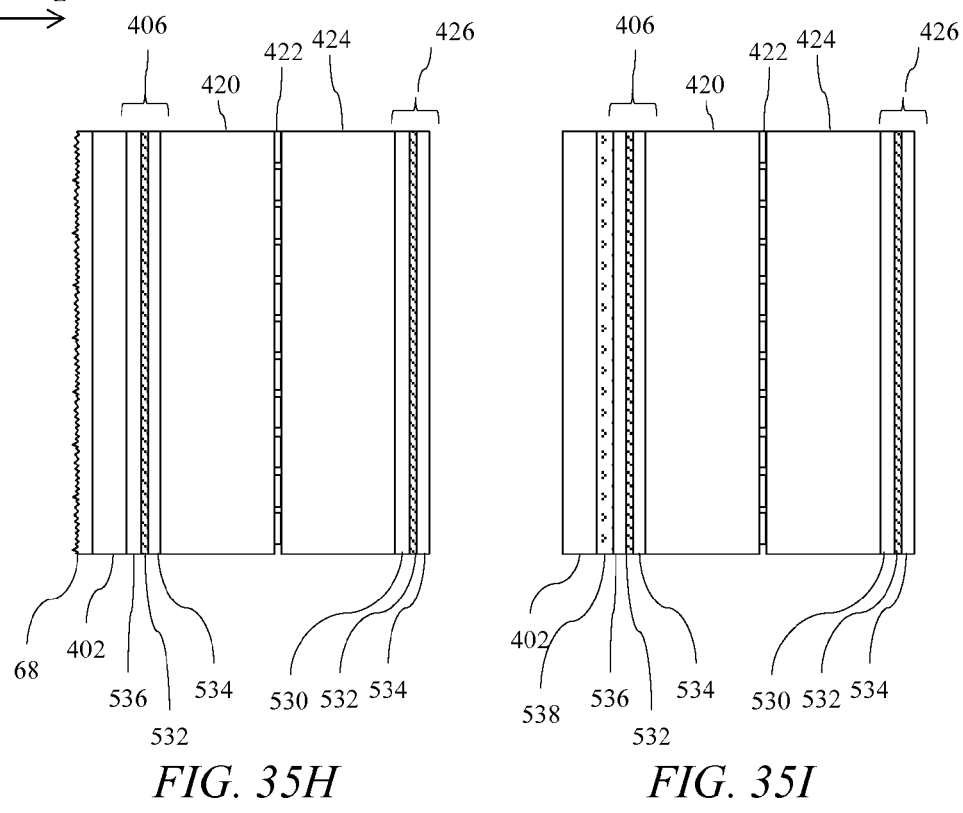

It may be desirable to further reduce the number of layers. FIG. 35H shows that the input encapsulant layer 536 of the input polarizer 406 may comprise a further retarder function to achieve polarization rotation as described for example in FIGS. 38A-B. The layer 534 may comprise TAC (Cellulose triacetate) whereas the layer 536 may for example comprise TAC-R, further comprising a half wave retardation function. Thus the spatial light modulator input polarizer may comprise an encapsulant layer that is an optical retarder.

It is further desirable that the diffuser 68 is provided between the reflective polarizer 402 and spatial light modulator 48 to increase the efficiency of polarization recirculation. Such an arrangement can be achieved as shown in FIG. 35I wherein diffusing adhesive layer 538 is incorporated at a position between the reflective layer 402 and the pixel plane 422. The diffusing adhesive layer may incorporate be provided by differential regions of high and low refractive index for example, minimizing depolarization effects within the adhesive layer 538 while achieving desirable diffusion characteristics. Advantageously the cost and complexity of the optical control layer and spatial light modulator combination can be reduced while the optical efficiency can be increased.

Figure 36A:
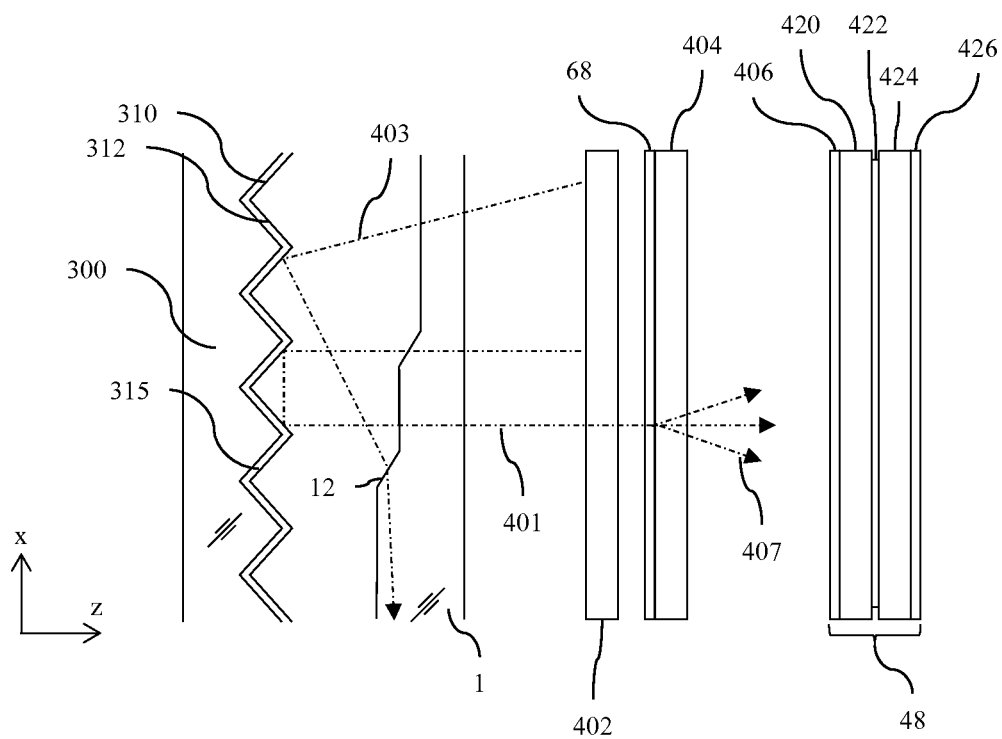
FIGS. 36A-36B are schematic diagrams illustrating further side views of polarization recovery arrangements, in accordance with the present disclosure.
Figure 36B:
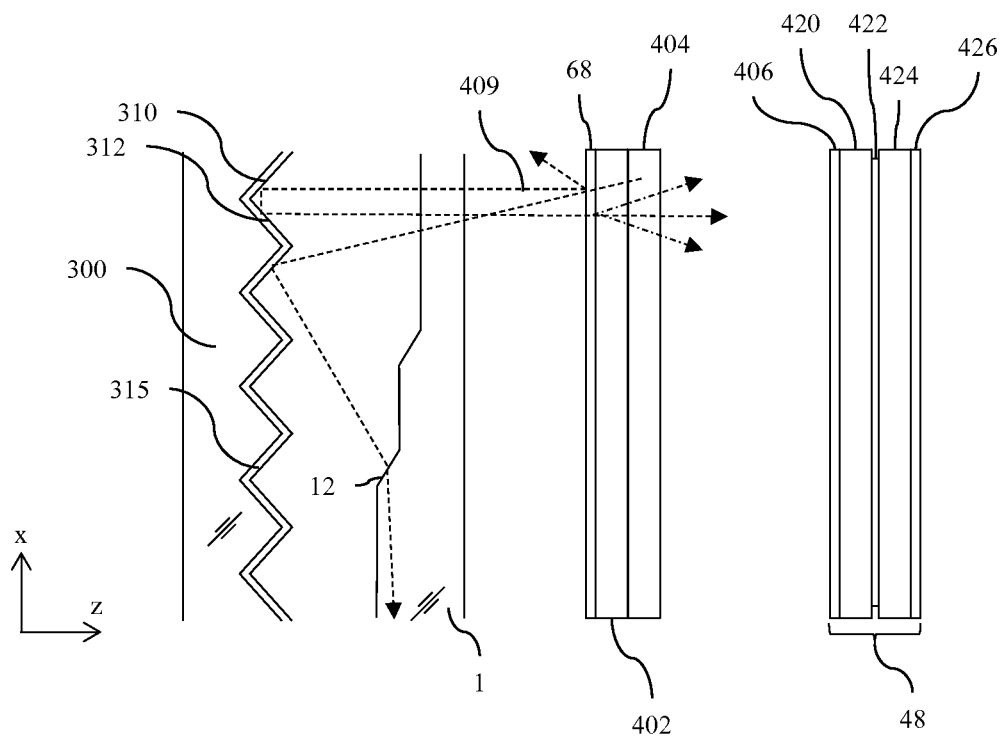

FIGS. 36A-B are schematic diagrams illustrating further side views of polarization recovery arrangements similar to that shown in FIG. 35A, further comprising diffuser layers 68. Diffuser 68 may have a low birefringence and may be arranged with retarder 404, and as shown in FIG. 36A may be formed on the surface of retarder 404. Light rays 403 that are reflected by the reflective polarizer 402 may be incident on regions of the rear reflector and redirected into the waveguide 1 by means of the features 12. Light rays 401 that are within the entrance aperture of the rear reflector corner reflectors (comprising facets 310, 312) is retroreflected and directed into cone 407 by diffuser 68.

In FIG. 36B, diffuser 68 is arranged between the waveguide 1 and reflective polarizer 402, and may be formed on the reflective polarizer 402. Thus diffusion of light rays 409 may change the proportion of rays 403 that are directed back into the waveguide. Advantageously polarization recirculation properties may be varied.

Figure 37A:
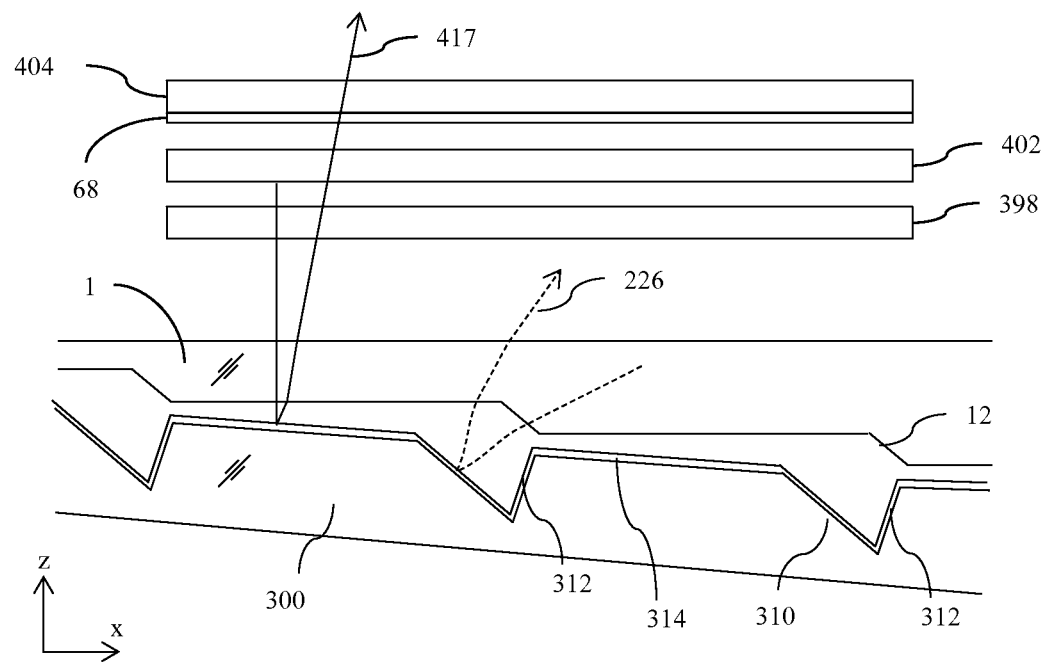
FIGS. 37A-37B are schematic diagrams illustrating a side view of a polarization recovery arrangement, in accordance with the present disclosure.
Figure 37B:
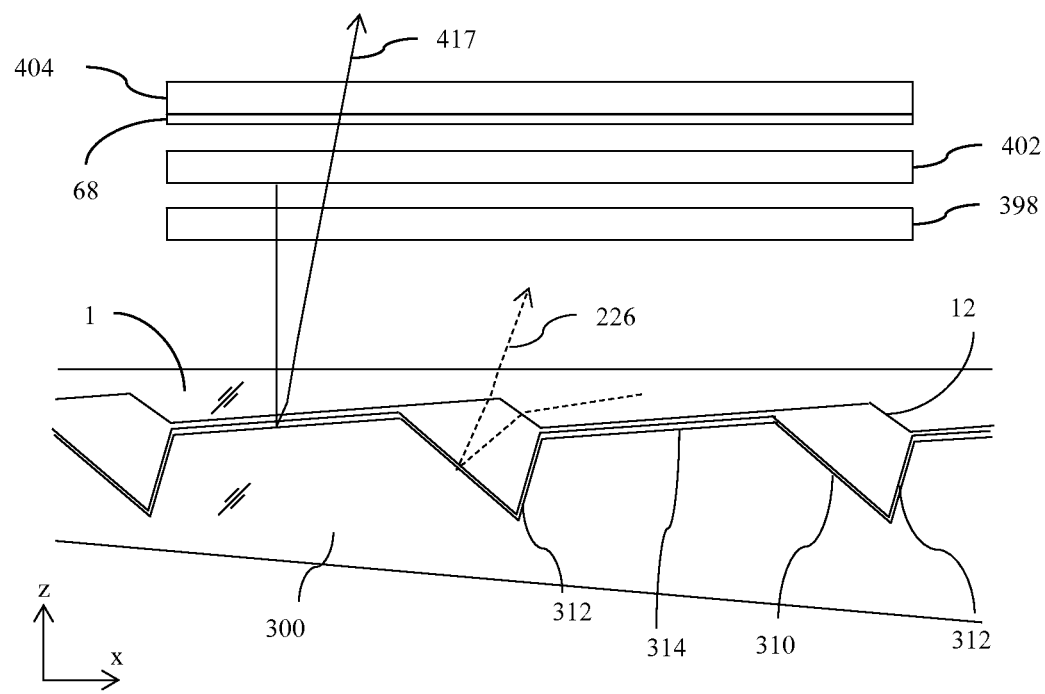

FIGS. 37A-37B are schematic diagrams illustrating a side view of a polarization recovery arrangement using aligned rear reflectors. Further FIG. 37B uses a waveguide similar to that shown in FIG. 28C and a rear reflector similar to that shown in FIG. 28A. Advantageously light rays 417 may substantially be reflected by the planar reflective regions 314. Additional quarter wave plate 398 may be arranged to rotate the polarization state of the reflected light rays 417 so that they are transmitted through the reflective polarizer 402. Advantageously the display luminous intensity can be increased for certain viewing angles.

Figure 37C:
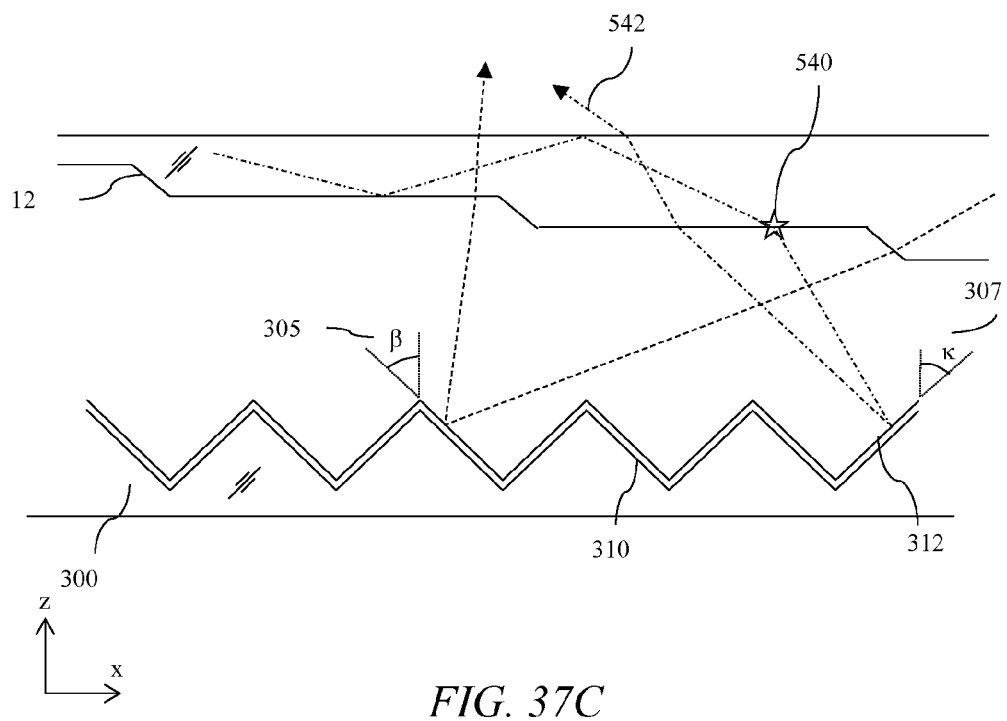
FIG. 37C is a schematic diagram illustrating a side view of an optical valve comprising a light scattering feature and a rear reflector, in accordance with the present disclosure.

FIG. 37C is a schematic diagram illustrating a side view of an optical valve comprising waveguide 1 further comprising a light scattering feature and a rear reflector 300. In operation, light propagating from input end 2 comprising aligned the light emitting element array 15 to the reflective end 4 may encounter scattering loss, for example due to mode coupling losses or scattering features 540 that may be scratches or tooling marks. Thus light rays 542 may exit the waveguide 1 and are incident on the rear reflector 300, particularly the draft facet 312.

Figure 37D:
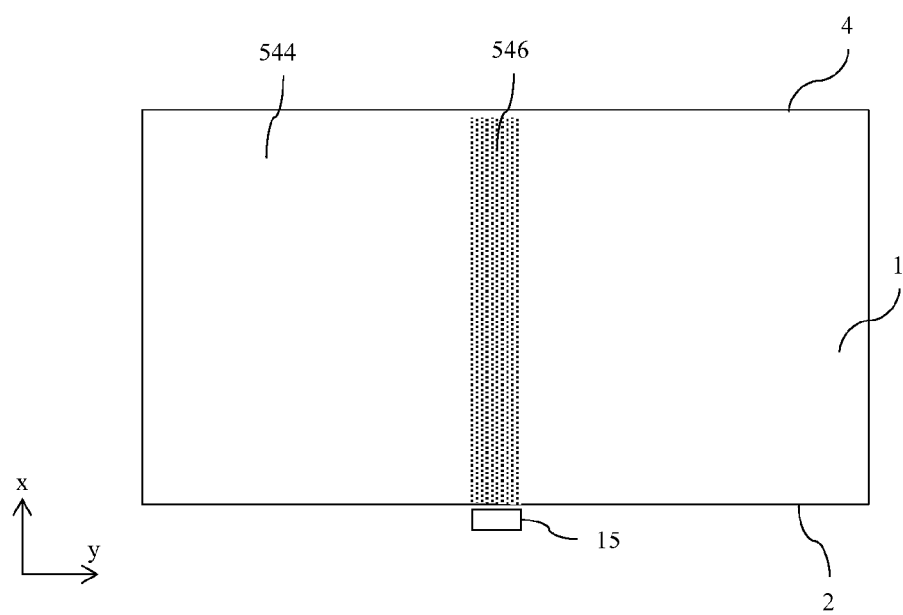
FIG. 37D is a schematic diagram illustrating a front view of the appearance of an optical valve comprising a light scattering feature and a rear reflector, in accordance with the present disclosure.

FIG. 37D is a schematic diagram illustrating a front view of the appearance of an optical valve comprising a light scattering feature 540 and rear reflector 300. In operation, light source of array 15 will produce the appearance of a band region 546 within a dark region 544 of light that appears to propagate from the array 15 to the reflective end 4 of the waveguide 1, depending on the density and form of the features 540. It may be desirable to reduce the visibility of the region 546.

Figure 37E:
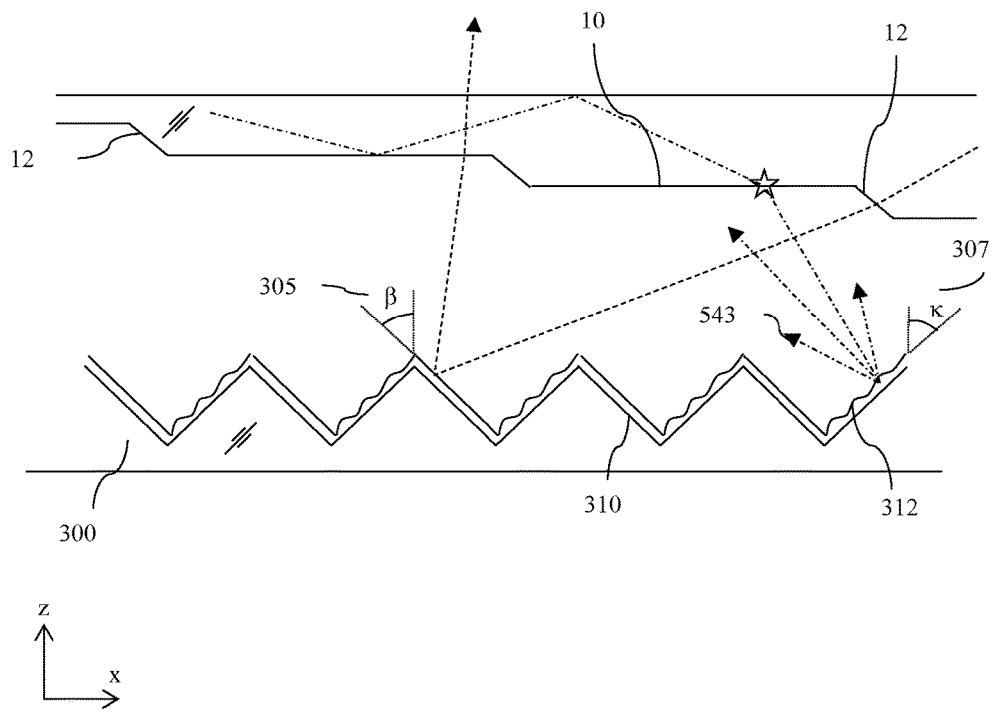
FIG. 37E is a schematic diagram illustrating a side view of an optical valve comprising a light scattering feature and a rear reflector further comprising a light scattering facet surface, in accordance with the present disclosure.

FIG. 37E is a schematic diagram illustrating a side view of an optical valve comprising waveguide 1; a light scattering feature 540 and a rear reflector further comprising a light scattering facet surface 312 that may be a rough reflective surface. The facet 310 may be typically be a specular reflective surface although may be slightly rough. The roughness may be provided in at least the y-z plane and may also be in the x-z plane as shown in FIG. 37E. Thus rays 543 that are incident on the facet 312 are scattered to a broader cone than that of FIG. 37C.

Figure 37F:
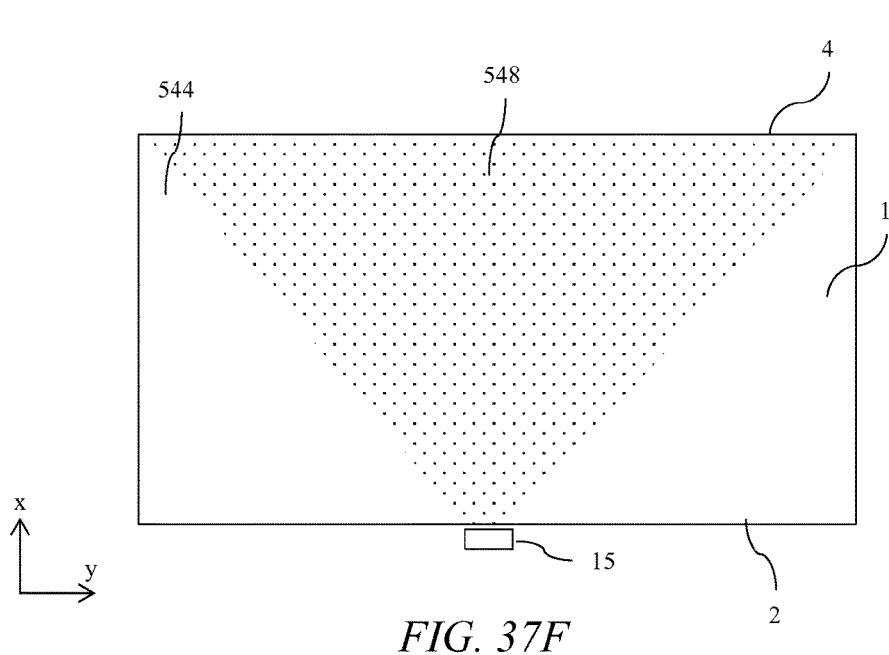
FIG. 37F is a schematic diagram illustrating a front view of the appearance of an optical valve comprising a light scattering feature and a rear reflector further comprising a light scattering facet surface, in accordance with the present disclosure.

FIG. 37F is a schematic diagram illustrating a front view of the appearance of an optical valve comprising a light scattering feature and a rear reflector 310 further comprising a light scattering facet 312 surface. Thus the region 548 may have a triangular form with lower peak luminance compared to the region 546 of FIG. 37D. Such appearance may be substantially hidden by diffuser 68.

Figure 37G:
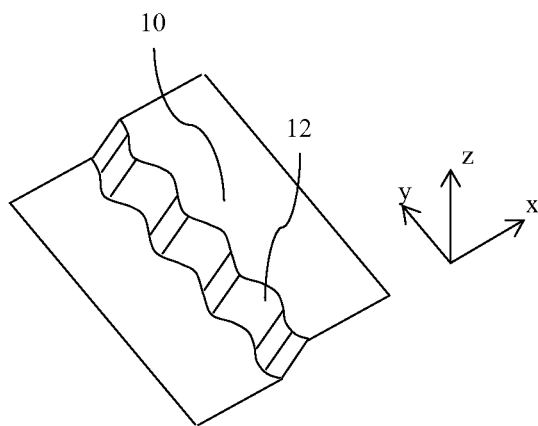
FIG. 37G is a schematic diagram illustrating a perspective view of a light extraction feature of an optical valve comprising an undulating structure, in accordance with the present disclosure.

FIG. 37G is a schematic diagram illustrating a perspective view of a light extraction feature of an optical valve comprising an undulating structure. Such an undulating structure can be applied to linear light extraction facets 12 to reduce the appearance of Moiré between the light extraction facets 12 and pixels of the SLM 48. The undulation may be provided for example during diamond tooling of the surface form by controlling diamond height and lateral position during a cutting step.

Figure 37H:
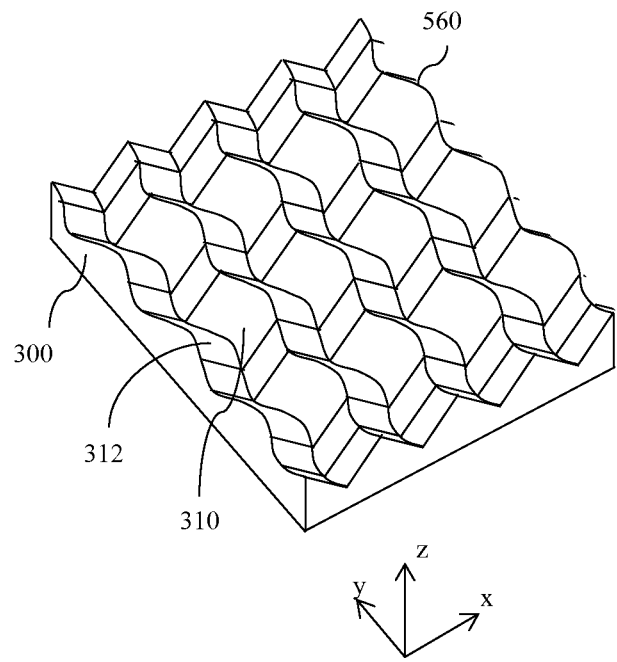
FIG. 37H-37I are schematic diagrams illustrating perspective views of rear reflectors comprising an undulating structure, in accordance with the present disclosure.
Figure 37I:
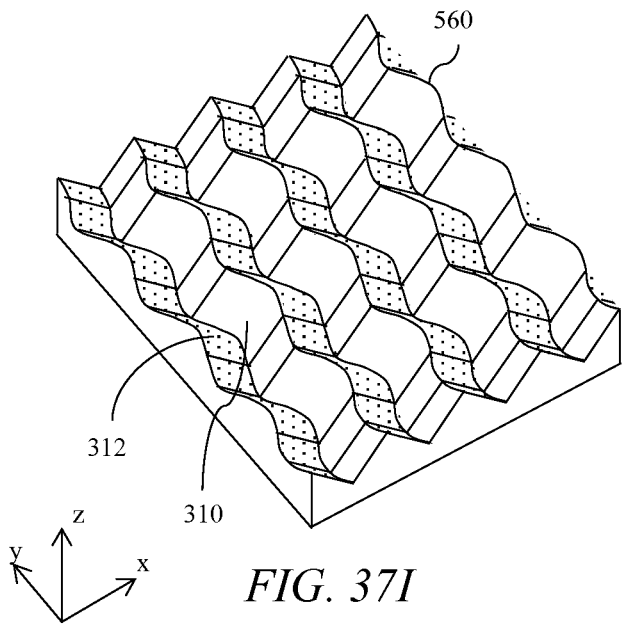

FIG. 37H-I are schematic diagrams illustrating perspective views of rear reflectors comprising an undulating structure comprising an undulating locus 560 of the peaks of the facets 310 for specular and rough reflecting facets 312 respectively. Further Moiré may be present between the facets 12 and facets 310, 312. Undulation can be arranged to reduce the appearance of Moiré.

As used herein, the adjective "linear" as applied to an array of facets or features means that the array is a linear array, or that the facets in the array repeat in a linear direction. In contrast, the adjective "linear" as applied to facets or features means that the facets or features themselves are linear. However, in general the facets or features in a linear array may be linear or another shape such as curved. Similarly, the facets or features may be flat or have an uneven shape, for example being undulating along their length or being rough.

Figure 38A:
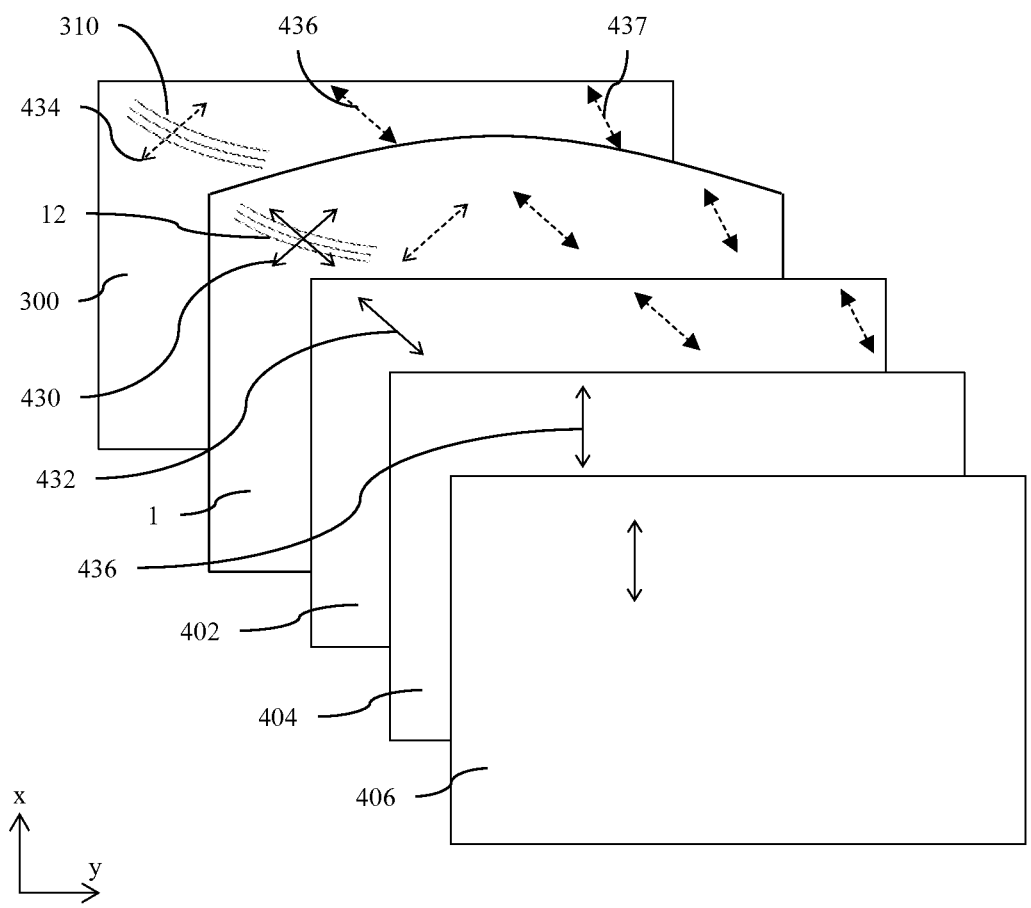
FIG. 38A is a schematic diagram illustrating a front view of a polarization recovery embodiment comprising curved facets, in accordance with the present disclosure.

FIG. 38A is a schematic diagram illustrating a further schematic front view of the polarization recovery embodiment of FIG. 34 further comprising curved extraction features 12 and curved reflection facets 310 to provide focusing without the requirement of an additional Fresnel lens, in a similar manner to that described in FIG. 15A for example. The varying orientation of the reflector film facets rotates the incident linear polarization state 434 to one of varying polarization orientations such as 436 and 437 dependent on location in the lateral direction (y-axis). To continue the illustrative example, the radius of curvature of the extraction features 12 in the x-y plane may be approximately 440 mm while the radius of curvature of the reflective facets 310 of the rear reflector 300 in the x-y plane may be. Advantageously polarization recirculation is achieved in a thin structure, achieving increased brightness and efficiency, and low power consumption.

Figure 38B:
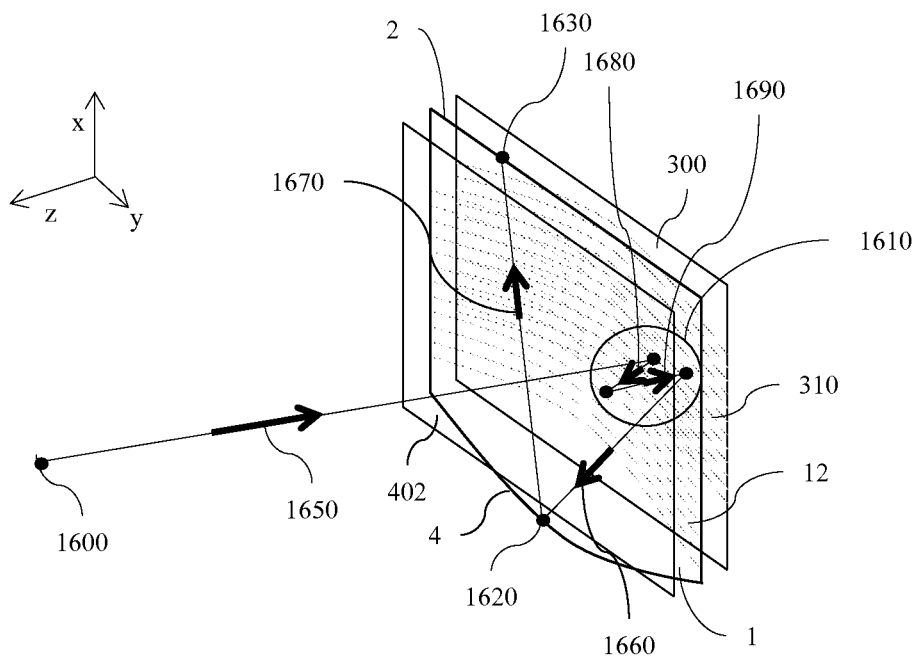
FIG. 38B is a schematic diagram illustrating recirculated ray paths traced to optimize backlight design, in accordance with the present disclosure.

FIG. 38B is a schematic diagram illustrating a modified ray path of that shown in FIG. 33D whereby the ray 1650 emanating from a single viewing point 1600 (representing the position of a viewer 99 eye) reflects from the reflector film at region 1610 before creating the counter propagating ray 1680. This is reflected back from reflecting polarizer 402 prior to hitting either an extraction feature 12 or reflector facet 310 at substantially the same position 1610; then guiding within the waveguide 1 as ray 1660, reflecting off the curved end surface 4 and finally propagating as ray 1670 towards a position 1630 along the entrance aperture of side 2. It can thus be shown that the rays from point 1600 can be directed to substantially the same position in the entrance aperture of the side 2, and thus the same light source of the array 15a-n. In this manner the facets 310 may be arranged to produce polarization converted light in the same direction as the light that was transmitted through the reflective polarizer at first incidence. Advantageously the viewing windows of the display may have increased brightness and low cross talk.

Figure 39:
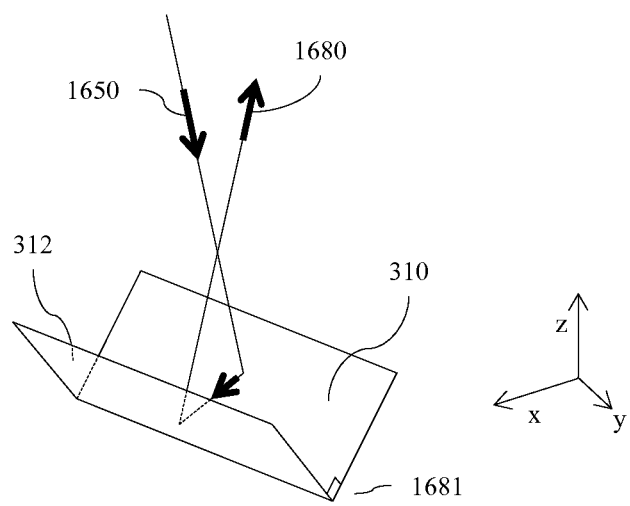
FIG. 39 is a schematic diagram illustrating recirculated rays double reflecting off the reflector film facets, in accordance with the present disclosure.

FIG. 39 illustrates in more detail the double reflection of an incident ray 1650 off the surfaces 310 and 312 of the prismatic reflector film creating the counter propagating ray 1680. Thus the facets 310, 312 may be arranged with an included angle 1681 of 90° that provides a retroreflection for light rays 1650 resolved in a first plane parallel to the surface normals of surfaces 310, 312, but a mirror reflection in the orthogonal plane.

Figure 40:
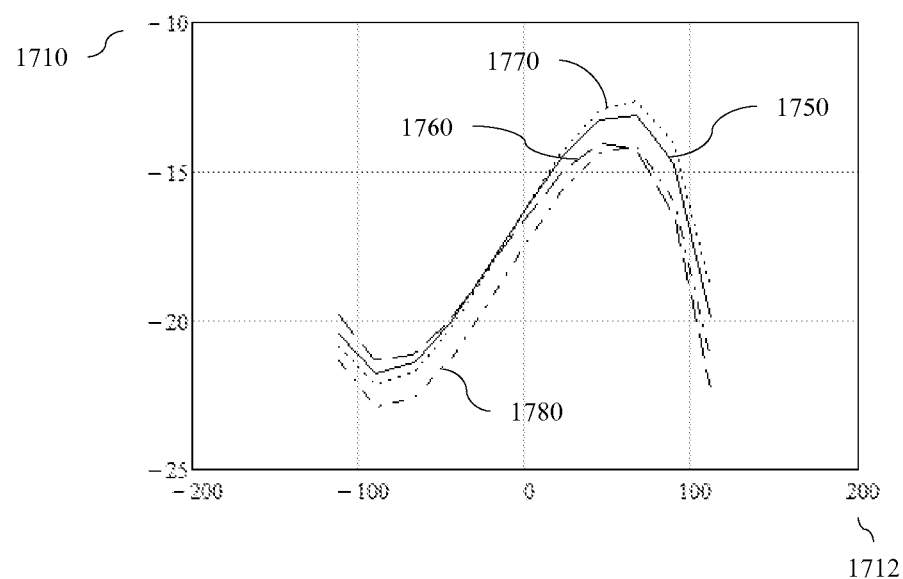
FIG. 40 is a schematic diagram illustrating a graph of ray emitting position versus horizontal screen position for those rays emanating from a single viewing point and either undergoing recirculation or not, and then reflecting either off extraction features or reflector facets, in accordance with the present disclosure.

FIG. 40 illustrates a graph showing a traced ray position (in millimeters) along the entrance aperture of side 2 (axis 1710) for different entrance positions in mm along a horizontal line bisecting the optical valve (axis 1712). The viewing position 1600 in this exemplary case is 65 mm off-axis in both vertical and horizontal dimensions at a viewing distance to plane 106 (as shown in FIG. 12) of 400 mm from the normal from the centre of the waveguide 1. The four traces shown in the graph are for the two ray path options depicted in FIG. 33E (1750, 1770 being off the extraction feature and trace 1760, 1780 being off the reflector facets) combined with either the recirculation ray path option (1770, 1780) or not (1750, 1760). The radii of the curved reflecting features and that of the imaging surface 4 may be adjusted for optimised localization for on-axis viewing. The result suggests that recirculated light emanates at source positions close to those of non-recirculated light preserving the mapping between source and viewer positions necessary for accurate illumination control.

It may be desirable to achieve a display that is capable of viewing in bright lighting conditions, for example 25,000 lux or can operate with high efficiency for a desirable luminance, for example 500 nits. The directional backlights of the present embodiment can efficiently direct light into a narrow range of angles in comparison to conventional 2D backlight systems and thus may achieve high brightness for a given power consumption, or high efficiency for a given luminance.

Figure 41:
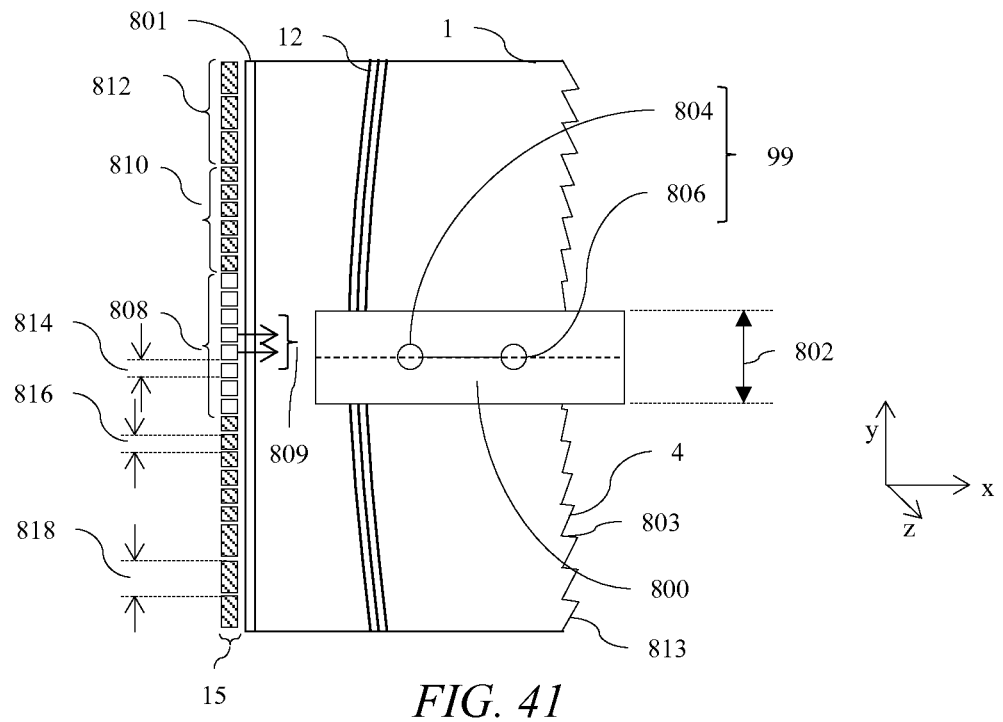
FIG. 41 is a schematic diagram illustrating a front view of an optical valve arranged in portrait orientation to provide a horizontal 2D viewing window, in accordance with the present disclosure.

FIG. 41 is a schematic diagram illustrating the front view of a backlight arrangement that produces a horizontal viewing window 800 with a portrait oriented optical valve waveguide 1 illuminated with a vertical LED array 15 for use in a high brightness or high efficiency display apparatus. Note that the coordinate axes are referenced to the waveguide orientation rather than the observer space, thus horizontal viewing window 800 is provided for an observer 99 with left eye position 804 and right eye position 806.

Reflective end 4 may comprise a Fresnel mirror arranged to substantially collimate light from sources of the array 15 from reflecting facets 813. In cooperation with extraction features 12 and optional light reflecting facets 310 (not shown) form viewing window 800. Advantageously a Fresnel mirror may achieve a small bezel in comparison with the domed surface 4 shown in FIG. 35C for example. The draft facets 803 of the Fresnel mirror may provide scatter in the optical system. Scatter in such a high brightness or high efficiency 2D display may achieve desirable levels of uniformity of viewing windows without the constraints of low image cross talk that are desirable in autostereoscopic displays. Further diffusion properties maybe incorporated in the draft facets 803 to minimize non-uniformity effects of the light reflected from the facets 803.

Input diffuser 801 may be an asymmetric diffuser with diffusion in the x-y plane and arranged to reduce the visibility of the gaps between the LEDs of the array 15 without substantially increasing loss of light coupling into the waveguide in the x-z plane. The input diffuser 801 may be arranged with diffusion properties that are different in the region of groups 812 than in the region of groups 810 for example.

Light emitting element array 15 such as an LED array may comprise a first group 808 of LEDs that may have high brightness output capability; second groups 810 of LEDs that have similar pitch 816 to the pitch 814 LEDs of the group 808 and third groups 812 of LEDs that may have a pitch 818 that may be greater than the pitch 814 of the LEDs of the group 808. Further groups may be incorporated or there may be a gradual increase of pitch from the centre of the array 15 to the outer regions for example. The LEDs of the group 808 may have higher brightness output but lower efficiency than the LEDs of the groups 810, 812.

In operation in a high brightness mode of operation, LEDs 809 of the first group 808 may be directed by means of the optical valve arrangement to the viewing window 800 comprising two optical windows and size 802. Thus an observer 99 with eyes located at positions 804, 806 may see an image across the area of the SLM 48 (not shown). As the observer 99 eyes move, the optical windows may be adjusted so that the viewing windows move in correspondence to observer position, thus increasing viewing freedom.

In an illustrative example a display of diagonal may be illuminated by LEDs in the first group 808 of size 2.6×1 mm on a pitch of 3.5 mm. The output of the LEDs may be 50 lumens at 600 mW, thus a total power of 1.2 W may be arranged to provide window 800. An optical valve of height 50 mm suitable for mobile phone applications may be arranged to provide viewing windows at 300 mm viewing distance, with window height 802 of approximately 60 mm. In cooperation with polarization recirculation and faceted reflection film 300, the on-axis output luminance of the display may be approximately at least 2000 nits when used in cooperation with an LCD of transmission of 6.5% to unpolarized light. The reflections from the front of the display may for example be 5%. At screen illuminance of 25,000 Lux a contrast ratio of 5:1 may be achieved in comparison to a contrast ratio of 1.3:1 for a display of luminance 500 nits. Thus advantageously the contrast ratio of the display may be substantially enhanced in high brightness environments.

For operation at 500 nits display luminance, a power consumption of 300 mW may be achieved. Advantageously, the brightness of the display is substantially higher than can be achieved for the same input power in a conventional backlight, for example a display comprising ESR™, BEF II™ and DBEF™ from 3M Corporation and diffusers.

Continuing the illustrative example herein, the LEDs of the group 808 may have a luminous efficiency of 60 Lumens per Watt (lm/W), whereas the luminous efficiency of the LEDs of the groups 810, 812 may be 80 lm/W at a peak drive luminous flux of 20 lumens. The pitch 818 may be 5 mm or greater. Input diffuser 801 may vary in its diffusion properties along the entrance aperture to accommodate the different LED spacing. Advantageously the cost and number of the LEDs in the groups 810, 812 may be reduced.

In a further illustrative example, a display of height 50 mm may be provided with a light emitting element array 15 with an array package luminous emittance of 7 lumens per millimeter. A display output luminance of 1500 nits for on-axis viewing positions may be achieved with a display of transmission approximately 5%. In operation in outdoors environments of 25,000 lux with typical background white level reflectivity of 50%, the adapted eye white level is approximately 4000 nits. The relative display luminance compared to the adapted eye white level is 37% and close to the reflectivity of known high reflectivity monochrome electrophoretic displays. This compares to less than 15% for a standard display. Thus the readability of the image of the present embodiments is substantially higher in high ambient illumination environments. Further full colour moving images are achieved for outdoors operation.

Figure 42A:
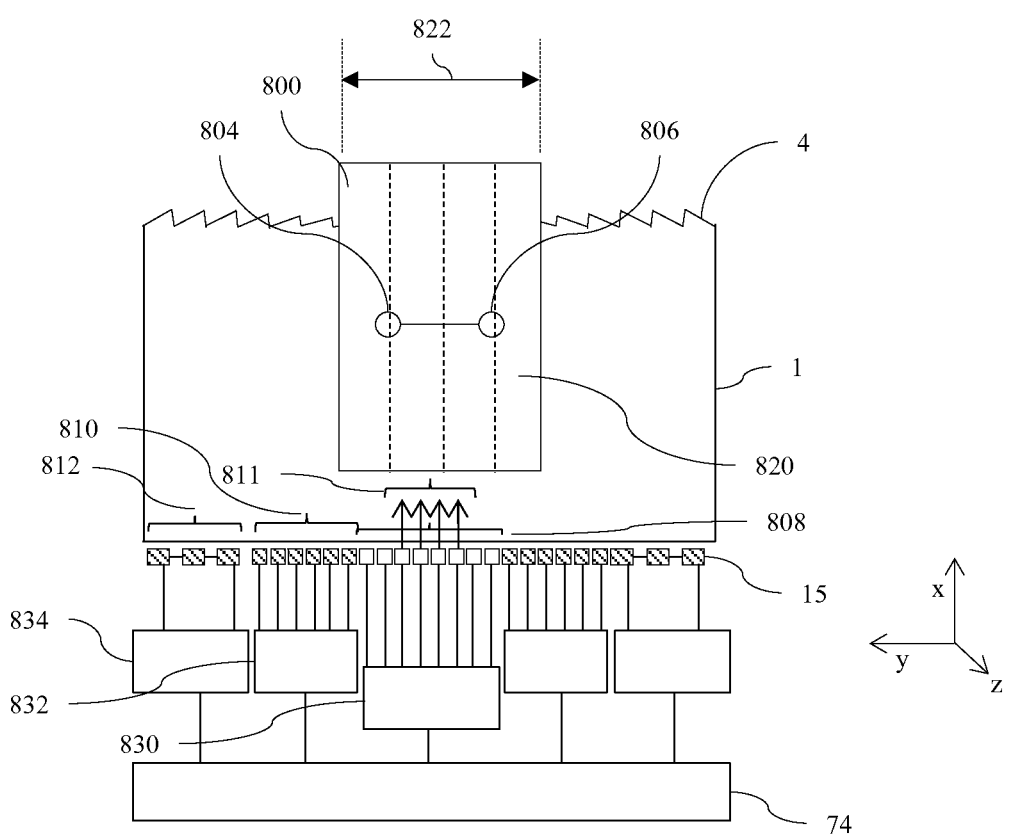
FIG. 42A is a schematic diagram illustrating a front view of an optical valve arranged in landscape orientation to provide a vertical 2D viewing window, in accordance with the present disclosure.

FIG. 42A illustrates a similar illumination system to that of FIG. 41 arranged in landscape orientation with respect to observer 99, achieving vertical viewing window 800 comprising four optical windows when illuminated by LEDs of group 811. To continue the illustrative example, the viewing window width may be increased to approximately 120 mm, comprising four optical windows. Further FIG. 42 illustrates LED drive circuits 830, 832, 834 and controller 74 may be arranged to individually drive the LEDs of group 808 with a high current demand and LEDs of group 810 with a lower current demand. Further the LEDs of group 812 may be driven by driver 834 as a string, to reduce the cost of the driver 834 in comparison to the drivers 830, 832. In this manner, angles near the axis of the display can be arranged to provide operation in high brightness environments whereas the angles more off-axis can be arranged to provide observer tracked low power mode operation and LED strings 812 can be driven when the display is required to operate in wide angle mode, that is a directional distribution that is similar to a standard 2D display.

Figure 42B:
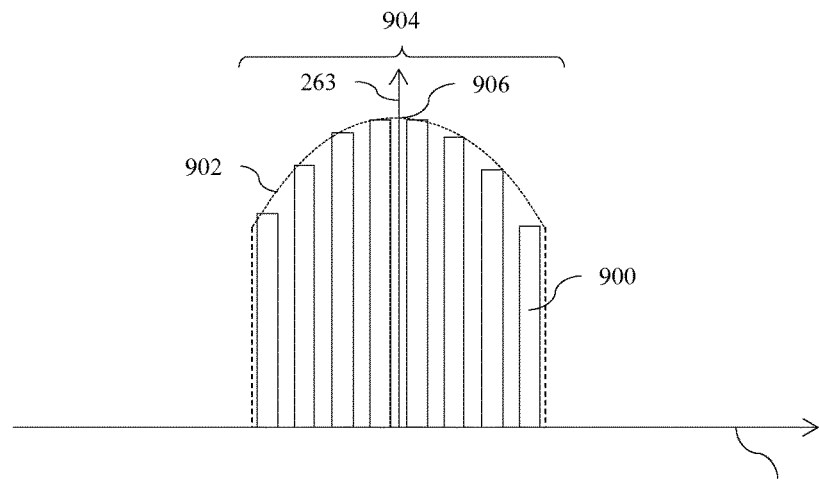
FIGS. 42B-42D are schematic diagram illustrating graphs of light emitting element luminous flux with position in light emitting element arrays, in accordance with the present disclosure.
Figure 42C:
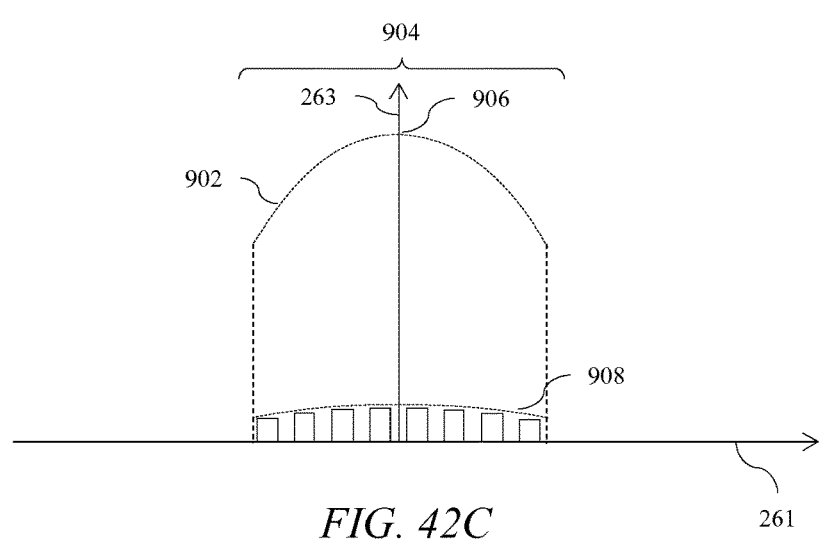
Figure 42D:
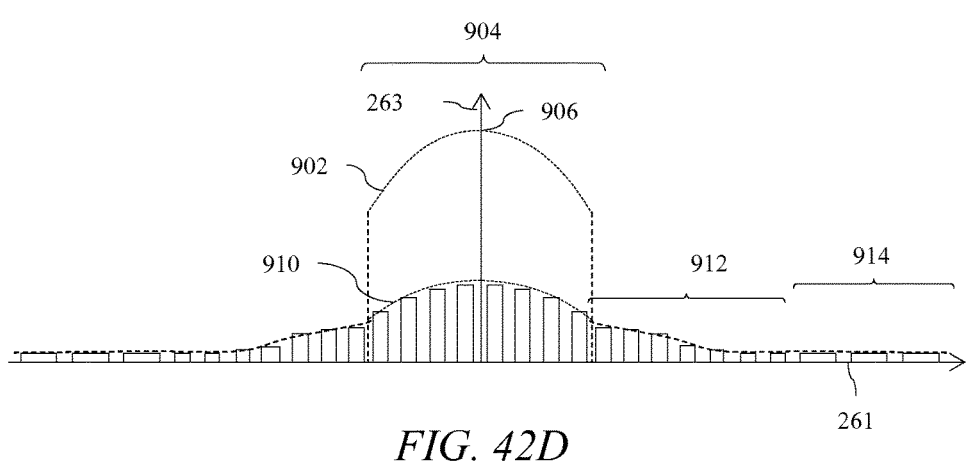

FIGS. 42B-D are schematic diagram illustrating graphs of light emitting element luminous flux 263 with position 261 across an array of light emitting element arrays. FIG. 42B shows the arrangement of FIG. 41 wherein group 808 of LEDs are illuminated each with luminous flux 900 with an array grey scale locus profile 902. The output luminous intensity function may be related to the luminous flux distribution by propagation of light within the waveguide 1, and at the reflector film 300 and diffuser 68 arrangements. Such a luminous flux distribution may be arranged for example to achieve a high brightness display for viewing of images with desirable contrast ratio in environments with high illuminance, such as 25,000 lux. In lower illuminance environments, such as indoors, the luminous flux distribution 908 may be arranged as shown in FIG. 42C. Thus the display efficiency may be further increased while achieving a desirable luminance for indoors viewing.

Further it may be desirable to increase the viewing freedom of the display. As shown in FIG. 42A, the luminous flux distribution 910 may be provided. LED regions 904, 912, 914 may be provided by LED groups 811, 810, 812 respectively in FIG. 42A. Advantageously, a wide viewing angle display may be provided with a luminous intensity distribution similar to that of a conventional 2D backlight, for example profile 352 in FIG. 32C. Such an arrangement does not require further control of window position or structure for wide angle viewing.

Advantageously a display can be arranged that may achieve a high contrast in environments with high illuminance levels. Further the display can achieve very low levels of power consumption in indoor environments for acceptable contrast ratios. Further, the display can achieve angular luminous intensity distributions that are similar to conventional 2D backlights for similar power operation. Further such a display can operate in landscape and portrait modes of operation. Further the peak luminance can be arranged for optimum viewing of the display in substantially the direction of the display surface normal, and is thus suitable for displays arranged to operate in both landscape and portrait modes of operation.

Figure 43A:
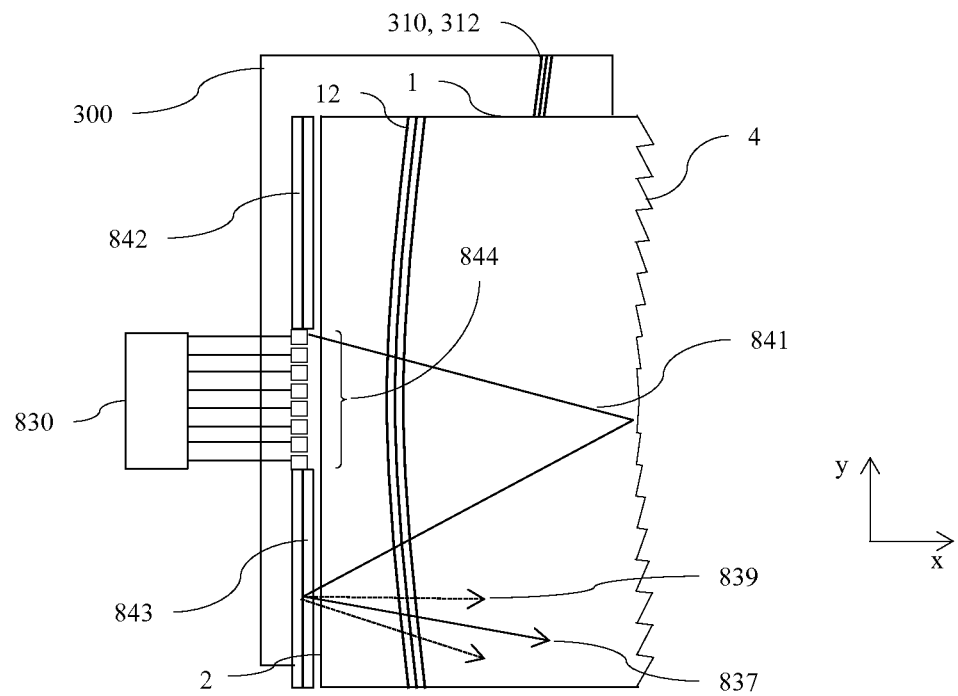
FIGS. 43A-43B are schematic diagrams illustrating front and side views of an optical valve arranged with a reflector at the input side to redirect returning light into a wide viewing cone and an integrated Fresnel mirror, in accordance with the present disclosure.
Figure 43B:
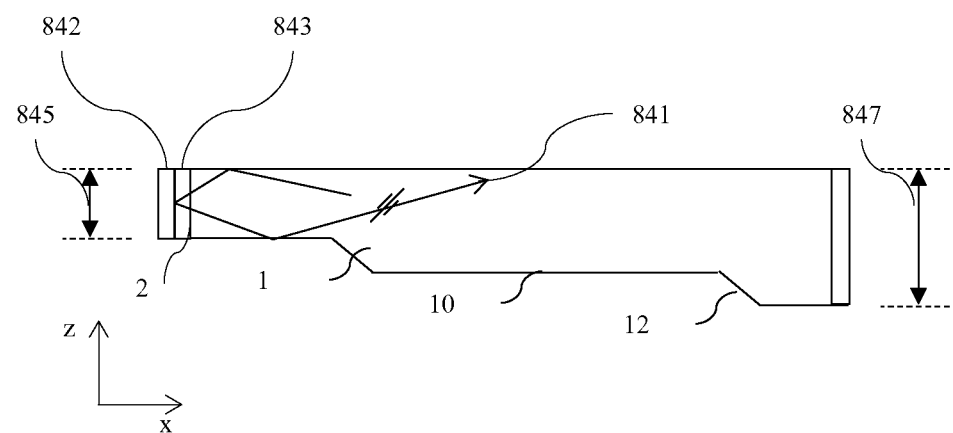

FIG. 43A is a schematic diagram illustrating a front view of an optical valve arranged with a reflector at the input side and FIG. 43B a schematic diagram illustrating a side view of an optical valve arranged with a reflector at the input side 2 arranged to redirect returning light into a wide viewing cone and an integrated Fresnel mirror. Reflector 842 may comprise a metallic reflector or a polymeric reflector, for example ESR™, and may further be arranged with a diffuser 843 that may be an asymmetric diffuser arranged to diffuse light so that rays 841 incident on reflector 842 are diffused in the x-y plane but not in the x-z plane, providing diffuse rays 839 as well as direct reflected rays 837. In operation some of the light from an LED that is not extracted at features 12 is incident on the input side 2 and reflected. This light then recirculates in the system and thus achieves a source that is substantially the width of the optical valve. The ratio of the input aperture height 845 to mirror aperture height 847 may be adjusted to achieve increased light falling on the input aperture, therefore increasing the amount of light that may be directed across a wide range of angles, and increasing the background illumination levels. The array 15 may comprise a single group 844 of high brightness LEDs, thus advantageously reducing display cost. Such a display may be tracked to achieve moving viewing windows or may be untracked with a high brightness central peak.

Figure 43C:
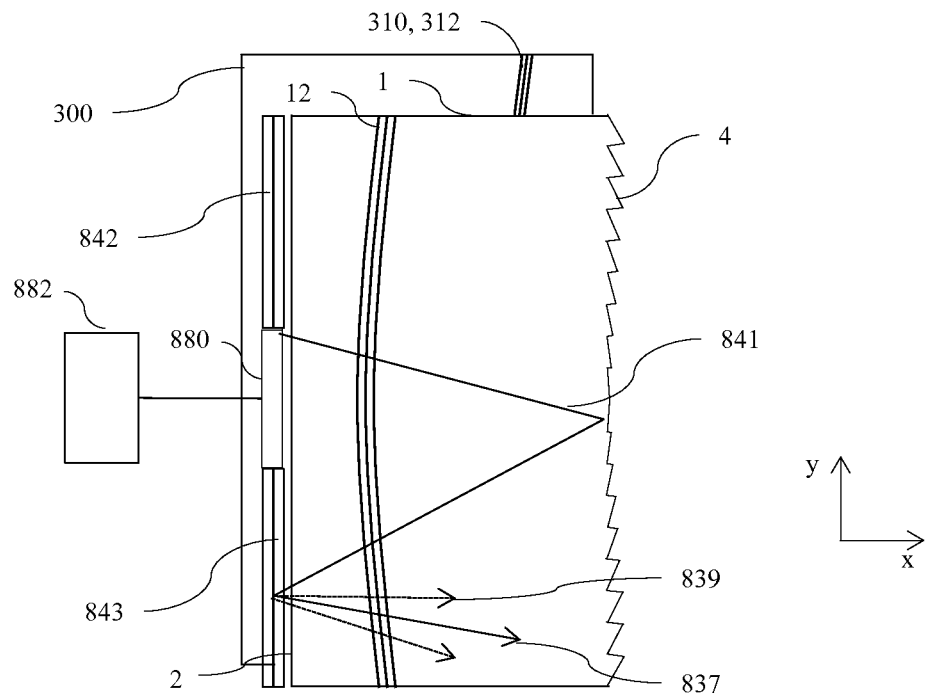
FIGS. 43C-43D are schematic diagrams illustrating further front views of an optical valve arranged with a reflector at the input side to redirect returning light into a wide viewing cone and an integrated Fresnel mirror, in accordance with the present disclosure.
Figure 43D:
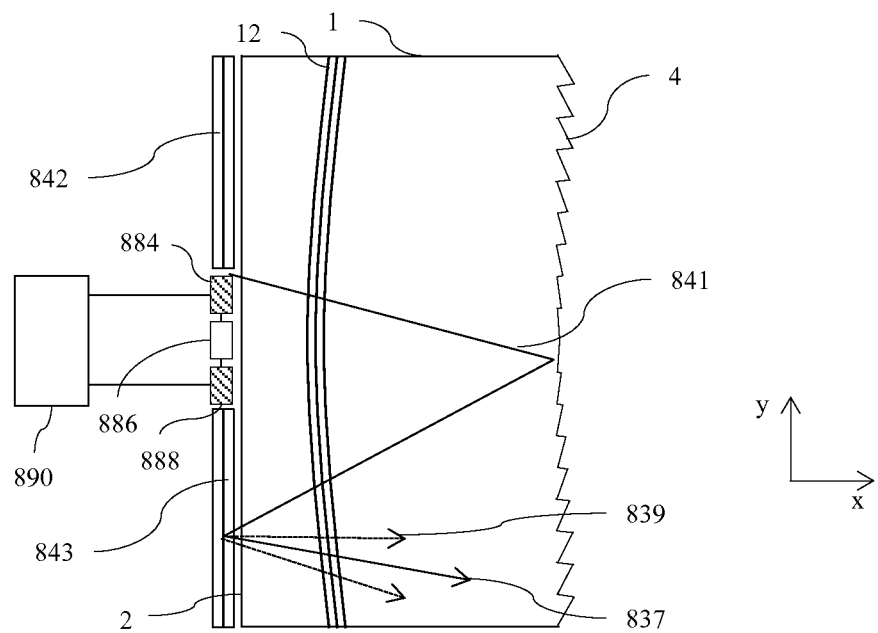
Figure 43E:
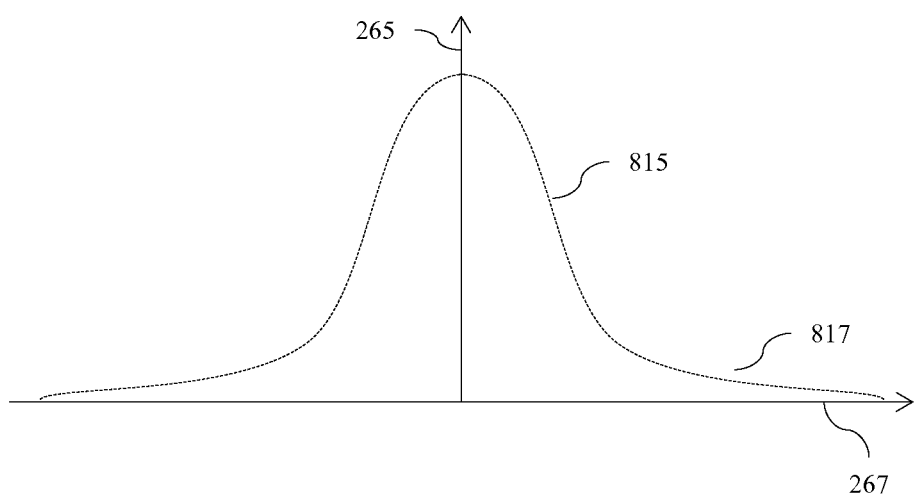
FIG. 43E is a schematic diagram illustrating a graph of a luminous intensity distribution from the arrangement of FIG. 43A, in accordance with the present disclosure.

FIGS. 43C-43D are schematic diagrams illustrating further front views of an optical valve arranged with a reflector at the input side to redirect returning light into a wide viewing cone and an integrated Fresnel mirror. FIG. 43E is a schematic diagram illustrating a graph of a luminous intensity distribution from the arrangement of FIG. 43D.

FIG. 43C shows an arrangement wherein a single light source 880 driven by a single controller 882 is arranged to provide display illumination. The directional backlight may thus comprise a waveguide 1 comprising an input end 2; a single light source 880 disposed at a predetermined input position in a lateral direction across the input end 2 of the waveguide 1, the waveguide 1 further comprising first and second, opposed guide surfaces 6, 8 for guiding light along the waveguide 1, and a reflective end 4 facing the input end 2 for reflecting the input light back through the waveguide 1, the first guide surface 6 being arranged to guide light by total internal reflection and the second guide surface 8 having a stepped shape comprising (a) a plurality of facets 12 oriented to reflect light from the light source 880, after reflection from the reflective end 4, through the first guide surface 6 into an optical window in an output direction positioned in a lateral direction (y-axis) in dependence on the input position of the light source 880, and (b) intermediate regions 10 between the facets 12 that are arranged to guide light through the waveguide 1; a rear reflector 300 comprising an array of reflective facets 310 arranged to reflect light from the light source 808, that is transmitted through the plurality of facets 12 of the waveguide 1, back through the waveguide 1 to exit through the first guide surface 6 into said optical windows.

Advantageously the cost and complexity of the device is reduced and a wide angle of illumination profile can be achieved. FIG. 43D shows a further arrangement wherein a single high brightness LED 886 and two low brightness but high efficiency LEDs 884, 888 are arranged to provide a viewing window luminous intensity 265 profile with position 267 in the window plane 106 comprising a central region 815 with light directly from the LEDs and outer region 817 with light reflected from the reflector 842. The ratio of the height of the reflective end 4 to the input end 2 may be set to determine the ratio of light in regions 815 and 817. The efficiency of the output can thus be optimised while achieving a wide viewing angle mode and a high brightness 2D mode.

Figure 44A:
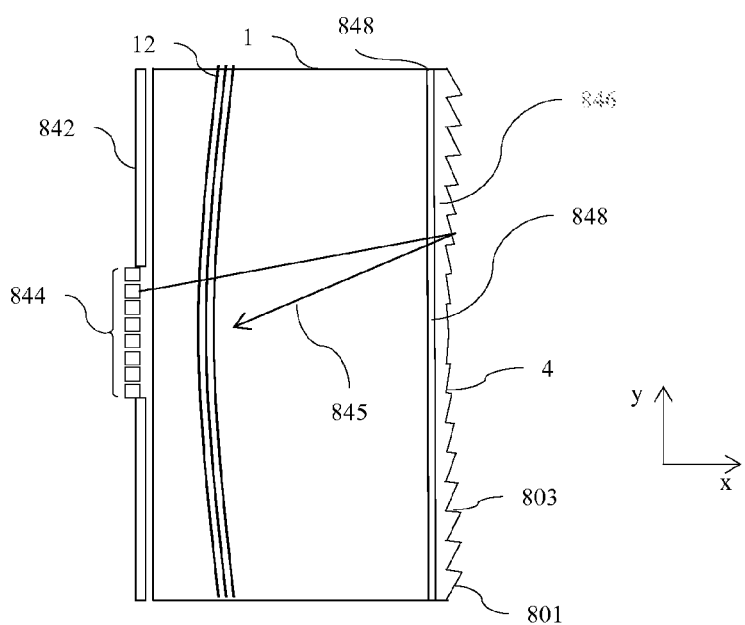
FIGS. 44A-44B are schematic diagrams illustrating front and side views of an optical valve further comprising an asymmetric diffuser arranged near the reflecting end to improve output uniformity, in accordance with the present disclosure.
Figure 44B:
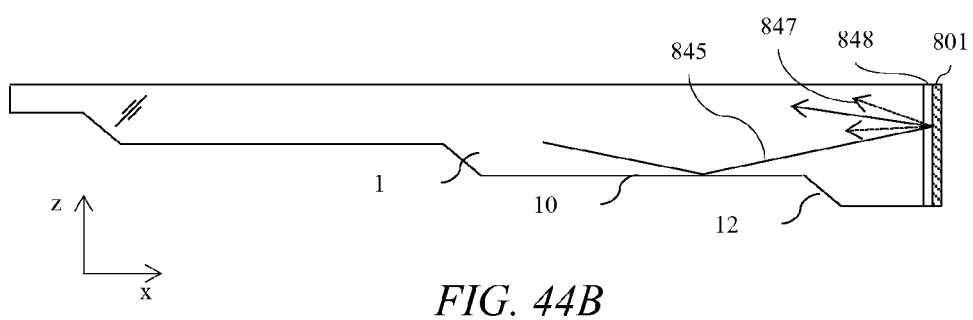

FIGS. 44A-44B are schematic diagrams illustrating front and side views respectively of an optical valve further comprising an asymmetric diffuser 848 arranged near the reflecting end 4 to improve output uniformity. Diffuser 848 may be arranged to provide substantially low diffusion for rays 845 propagating in the x-y plane while providing a small amount of diffused rays 847 for rays propagating in the x-z plane. Such diffuser may advantageously achieve increased display area uniformity due to non-uniform angular distribution of light rays in the x-z plane. Such non-uniform angular distribution of rays may arise from diffraction effects and mode coupling effects within the waveguide 1 of the optical valve. In an illustrative example, a diffuser with angular diffusion properties of 0.1°×3° may be arranged at the end 4. Such a diffuser maybe buried in materials with different refractive indices to reduce Fresnel reflections from the surface of the structures.

Figure 44C:
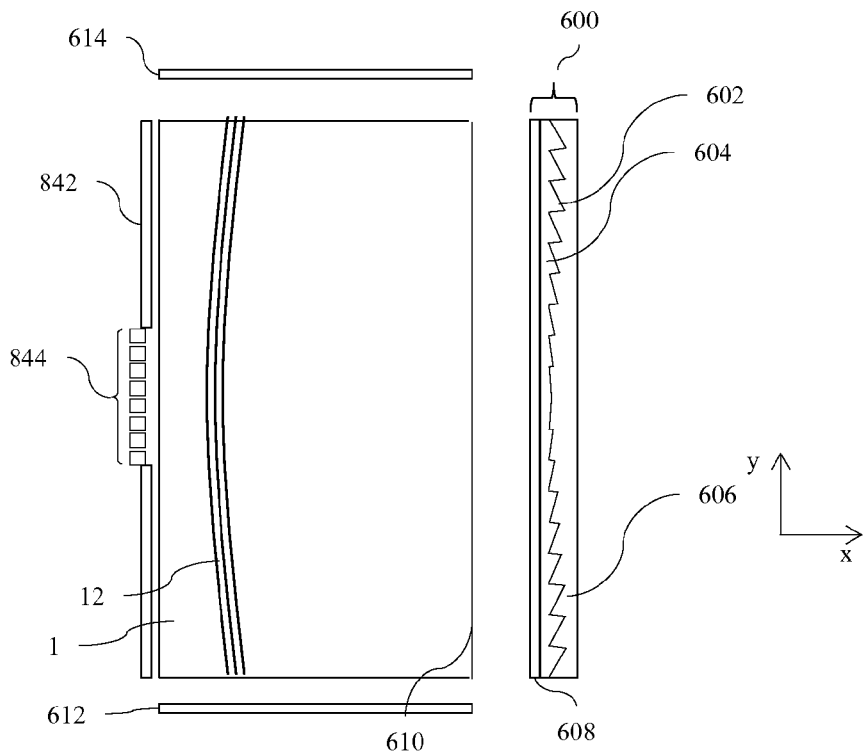
FIGS. 44C-44D are schematic diagrams illustrating front views of a method to form an optical valve, in accordance with the present disclosure.
Figure 44D:
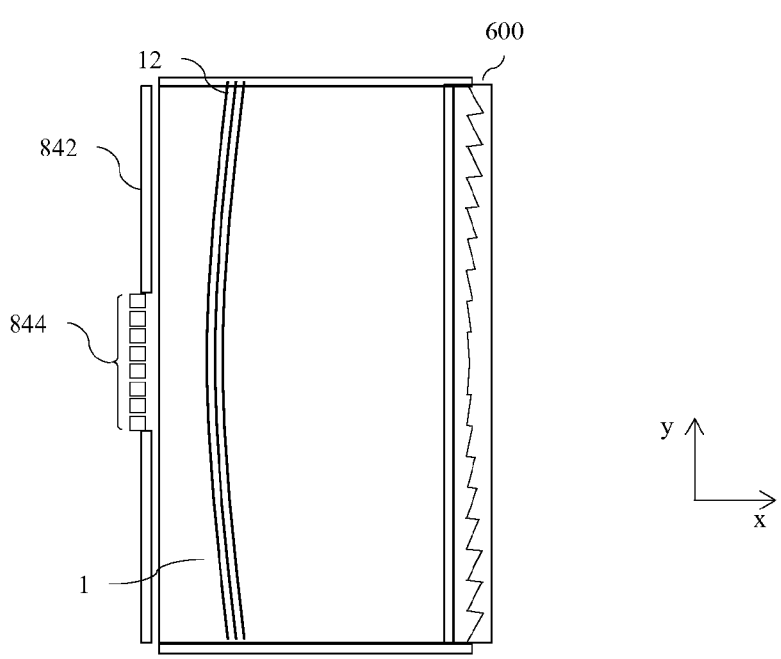

FIGS. 44C-44D are schematic diagrams illustrating front views of a method to form an optical valve comprising waveguide 1. The waveguide 1 may be formed by molding into an integrated body comprising curved facets 12. The body may comprise a planar end 610. A Fresnel mirror assembly 600 may comprise a Fresnel surface 602 that is metallised and formed between encapsulant layers 604, 606. Alternatively the Fresnel mirror may comprise an embossed reflector formed in a similar manner to that shown in FIGS. 28F-I and may further be provided with protective layers 604, 606. Adhesive layer 608 which may comprise some diffusing function similar to that shown in FIG. 44B may be provided to attach the Fresnel mirror assembly to the end 610 of the integrated body of the waveguide 1. Further reflective layers 612, 614 may be attached to the side walls of the waveguide 1 to reduce the visibility of off-axis voids. Advantageously the Fresnel mirror assembly can be formed with high precision and high reflectivity in a process that is separate to the integrated body, achieving increased optical performance.

It may be desirable to reduce device size by integrating components of the backlight with the structure of the display system, for example mobile phone, phablet or tablet.

Figure 45A:
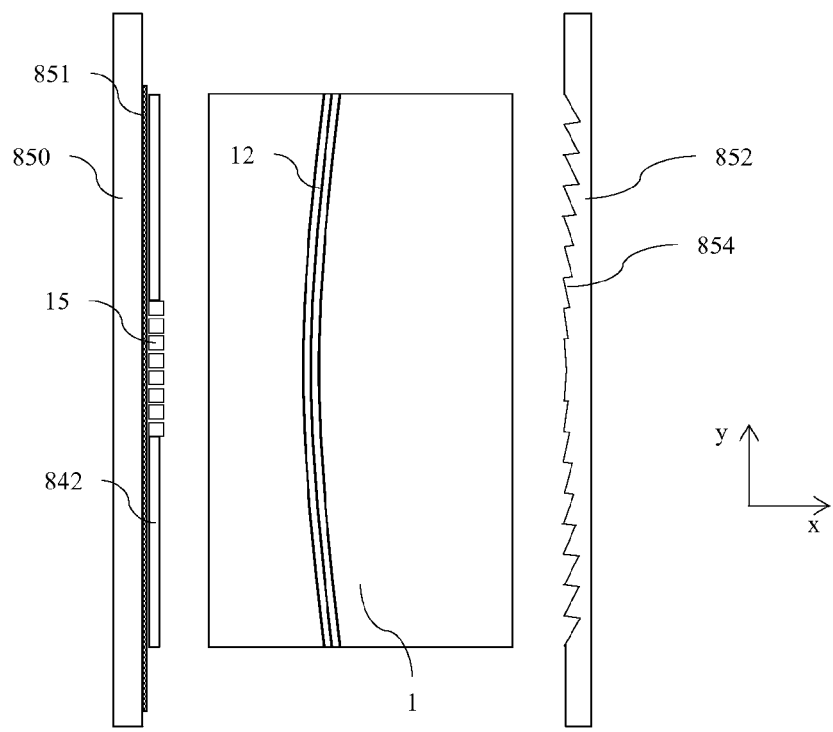
FIG. 45A is a schematic diagram illustrating a front view of an optical valve in a first assembly step comprising an LED array arranged on a first device frame and a Fresnel mirror arranged on a second device frame, in accordance with the present disclosure.
Figure 45B:
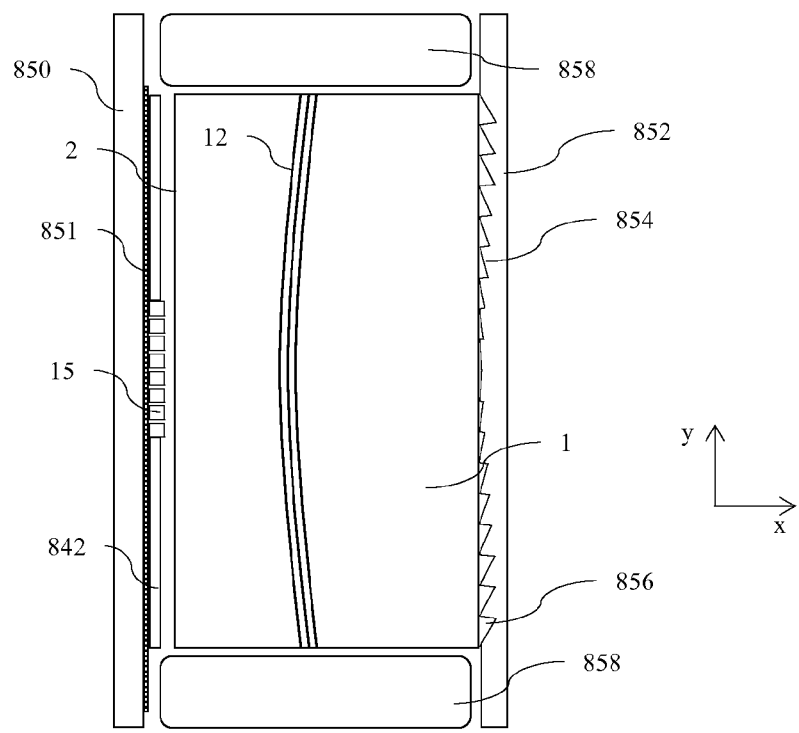
FIG. 45B is a schematic diagram illustrating a front view of an optical valve in a second assembly step comprising an LED array arranged on a first device frame and a Fresnel mirror arranged on a second device frame, in accordance with the present disclosure.

FIG. 45A is a schematic diagram illustrating a front view of an optical valve in a first assembly step comprising an LED array arranged on a first device frame and a Fresnel mirror arranged on a second device frame and FIG. 45B shows the arrangement during a second assembly step. In a first step, light source array 15 such as an LED array is assembled on a substrate comprising an electrode and insulator layer 851 and a metal frame 850 that may be the outer frame of a display device such as a mobile phone or tablet. Further films such as ESR 842 may be applied in the regions of the array 15 to recycle light within the waveguide 1 as shown in FIGS. 44A-B. Further a Fresnel mirror 854 may be formed on or in the frame 852 of the device. Such Fresnel mirror may be molded directly into the frame itself or may be formed on the frame. During the assembly step, the Fresnel mirror may be attached by means of an index matching material 856 to the waveguide 1 forming an integrated component. Further the light source array may be brought into proximity to the input side of the waveguide 1 during the assembly step. Further electronic components and boards 858 may be arranged around the backlight.

Advantageously the size of the bezel of the display device may be reduced and the number of separate components further reduced, minimizing cost. Further the frame 850 may provide a heat-sink for the LEDs of the array 15, thus improving thermal contact to the external environment, improving efficiency and lifetime of the LEDs.

Figure 46A:
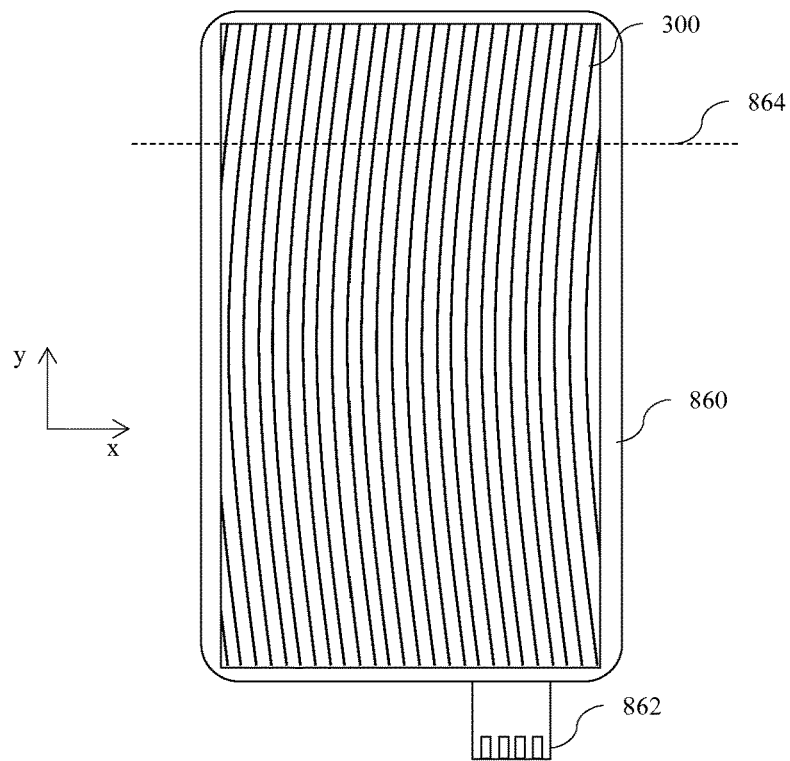
FIG. 46A is a schematic diagram illustrating a front view of a battery for display devices comprising a reflective film, in accordance with the present disclosure.
Figure 46B:
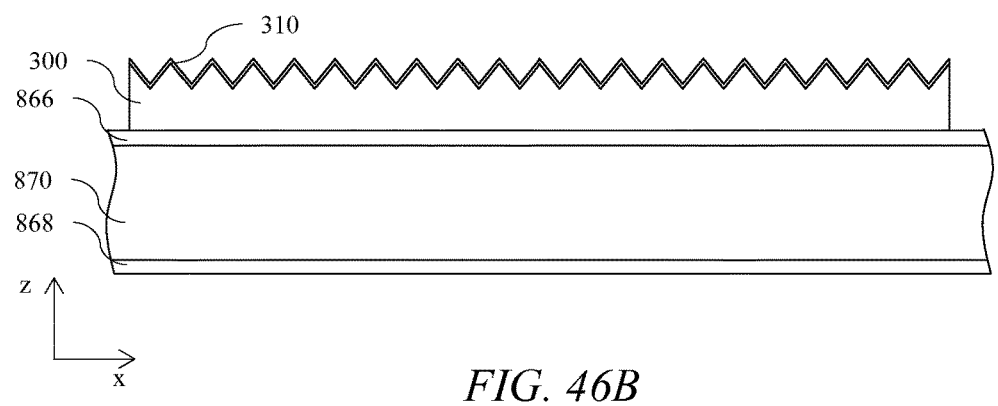
FIGS. 46B-46C are schematic diagrams illustrating side views batteries for display device comprising a reflective film, in accordance with the present disclosure.
Figure 46C:
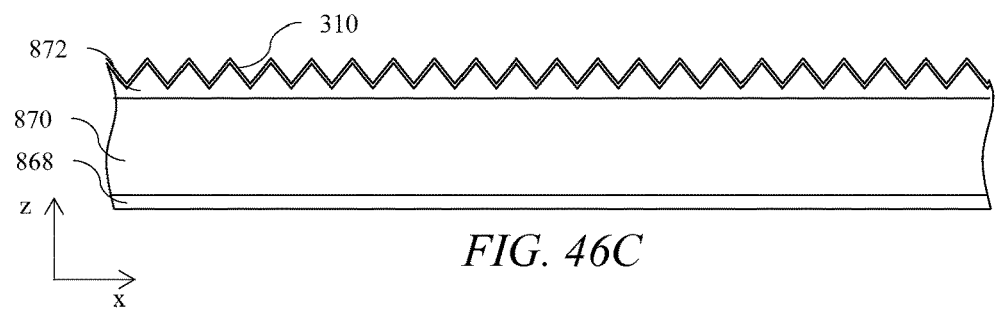

FIGS. 46A-46C are schematic diagrams illustrating a front view and side views of a battery 860 for display devices comprising a reflective layer. The reflective film comprising facets 310, 312 may be arranged on the battery 860 with external contacts 862 to the battery. Along cross section 864, FIG. 46B shows that the film 300 may be attached to the top cover 866 of the battery, with battery material 870 and bottom cover 868. Advantageously the battery may be arranged as a substantially flat supporting layer so that the optical output windows from the reflective layer 300 are aligned across the area of the display. Alternatively as shown in FIG. 46C the reflective layer may be arranged in the cover 872 of the battery, achieving a more integrated and thinner structure with desirable flatness for imaging windows.

Display brightness may be substantially increased in comparison to arrangements that do not use the prismatic reflective film 300 and reflective polarizer 402. Light source cost may be reduced and battery lifetime may be extended.

Figure 47:
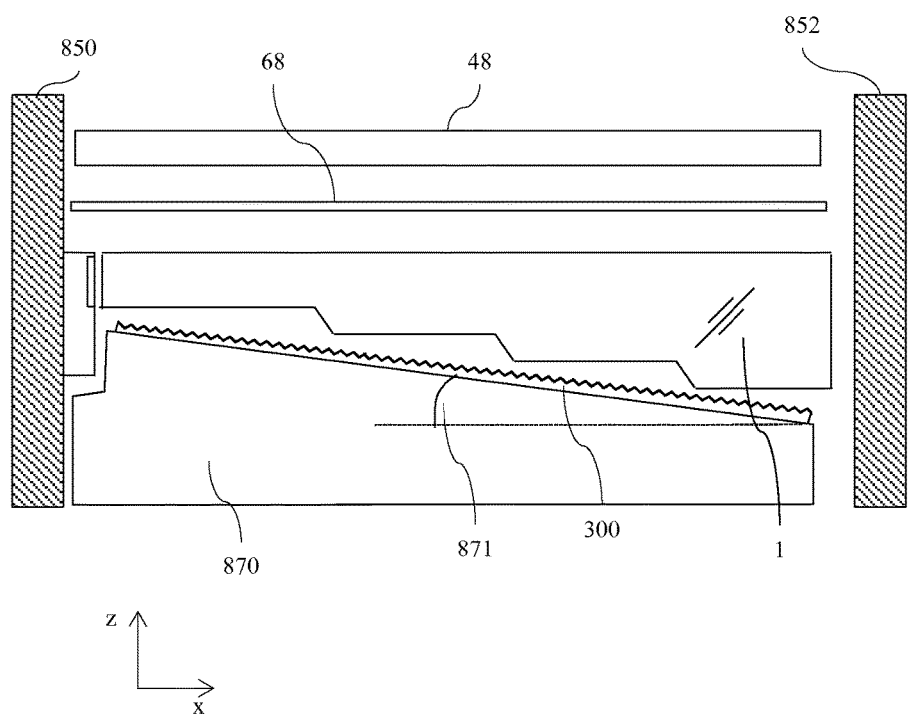
FIG. 47 is a schematic diagram illustrating a side view of a display device comprising a reflective film arranged on a wedged battery, in accordance with the present disclosure.

FIG. 47 is a schematic diagram illustrating a side view of a display device comprising a reflective film arranged on a wedged battery 870 with wedge angle 871 matched to the taper angle of the waveguide 1. Advantageously the rear reflector 300 can be integrated onto the battery, optimizing the volume of the battery.

Figure 48:
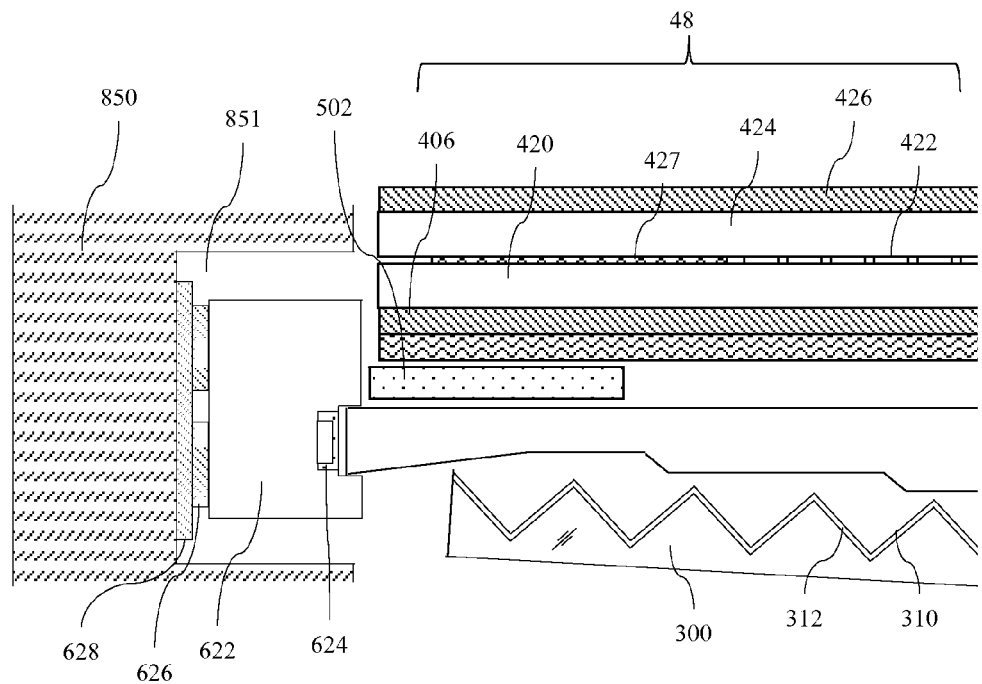
FIG. 48 is a schematic diagram illustrating a side view of a display device comprising a slotted side wall for LED placement to achieve reduced bezel width, in accordance with the present disclosure.

FIG. 48 is a schematic diagram illustrating a side view of a display device comprising a slotted side wall for LED placement to achieve reduced bezel width. Transmissive spatial light modulator 48 such as a liquid crystal display may further comprise a border region 427 that may comprise addressing electronics and sealing material and is outside the active area of the SLM 48. Shading layer 502 is arranged to hide visibility of the edge regions of the directional backlight. LED package 622 with emitting region 624, and electrical connection regions 626 may be arranged on electrical fan-out and attached to the side wall 850 of the mobile device, optionally in cavity region 851. In an illustrative example, a side bezel width of less than 2.5 mm can be achieved, where the gap between the edge of the active area and the region 624 is approximately three times the height of the waveguide 1 input end 2.

Figure 49:
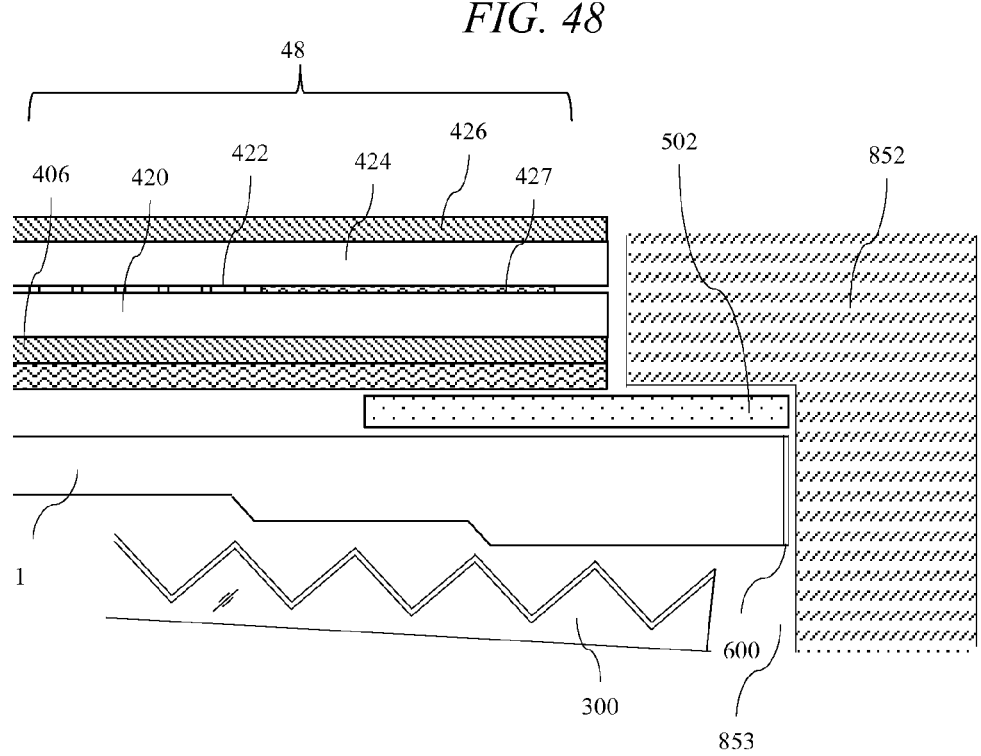
FIG. 49 is a schematic diagram illustrating a side view of a display device comprising a slotted side wall for mirror placement to achieve reduced bezel width, in accordance with the present disclosure.

FIG. 49 is a schematic diagram illustrating a side view of a display device comprising a slotted side wall for mirror placement to achieve reduced bezel width. Shading layer 502 is arranged partially in optional cut-out 853 in side wall 852 to obscure scatter from the edge of mirror 600. To continue the illustrative example, a side bezel width of less than 2.5 mm can be achieved, where the gap between the edge of the active area and the mirror 600 is approximately three times the height of the mirror 600.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A directional backlight comprising:
a waveguide comprising an input end;
an array of light sources disposed at different input positions in a lateral direction across the input end of the waveguide,
the waveguide further comprising first and second, opposed guide surfaces for guiding light along the waveguide, and a reflective end facing the input end for reflecting the input light back through the waveguide, the first guide surface being arranged to guide light by total internal reflection and the second guide surface having a stepped shape comprising:
a plurality of facets oriented to reflect light from the light sources, after reflection from the reflective end, through the first guide surface into optical windows in output directions distributed in a lateral direction to the normal to the first guide surface in dependence on the input positions, and
intermediate regions between the facets that are arranged to guide light through the waveguide; and
a rear reflector comprising a linear array of reflective facets arranged to reflect light from the light sources, that is transmitted through the plurality of facets of the waveguide, back through the waveguide to exit through the first guide surface,
wherein the light sources are configured to output light that is directed into selectable viewing windows at different locations, the selectable viewing windows comprising at least one of the optical windows.

2. A directional backlight according to claim 1, further comprising a diffuser disposed to receive light output through the first guide surface.

3. A directional backlight according to claim 2, wherein the diffuser is an asymmetric diffuser that is arranged to provide greater angular dispersion in a direction orthogonal to said lateral direction than in said lateral direction.

4. A directional backlight according to claim 2, further comprising a Fresnel lens having optical power in at least said lateral direction, disposed between the first guide surface of the waveguide and the diffuser.

5. A directional backlight according to claim 1, further comprising a Fresnel lens having optical power at least in said lateral direction disposed to receive light output through the first guide surface.

6. A directional backlight according to claim 1, wherein the facets of the waveguide and the reflective facets of the rear reflector are inclined in the same sense in a common plane orthogonal to said lateral direction.

7. A directional backlight according to claim 6, wherein the facets of the waveguide are inclined at an angle $(90°-\alpha)$ to the normal to the first guide surface and the reflective facets of the rear reflector are inclined at an angle $\beta$ to the normal to the first guide surface, and $2\beta > 90° - \sin^{-1}(n \cdot \sin(\alpha - \theta_c))$, $\theta_c$ being the critical angle of the facets of the waveguide and n being the refractive index of the material of the waveguide.

8. A directional backlight according to claim 1, wherein the rear reflector is spaced from the waveguide such that the light from au individual facet of the waveguide is incident on plural reflective facets of the rear reflector, the rear reflector further comprising intermediate facets extending between the reflective facets of the rear reflector, the intermediate facets being inclined in an opposite sense from the reflective facets of the rear reflector at an angle such that said light from the light sources that is transmitted through the plurality of facets of the waveguide is not incident on the intermediate facets.

9. A directional backlight according to claim 1, wherein the reflective facets of the rear reflector have an irregular pitch.

10. A directional backlight according to claim 9, wherein the reflective facets of the rear reflector have an irregular, randomised pitch.

11. A directional backlight according to claim 1, wherein the reflective facets of the rear reflector have an inclination that varies across the array of reflective facets.

12. A directional backlight according to claim 1, wherein the reflective facets of the rear reflector are linear.

13. A directional backlight according to claim 1, wherein the reflective facets of the rear reflector are elongate and are curved along their length.

14. A directional backlight according to claim 1, wherein the reflective facets of the rear reflector are concave, and arranged in alignment with the facets of the waveguide.

15. A directional backlight according to claim 1, wherein the reflective facets of the rear reflector are undulating along their length.

16. A directional backlight according to claim 1, wherein the rear reflector further comprises, a rough diffusing surface on at least some of the reflective facets.

17. A directional backlight according to claim 1, wherein the facets of the rear reflector are disposed behind respective ones of the facets of the waveguide and arranged to reflect all of the light incident thereon from the light sources that is transmitted through the respective one of the facets of the waveguide.

18. A directional backlight according to claim 1, wherein the reflective end has positive optical power in a lateral direction across the waveguide.

19. A directional backlight according to claim 1, wherein the rear reflector formed by at least two polarized reflector sheets arranged to reflect light that is polarized in respective polarization directions that are orthogonal to each other, the polarized reflector sheets being shaped to form said linear array of reflective facets.

20. A directional backlight according to claim 1, wherein the facets of the waveguide are elongate and are curved along their length.

21. A directional display device comprising:
a directional backlight comprising:
a waveguide comprising an input end;
an array of light sources disposed at different input positions in a lateral direction across the input end of the waveguide,
the waveguide further comprising first and second, opposed guide surfaces for guiding light along the waveguide, and a reflective end facing the input end for reflecting the input light back through the waveguide, the first guide surface being arranged to guide light by total internal reflection and the second guide surface having a stepped shape comprising:
a plurality of facets oriented to reflect light from the light sources, after reflection from the reflective end, through the first guide surface into optical windows in output directions distributed in a lateral direction to the normal to the first guide surface in dependence on the input positions, and
intermediate regions between the facets that are arranged to guide light through the waveguide; and
a rear reflector comprising a linear array of reflective facets arranged to reflect light from the light sources, that is transmitted through the plurality of facets of the waveguide, back through the waveguide to exit through the first guide surface; and
a transmissive spatial light modulator arranged to receive the light output through the first guide;
wherein the light sources are configured to output light that is directed into selectable viewing windows at different locations, the selectable viewing windows comprising at least one of the optical windows.

22. A directional display device according to claim 21, wherein the spatial light modulator is arranged to modulate a first polarization component of that light having a first polarization, and
the directional display device further comprises a reflective polarizer disposed between the first guide surface of the waveguide and the spatial light modulator and arranged to transmit the first polarization component and to reflect a second polarization component of the output light having a polarization orthogonal to the first polarization as rejected light,
the rear reflector further comprises intermediate facets extending between the reflective facets of the rear reflector and inclined in opposite senses from the reflective facets of the rear reflector in a common plane, so that pairs of a reflective facet and an intermediate facet together form corner facets arranged to reflect rejected light for supply back to the spatial light modulator, the pairs of a reflective facet and an intermediate facet being inclined in a plane that is oriented around the normal to the spatial light modulator so that the rear reflector converts the polarization of rejected light supplied back to spatial light modulator into the first polarization on reflection.

23. A directional display device according to claim 22, further comprising a polarization rotator disposed between the reflective polarizer and the spatial light modulator and arranged to rotate the first polarization component.

24. A display apparatus comprising:
a directional backlight comprising:
a waveguide comprising an input end;
an array of light sources disposed at different input positions in a lateral direction across the input end of the waveguide,
the waveguide further comprising first and second, opposed guide surfaces for guiding light along the waveguide, and a reflective end facing the input end for reflecting the input light back through the waveguide, the first guide surface being arranged to guide light by total internal reflection and the second guide surface having a stepped shape comprising:
a plurality of facets oriented to reflect light from the light sources, after reflection from the reflective end, through the first guide surface into optical windows in output directions distributed in a lateral direction to the normal to the first guide surface in dependence on the input positions, and
intermediate regions between the facets that are arranged to guide light through the waveguide; and
a rear reflector comprising a linear array of reflective facets arranged to reflect light from the light sources, that is transmitted through the plurality of facets of the waveguide, back through the waveguide to exit through the first guide surface;
a transmissive spatial light modulator arranged to receive the light output through the first guide; and
a control system arranged to selectively operate the light sources to direct light into optical windows corresponding to said output directions;
wherein the light sources are configured to output light that is directed into selectable viewing windows at different locations, the selectable viewing windows comprising at least one of the optical windows.

25. A display apparatus according to claim 23, wherein the display apparatus is an autostereoscopic display apparatus wherein the control system is further arranged to control the display device to display temporally multiplexed left and right images and synchronously to direct the displayed images into optical windows in positions corresponding to left and right eyes of an observer.

26. A display apparatus according to claim 24, wherein
the control system further comprises a sensor system arranged to detect the position of an observer across the display device, and
the control system is arranged to direct the output light into optical windows selected in dependence on the detected position of the observer.

27. A display apparatus according to claim 24, wherein
the spatial light modulator is arranged to modulate a first polarization component of that light having a first polarization, and
the directional display device further comprises a reflective polarizer disposed between the first guide surface of the waveguide and the spatial light modulator and arranged to transmit the first polarization component and to reflect a second polarization component of the output light having a polarization orthogonal to the first polarization as rejected light,
the rear reflector further comprises intermediate facets extending between the reflective facets of the rear reflector and inclined in opposite senses from the reflective facets of the rear reflector in a common plane, so that pairs of a reflective facet and an intermediate facet together form corner facets arranged to reflect rejected light for supply back to the spatial light modulator, the pairs of a reflective facet and an intermediate facet being inclined in a plane that is oriented around the normal to the spatial light modulator so that the rear reflector converts the polarization of rejected light supplied back to spatial light modulator into the first polarization on reflection.

28. A display apparatus according to claim 27, further comprising a polarization rotator disposed between the reflective polarizer and the spatial light modulator and arranged to rotate the first polarization component.

* * * * *